(12) United States Patent
Horikawa et al.

(10) Patent No.: US 7,724,249 B1
(45) Date of Patent: May 25, 2010

(54) TERMINAL EQUIPMENT FOR MERGING IMAGING DATA AND TEXT DATA, AND TRANSMITTING AND RECEIVING THE SAME ON-LINE

(75) Inventors: Akira Horikawa, Okayama (JP); Masanori Kawaguchi, Kawasaki (JP); Hirotoshi Umemura, Yokohama (JP); Tetsuo Aoki, Kawasaki (JP); Atsurou Noguchi, Okayama (JP); Kouichi Masaki, Okayama-ken (JP); Akihiko Shigeta, Yokohama (JP); Kiyoshi Ohi, Setagaya-ku (JP); Kiyoshi Inoue, Kashiwa (JP); Yasuhiro Tameie, Ichihara (JP); Naruhito Yamamoto, Chiba (JP); Hiroshi Aihara, Chiba (JP); Masahiko Senda, Kurashiki (JP)

(73) Assignee: Fujitsu Limited, Kawasaki (JP)

( * ) Notice: Subject to any disclaimer, the term of this patent is extended or adjusted under 35 U.S.C. 154(b) by 1697 days.

(21) Appl. No.: 07/842,391
(22) PCT Filed: Apr. 30, 1991
(86) PCT No.: PCT/JP91/00585
§ 371 (c)(1),
(2), (4) Date: May 20, 1992
(87) PCT Pub. No.: WO92/01991
PCT Pub. Date: Feb. 6, 1992

(30) Foreign Application Priority Data

Jul. 23, 1990 (JP) .................................. 02-197493
Jul. 23, 1990 (JP) .................................. 02-197494
Jul. 23, 1990 (JP) .................................. 02-197495

(51) Int. Cl.
*G06T 15/00* (2006.01)
(52) U.S. Cl. .................... 345/418; 345/531; 345/537; 715/734; 715/762
(58) Field of Classification Search .................. 395/144, 395/145, 146, 147, 148, 505, 509, 513–515, 395/517–524, 530, 531, 539; 715/505, 509, 715/513–515, 517–524, 530, 531, 734, 762, 715/763; 345/539, 708, 418, 531, 537
See application file for complete search history.

(56) References Cited

U.S. PATENT DOCUMENTS 4,464,730 A * 8/1984 Lawrence et al. ........... 395/148

(Continued)

FOREIGN PATENT DOCUMENTS

EP 0 285 449 10/1988

(Continued)

OTHER PUBLICATIONS

Acerson, "WordPerfect—The Complete Reference", 1988, p. 454-457, 572, 573, 720, 721.*

(Continued)

*Primary Examiner*—Phu K Nguyen
(74) *Attorney, Agent, or Firm*—Staas & Halsey LLP

(57) ABSTRACT

Terminal equipment for electronically making patent and utility patent applications. The terminal equipment converts various formats of text data generated by an external device into the internal format of the terminal equipment, retrieves the converted text data, merges the text data with a procedure, and transmits the procedure. The merging operation in which image data is merged with text data is simplified whereby the operator can make applications with a simple operation without special skill and knowledge when an application document is transmitted and received on line. The terminal equipment includes a text converting portion for converting the external format of text data into the internal format of the terminal equipment and for retrieving the converted text data, a procedure generation processing portion for merging the retrieved text data with a procedure, a text processing portion and paragraph number assigning portion for editing the merged text and image data within the terminal equipment, a text checking portion for checking the text of the edited procedure document, a transmission file generating portion for converting the format of the checked procedure document into a transmission format, and an online application portion for transmitting the data in the transmission format to the outside of the terminal equipment.

4 Claims, 80 Drawing Sheets

U.S. PATENT DOCUMENTS

| | | | | |
|---|---|---|---|---|
| 5,051,930 | A | * | 9/1991 | Kuwabara et al. ............ 395/148 |
| 5,107,423 | A | * | 4/1992 | Sasaki et al. ................. 395/148 |
| 5,276,793 | A | * | 1/1994 | Borgendale et al. ......... 395/148 |
| 5,303,342 | A | * | 4/1994 | Edge ........................... 395/164 |

FOREIGN PATENT DOCUMENTS

| | | |
|---|---|---|
| JP | 61-62170 | 3/1986 |
| JP | 62-236071 | 10/1987 |
| JP | 62239263 | 10/1987 |
| JP | 62-279425 | 12/1987 |
| JP | 63-150759 | 6/1988 |
| JP | 63-245555 | 10/1988 |
| JP | 63-273174 | 11/1988 |
| JP | 63-304368 | 12/1988 |
| JP | 1-136270 | 5/1989 |
| JP | A1-154277 | 6/1989 |
| JP | 1-193926 | 8/1989 |
| JP | A1-244568 | 9/1989 |

OTHER PUBLICATIONS

Macintosh Utilities User's Guide, 1988, p. 51-61.*
Kinata et al, "Working with Word" 1989, p. 6-8, 422-430, 576-577.*
Kelly "Mastering WordPerfect" pp. 22, 179-207, 244.*
Townsend "Electronic Mail And Beyond" pp. 3-4, 52-56.*
Yoder et al. "Using Hypertext in a Law Firm" Hyperpext, pp. 159-167, Nov. 1989.*
Akscyn et al. "KMS: A Distributed Hypermedia System for Managing Knowledge in Organizations" Communications of the ACM, pp. 820-835, Jul. 1988.*
Kazutoshi Otani, "An Introduction to Page Maker" BNN Co., Sep. 30, 1988, pp. 32-33.
Kleper, M. L., "The Illustrated Handbook of Desktop Publishing and Typesetting"; Graphic Dimensions, 1987, pp. 423-429.
Akio Shimatani, "Ver. 4 MIFES Handbook" NATSUME Co. Ltd., Oct. 31, 1988, pp. 17-20 and 75-76.
"TURBO C. User's Guide Ver. 1.5 Japanese Version", Southern Pacific, Mar. 25, 1988, pp. 77-85.
"Fuji Xerox 8000 Ins J. Star II VP Patent Electronic Application Tool Operation Manual", 1990, pp. 5-6, 8-13, 18-22, 28-35, 70-78 and 81-87.
Fuji Xerox "8083 J. Star Island Operating Manual II", 1989, 3, pp. 292-303.
"Layout Method for Document Having Text and Non-Text Areas", IBM Techical Disclosure Bulletin, IBM Corp., New York, US, vol. 30, No. 5, Oct. 1, 1987, pp. 206-207.
Marchionini, G. et al., "Finding Facts vs. Browsing Knowledge in Hypertext Systems", Computer, IEEE Computer Society, Long Beach, CA, US, vol. 21, No. 1, Jan. 1988, pp. 70-80.
Patent Abstracts of Japan, vol. 013, No. 114, Mar. 20, 1989, & JP 63 286039, Nov. 1988, Canon Inc.
Patent Abstracts of Japan, vol. 013, No. 580 Dec. 21, 1989 & JP 01 244568, Sep. 28, 1989, NEC Corp.

* cited by examiner

DOCUMENT TABLE

| DOCUMENT NAME | PROCEDURE NAME | DOCUMENT CODE | DOCUMENT CATEGORY |
|---|---|---|---|
| PATENT APPLICATION PREAMBLE | APPLICATION | 6300 | MAIN DOCUMENT |
| SPECIFICATION | APPLICATION | 6330 | ATTACHED DOCUMENT |
| DRAWINGS | APPLICATION | 6331 | ATTACHED DOCUMENT |
| ABSTRACT | APPLICATION | 6332 | ATTACHED DOCUMENT |
| PETITION FOR EXAMINATION | PETITION FOR EXAMINATION | 6200 | MAIN DOCUMENT |
| ... | ... | ... | ... |

Fig. 6A

IDENTIFIER TABLE

| IDENTIFIER | ITEM ID | ATTRIBUTE | COLUMNS | CONVERSION METHOD | DESCRIPTION ITEM CONVERSION TABLE NAME |
|---|---|---|---|---|---|
| ADDRESSEE | 1001 | K | V | SIMPLE CONVERSION | |
| DOCUMENT NAME | 1002 | C | 8 | CODING | DOCUMENT TABLE |
| FOUR-LAW CATEGORY | 1021 | C | 1 | CODING | FOUR-LAW CATEGORY TABLE |
| .. | .. | .. | .. | .. | .. |

Fig. 6B

DESCRIPTION ITEM CONVERSION TABLE
(FOUR-LAW CATEGORY)

| FOUR-LAW CODE | DESCRIPTION ITEM |
|---|---|
| 1 | PATENT |
| 2 | UTILITY PATENT |
| 3 | DESIGN PATENT |
| 4 | TRADEMARK |

Fig. 6C

| PROCEDURE NUMBER | CASE NAME | PROCEDURE NAME | DOCUMENT INFORMATION 1 | | | DOCUMENT INFORMATION 2 | | | | |
|---|---|---|---|---|---|---|---|---|---|---|
| | | | DOCUMENT NAME | TEXT STORAGE FILE NAME | NUMBER OF PAGES | DOCUMENT NAME | TEXT STORAGE FILE NAME | NUMBER OF PAGES | | |
| 1 | SEMICONDUCTOR APPARATUS | APPLICATION | APPLICATION PREAMBLE | a a a a a | 1 | SPECIFICATION | b b b b b | 10 | | |
| 2 | ... | ... | | | | | | | | |
| 3 | ... | ... | | | | | | | | |

| DOCUMENT INFORMATION 3 | | | DOCUMENT INFORMATION 4 | | | ...... | DOCUMENT INFORMATION n |
|---|---|---|---|---|---|---|---|
| DOCUMENT NAME | TEXT STORAGE FILE NAME | NUMBER OF PAGES | DOCUMENT NAME | TEXT STORAGE FILE NAME | NUMBER OF PAGES | | |
| DRAWINGS | c c c c c | 5 | ABSTRACT | d d d d d | 1 | | |

(CONTINUED)

Fig. 7

|   | JIS FORMAT | INTERNAL FORMAT |
|---|---|---|
| あ | 2 4 2 2 | a 4 a 2 |
| い | 2 4 2 4 | a 4 a 4 |
| う | 2 4 2 6 | a 4 a 6 |

Fig. 12

| PROCEDURE SELECTION | |
|---|---|
| PROCEDURE CATEGORY | ☐ APPLICATION    ☐ INTERMEDIATE PROCEDURE<br>☐ REGISTRATION SETTING (PAYMENT OF ISSUE FEE)    ☐ PAYMENT OF MAINTENANCE FEE |
| FOUR-LAW CATEGORY | ☐ PATENT    ☐ UTILITY PATENT<br>☐ DESIGN PATENT    ☐ TRADEMARK |

Fig. 16A

EXAMPLE OF PROCEDURE SELECTION SCREEN

| PROCEDURE CATEGORY X (1) | FOUR-LAW CATEGORY X (1) | DOCUMENT NAME N (20) | PROCEDURE NAME N (10) | INTERMEDIATE CODE X (6) | LARGE CATEGORY X (1) | DOCUMENT CATEGORY N (4) |
|---|---|---|---|---|---|---|
| 1 | 1 | APPLICATION PREAMBLE | PATENT APPLICATION | 63 | A | MAIN DOCUMENT |
| 1 | 1 | SPECIFICATION | PATENT APPLICATION | 6330 | A | ATTACHED DOCUMENT |
| ... | ... | ... | ... | ... | ... | ... |
| 1 | 1 | ABSTRACT | PATENT APPLICATION | 6332 | A | ATTACHED DOCUMENT |
| 2 | 1 | PETITION FOR EXAMINATION | PETITION FOR EXAMINATION | 62 | A | MAIN DOCUMENT |

Fig. 16B

EXAMPLE OF INTERMEDIATE CODE TABLE

| (PROCEDURE CATEGORY) | |
|---|---|
| APPLICATION | 1 |
| INTERMEDIATE PROCEDURE | 2 |
| REGISTRATION SETTING PAYMENT OF ISSUE FEE | 3 |
| PAYMENT OF MAINTENANCE FEE | 4 |

| (FOUR-LAW CATEGORY) | |
|---|---|
| PATENT | 1 |
| UTILITY PATENT | 2 |
| DESIGN PATENT | 3 |
| TRADEMARK | 4 |

| | |
|---|---|
| APPLICATION GROUP | A |
| REGISTRATION GROUP | R |

EXAMPLE OF CODE

Fig. 16C

EXAMPLE OF PROCEDURE MANAGEMENT INFORMATION FILE

EXAMPLE OF STRUCTURED TEXT DEFINITION OF PATENT

EXAMPLE OF NODE POSITION

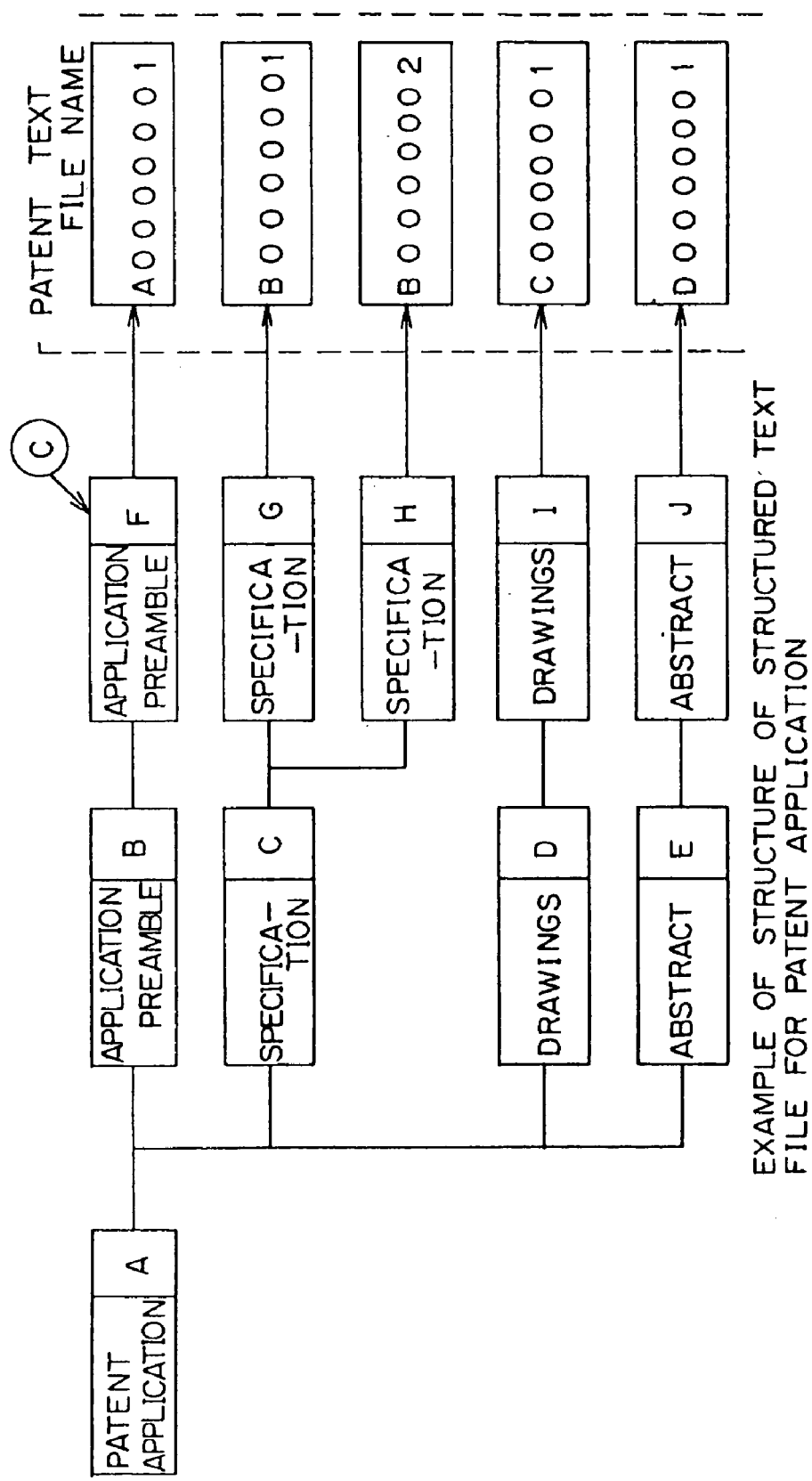

| DOCUMENT SELECTION |||
|---|---|---|
| PROCEDURE NAME : PATENT APPLICATION |||
| CASE NAME : HAND SCANNER |||
| NO | DOCUMENT NAME | NUMBER OF PAGES |
| ☐ 100 | APPLICATION PREAMBLE | 1 |
| ☐ 200 | SPECIFICATION | 5 |
| ☐ 300 | DRAWING | 2 |
| ☐ 400 | ABSTRACT | 0 |
| ☐ GENERATION / UPDATE  ☐ PAGE ADJUSTMENT  ☐ END |||
| ☐ DIVISION  ☐ FLOPPY DISK TEXT |||

Fig. 18

[STRUCTURE OF STRUCTURED TEXT FILE]

| NODE | LINE POSITION | LEVEL POSITION |
|---|---|---|
| PATENT APPLICATION | 1 | 1 |
| APPLICATION PREAMBLE | 1 | 2 |
| SPECIFICATION | 2 | 2 |
| DRAWINGS | 3 | 2 |
| ABSTRACT | 4 | 2 |

| NODE | LINE POSITION | LEVEL POSITION |
|---|---|---|
| PATENT APPLICATION | 1 | 1 |
| APPLICATION PREAMBLE | 1 | 2 |
| SPECIFICATION | 2 | 2 |
| SPECIFICATION | 3 | 2 |
| DRAWINGS | 4 | 2 |
| ABSTRACT | 5 | 2 |

| TITLE OF DOCUMENT N (10) | FILE NAME OF TEXT TO BE CONVERTED X (8) |
|---|---|
| APPLICATION PREAMBLE | J 0 0 0 0 0 0 |
| SPECIFICATION | J 0 0 0 0 0 1 |
| SPECIFICATION | J 0 0 0 0 0 2 |
| DRAWINGS | J 0 0 0 0 0 3 |
| ABSTRACT | J 0 0 0 0 0 4 |

| |
|---|
| ⋮ |
| PARAGRAPH NUMBER ASSIGNMENT CATEGORY |
| PARAGRAPH NUMBER ASSIGNMENT MARK |
| PARAGRAPH NUMBER ASSIGNMENT SUPPRESSING LINE NUMBER |
| ⋮ |

EXAMPLE OF CONTENT OF ENVIRONMENTAL SETTING FILE

| |
|---|
| MANAGEMENT NUMBER |
| PROCEDURE FILE NAME |
| PROCEDURE CATEGORY |
| FOUR-LAW CATEGORY |
| INTERMEDIATE CODE |
| ⋮ |
| TRANSMISSION RESULT FLAG |

EXAMPLE OF CONTENT OF PROCEDURE MANAGEMENT INFORMATION FILE

| OPERATION ENVIRONMENTAL INFORMATION UPDATE |
|---|
| PARAGRAPH NUMBER : ☐ AUTOMATIC ASSIGNMENT SUPPRESSING LINE NUMBER <u>XX</u> LINES<br>ASSIGNMENT<br>☐ REPLACE ASSIGNMENT MARK <u>N</u><br>☐ AUTOMATIC & REPLACE |

Fig. 27A

OPERATION ENVIRONMENTAL INFORMATION UPDATE SCREEN

PARAGRAPH NUMBER ASSIGNMENT SCREEN

IN THE CASE WHERE PARAGRAPH NUMBER ASSIGNMENT MARK IS PRESENT

BEFORE ASSIGNMENT: ...@......

AFTER ASSIGNMENT: ...(nnnn)▽....

(NOTE) @: REPRESENTS PARAGRAPH NUMBER ASSIGNMENT MARK

Fig. 28E

```
[Addressee]      Commissioner of Patent
                 and Trademark office
[Document name]  Patnet application
[Date of application]  October 1, 1990
[International patent classification]  G02B 3/00
[Title of invention]    Hand scanner
[Number of claims]
[Inventor]
  [Address]
  [Name]
[Patent applicant]
  [Address]
  [Name]
[Attorney]
```

< APPLICATION DOCUMENT >

[Title of document]  Specification
[Detail description of invention]
[001]
  The present invention relates to×××××××××××
  ××××××××××××××××××××××××××××
  ×××××××××××××
  ×××××.
[002]
  The above mentioned×××
  ×××××××××××××
  ×××××××××××××
  At the terminal×××××
  ×××××××××××××
  ×××××××××××××
[003]
  Conventionally,×××××

[Title of document]  Drawings
[Figure 1]

Fig. 30-1

<Format of transmission file>

| Item name | | | | Byte length | Attribute | Detail value |
|---|---|---|---|---|---|---|
| Command | | | | 6 | JIS X 0201 | "010010" |
| Document information | Applicant information | Header portion | Length portion | Total information length | 4 | Binary | |
| | | | | Information length of length portion | 4 | Binary | |
| | | | | Information length of bibliographic information portion | 4 | Binary | |
| | | | | Information length of document information portion | 4 | Binary | |
| | | | | Document length of non-constructed document | 4 | Binary | "0" |
| | | | | Document length of specification | 4 | Binary | |
| | | | | Document length of drawings | 4 | Binary | |
| | | | | Document length of content of post-amendment | 4 | Binary | "0" |
| | | | | Number of other documents | 4 | Binary | "0" |
| | | Bibliographic information portion | Bibliographic information offset | Item ID #1 | 4 | JIS X 0201 | |
| | | | | Item Length #1 | 4 | Binary | |
| | | | | Item portion #1 | 4 | Binary | |
| | | | | Item ID<br>Item Length } repeated<br>Item portion | | | |
| | | | | Separator | 4 | JIS X 0201 | "****" |
| | | | | Real data of bibliographic information | Variable length | JIS X 0201 or JIS X 0208 | |
| | Body (T73) | Document information portion | | Document substance of specification | Variable length | JIS X 0208 | |
| | | | | Document substance of drawings | Variable length | JIS X 0208 | |

Fig. 30-2

```
TEXT            MAIN DOCUMENT OF REFERENCE NUMERAL 27              TEXT READING PROCESSING
                                                                   PORTION 442

[ADDRESSEE ]              COMMISSIONER OF PATENT AND TRADEMARK OFFICE
[TITLE OF DOCUMENT ]      PATENT APPLICATION
[APPLICANT REFERENCE NUMBER]  P 0 0 0 0 6 3 - 0 1
[DATE OF APPLICATION ]    OCTOBER 1, 1990
[INTERNATIONAL PATENT CLASSIFICATION ]  G 0 2 B   3 / 0 0
                                        G 0 2 C   4 / 0 0
[TITLE OF INVENTION]      HAND  SCANNER
[NUMBER OF CLAIMS]        5
[INVENTOR]
  [ADDRESS ]              Kawasaki-shi, KANAGAWA KEN

[NAME]                  Ichiro FUJI
[INVENTOR]
  [ADDRESS ]              Kawasaki-shi, KANAGAWA KEN

[NAME]                  Jiro FUJI
[PATENT APPLICANT]
  [APPLICANT REGISTRATION NUMBER ] 0 9 0 0 0 4 3 2 4
  [NAME]                     F U J I T S U   L I M I T E D
[ATTORNEY]
  [APPLICANT REGISTRATION NUMBER ] 1 9 0 0 0 1 2 3 4
  [NAME]                     Taro TOKKYO
[LIST OF ATTACHED DOCUMENTS AND ITEMS]
  [TITLE OF DOCUMENT ]    SPECIFICATION        1 COPY
  [TITLE OF DOCUMENT ]    DRAWINGS             1 COPY
  [DEPOSITION NUMBER OF POWER OF ATTORNEY]   9 0 0 0 0 0 1
```

Fig. 31-1

| IDENTIFIER INFORMATION TABLE 448 | POSITION | LENGTH |
|---|---|---|
| ADDRESSEE | 0 | 12 |
| TITLE OF DOCUMENT | 12 | 6 |
| APPLICANT REFERENCE NUMBER | 18 | 20 |
| DATE OF APPLICATION | 38 | 18 |
| INTERNATIONAL PATENT CLASSIFICATION | 56 | 50 |
| TITLE OF INVENTION | 106 | 16 |
| NUMBER OF CLAIMS | 122 | 2 |
| INVENTOR | 0 | 0 |
| ADDRESS | 124 | 76 |
| NAME | 200 | 10 |
| INVENTOR | 0 | 0 |
| ADDRESS | 210 | 76 |
| NAME | 286 | 10 |
| PATENT APPLICANT | 0 | 0 |
| APPLICANT REGISTRATION NUMBER | 296 | 18 |
| NAME | 314 | 40 |
| ATTORNEY | 0 | 0 |
| APPLICANT REGISTRATION NUMBER | 354 | 18 |
| NAME | 372 | 10 |
| LIST OF ATTACHED DOCUMENTS AND ITEMS | 0 | 0 |
| TITLE OF DOCUMENT | 382 | 20 |
| TITLE OF DOCUMENT | 402 | 20 |
| DEPOSITION NUMBER OF POWER OF ATTORNEY | 422 | 14 |

INTERMEDIATE FILE 449

COMMISSIONER OF PATENT AND TRADEMARK OFFICE
PATENT APPLICATION
P000063-01
OCTOBER 1, 1990
G02B 3/00
HAND SCANNER
5
Kawasaki shi, KANAGAWA KEN
Ichiro FUJI
Kawasaki shi, KANAGAWA KEN
Jiro FUJI
090004324
FUJITSU LIMITED
190001234
Taro TOKKYO
SPECIFICATION    1 COPY
DRAWINGS        1 COPY
9000001

Fig. 31-2

| IDENTIFIER INFORMATION TABLE 448 | INTERMEDIATE FILE 449 |
|---|---|
| ADDRESSEE | COMMISSIONER OF PATENT AND TRADEMARK OFFICE |
| TITLE OF DOCUMENT | PATENT APPLICATION |
| APPLICANT REFERENCE NUMBER | P000063-01 |
| DATE OF APPLICATION | OCTOBER 1, 1990 |
| INTERNATIONAL PATENT CLASSIFICATION | G02B 3/00 |
| TITLE OF INVENTION | HAND SCANNER |
| NUMBER OF CLAIMS | 5 |
| INVENTOR | |
| ADDRESS | Kawasaki-shi, KANAGAWA-KEN |
| NAME | Ichiro FUJI |
| INVENTOR | |
| ADDRESS | Kawasaki-shi, KANAGAWA-KEN |
| NAME | Jiro FUJI |
| PATENT APPLICANT | |
| APPLICANT REFERENCE NUMBER | 090004324 |
| NAME | FUJITSU LIMITED |
| ATTORNEY | |
| APPLICANT REFERENCE NUMBER | 190001234 |
| NAME | Taro TOKKYO |
| LIST OF ATTACHED DOCUMENTS AND ITEMS | |
| TITLE OF DOCUMENT | SPECIFICATION 1 COPY |
| TITLE OF DOCUMENT | DRAWINGS 1 COPY |
| DEPOSITION NUMBER OF POWER OF ATTORNEY | 9000001 |

Fig. 32-1

| OFFSET INFORMATION TABLE 451 | | | BIBLIOGRAPHIC INFORMATION FILE 452 |
|---|---|---|---|
| ITEM ID | LENGTH | POSITION | |
| 1001 | 12 | 1 | COMMISSIONER OF PATENT AND TRADEMARK OFFICE |
| 1002 | 8 | 13 | A163 |
| 1003 | 3 | 21 | 010 |
| 1004 | 10 | 24 | P000063-01 |
| 1012 | 8 | 34 | 19901001 |
| 1224 | 17 | 42 | G02B 3/00 |
| 1224 | 17 | 59 | G02C 4/00 |
| 1041 | 14 | 76 | HAND SCANNER |
| 1200 | 60 | 2 | ←→LENGTH=NUMBER OF MEMBERS *12/ POSITION =NUMBER OF REPETITIONS: |
| 1201 | 0 | 0 | |
| 1202 | 0 | 0 | IN THIS EXAMPLE, SINCE TWO INVENTORS ARE DESCRIBED, "2" IS EDITED AT "POSITION" |
| 1203 | 76 | 90 | Kawasaki-shi, KANAGAWA-KEN |
| 1204 | 10 | 166 | Ichiro FUJI |
| 1205 | 0 | 0 | |
| 1201 | 0 | 0 | |
| 1202 | 0 | 0 | |
| 1203 | 76 | 176 | Kawasaki-shi, KANAGAWA-KEN |
| 1204 | 10 | 252 | Jiro FUJI |
| 1205 | 0 | 0 | |
| 1050 | 300 | 1 | |

Fig. 32-3

ITEM ATTRIBUTE TABLE
KEY1          KEY2          KEY3

| FOUR-LAW CATEGORY | INTERMEDIATE CODE | IDENTIFIER | ITEM ATTRIBUTE | MEMBER ITEM NAME(1) | MEMBER ITEM NAME(2) | --- | MEMBER ITEM NAME(30) |
|---|---|---|---|---|---|---|---|
| X(001) | X(006) | N(030) | X(001) | N(030) | N(030) | ---- | N(030) |
| 1 | 63 | INVENTOR | 3 | ADDRESS | NAME | ---- | |
| | | | | | | | |

DESCRIPTION OF KEYS
① FOUR-LAW CATEGORY ...... RETRIEVED FROM TEXT
② INTERMEDIATE CODE ...... RETRIEVED FROM INTERMADIATE CODE TABLE
③ IDENTIFIER ............ RETRIEVED FROM TEXT
WHEN NOT RETRIEVED, THE ITEM IS TREATED AS GENERAL ITEM(NORMAL).

DESCRIPTION OF ITEMS
① ITEM ATTRIBUTE ...... DEFINES ATTRIBUTE OF ITEM.    SPACE : GENERAL ITEM (NORMAL)
                                                      "1" : GENERAL ITEM (TO BE LISTED)
                                                      "2" : GENERAL ITEM (TO BE DIVIDED)
                                                      "3" : GROUP ITEM
                                                      "4" : SET ITEM OTHER THAN GROUP ITEM

② MEMBER ITEM NAME ...... WHEN ITEM CATEGORY IS "3" OR "4", SUBORDINATE IDENTIFIERS ARE DESCRIBED IN OUTPUT ORDER.

NOTE: MEMBER ITEMS ARE NOT REGISTERED IN THIS TABLE.

Fig. 34

ITEM TABLE

| INTERMEDIATE TABLE | LAW CODE | ITEM ID | MANDATORY CATEGORY | |
|---|---|---|---|---|
| X (006) | X (003) | X (004) | X (001) | --- |
| 63 | 53 | 1001 | 2 | --- |
| 65 | 53 | 1002 | 1 | |

✱ MANDATORY CATEGORY
1: MANDATORY FOR ACCEPTANCE.
2: MANDATORY IN FORMAT

⇒ EXAMPLE OF DOCUMENT

Fig. 35

CONSTRUCTION
OF PRINCIPAL
PORTION

```
            PROCEDURE  TABLE
 No.      REFERENCE No.    CASE NAME
 01       123456789        HAND SCANNER APPARATUS
 02       123456789        OPTOMAGNETIC DISK
 03       123456789        MULTIPLY ARTICULATED ROBOT

☐ EXECUTE     ☐ CANCEL
```

Fig. 53A

```
      FILE  NAME  DESIGNATION
 DESIGNATE FILE NAME.

FILE NAME_____
 ☐  EXECUTE    ☐ CANCEL
```

Fig. 53B

SCHEMATIC DIAGRAM OF DESIGNATING PRINT RANGE

///JOURNAL/PRINT-OUT///

DESIGNATION OF RANGE
START: ___(HOUR): ___(MINUTE): ___(SECOND): 9(MONTH): 11(DAY):1990(YEAR)
END: 16(HOUR): 29(MINUTE): 29(SECOND): 9(MONTH): 11(DAY):1990(YEAR)

▨ EXECUTE   ☐ CANCEL

TERMINAL EQUIPMENT FOR MERGING IMAGING DATA AND TEXT DATA, AND TRANSMITTING AND RECEIVING THE SAME ON-LINE

TECHNICAL FIELD

The present invention relates to terminal equipment for electronically applying for patents and utility patents, and in particular relates to terminal equipment for automatically merging image data with text generating procedure documents, checking text formats, and transmitting and receiving text on line.

RELATED ART

Word processors are presently being widely used to electronically generate application documents for patents and utility patents. In executing this work, it is very desirable to transfer text data to terminal equipment for processing. Thus, a function is required in terminal equipment to facilitate this transfer of text data.

In addition, in a hyper text including images generated by a word processor or the like, the image data should be readily read and combined with the text. Moreover, in making a patent application or the like with an application document (text data) on line, online transmission and reception operations need to be simplified.

Conventionally, patent applications have been made off line. That is, text data (character data and image data) for patent application documents or the like are created by word processors or the like. Thereafter, the text data are printed and the printed pages are mailed or delivered by hand to the Patent and Trademark Office.

Presently, when a patent application is made with text data generated by an online word processor, the online operations necessary for transmitting an application document and for receiving acknowledgement of the receipt are complicated and require special knowledge thereof.

Moreover, when image data read by a scanner or the like are combined with text generated by a word processor or like, a frame for merging the image data with the text must be created and then the image data placed on the frame.

However, in the conventional device, the frame size for merging the image data with the text sometimes does not match the size of the image data being read. Moreover, every position for reading the image data must be designated. Furthermore, when one page of the application document contains two or more drawings, they must be divided into two or more pieces of image data and then merged with the text. These operations take a long time and are complicated.

Word processors available on the market have unique specifications which differ from one manufacturer to another, and data generated by the word processors of different manufacturers are not compatible. To convert text formats between different word processors, a text conversion software package must be installed. However, such a software package can only deal with the conversion of simple text formats.

To electronically generate application documents for patents and utility patents, various text data formats must be converted and transferred to terminal equipment. Thereafter, the resultant data must be merged using procedures to store, manage, edit, check and transmit them. However, terminal equipment which can perform such operations is not presently available.

DISCLOSURE OF THE INVENTION

A first object of the present invention is to provide terminal equipment for making electronic patent applications, for converting text data in various formats created by another device and for merging the resultant data using procedures to store, manage, edit, check, and transmit them.

A second object of the present invention is to simplify the operations for merging image data with text data with respect to terminal equipment for making electronic applications.

A third object of the present invention is to readily transmit and receive patent application documents or the like on line without requiring that the operator possess a skill or special knowledge about the terminal equipment.

FIG. 1 is a block diagram for explaining the theory of the present invention.

The text converting portions 1 to 3 convert text data in various formats into the internal format of the terminal equipment and transfer the resultant text data thereto. The procedure generation processing portion 4 merges the received text data using one procedure. The procedure generation reference file 5 comprises a document table, an identifier table, a plurality of item conversion tables, and so forth. The procedure management information file 6 stores definition information of text structures and information necessary for managing procedures. The procedure document storage file 7 stores text data for constructing each procedure.

The text editing portion 8 edits text data merged using a procedure. The paragraph number assigning portion 9 assigns paragraph numbers. The text checking portion 10 checks the content of the edited text.

The transmission file generating portion 11 converts the checked text into data in a transmission format. The transmission format data file 12 stores the converted data into the transmission format. The online application portion 13 transmits the formatted data to outside the terminal equipment.

In FIG. 1, the format of text data externally generated and stored on floppy disks 14 to 16 are converted into the internal text format of the terminal equipment by the text converting portions 1 to 3, respectively, thereby to be inputted thereinto. The procedure generation processing portion 4 combines the text data using the procedure in accordance with the document table, the identifier table, and the item conversion tables stored in the procedure generation reference file 5. The procedure is managed by the procedure management information file 6 and stored by the procedure document storage file 7.

Thereafter, the text data associated with the procedure is edited by the text editing portion 8 and assigned paragraph numbers by the paragraph number assigning portion 9. The text of the edited procedure document is checked by the text checking portion 10.

Thereafter, the checked procedure document is converted into the transmission format by the transmission file generating portion 11 and then temporarily stored in the transmission format data file 12. Thereafter, the converted data are transmitted externally by the online application portion 13 from the terminal equipment.

Thus, since various externally generated text data formats are converted and merged using this procedure, the data can be stored, managed, edited, checked, and transmitted.

FIG. 2 is a block diagram showing the construction of an image merging portion of the terminal equipment in accordance with the present invention.

The text content file 17 stores a text including identifiers and image insertion marks.

The text merging information file 18 stores text merging information such as the frame size of image data.

The image file 19 stores image data.

The merging controlling portion 20 merges image data with text data.

The display input controlling portion 21 displays an image, frame size, scale, text, and so forth on a screen.

A text is retrieved from the text content file 17. Thereafter, an identifier or an image placement mark is searched and detected from the text being retrieved. In accordance with the detected position of the identifier or the image placement mark, a merging start position and a frame size are set to the text merging information file 18 so as to merge the image data in the frame size from the merging start position determined by the merging controlling portion 20. Thereafter, the image data are stored in the image file 19. A merging start position and a frame size are set to the text merging information file 18 so that a designated frame size is merged where the scope in which the frame size is to be cut is designated and a maximum frame size is merged where the scope in which the frame is to be cut is not designated. The image data being cut are stored in the image file 19. The display input controlling portion 21 displays all the image data being read along with the maximum frame size available in the text or the designated frame size in which the size to be cut is designated. Alternatively, the display input controlling portion 21 displays only the image data in the maximum frame size or in the frame size in which the size to be cut is designated and scrolls the image data so as to display the image data in the maximum frame size or the designated frame size in the cutting range. When the image data being read are displayed, the scale in accordance with the size thereof is also displayed. In addition, the text which precedes or the text which follows the merging start position of the image data is displayed, or both these texts are displayed. Moreover, when the image data being read are merged with the text, an identifier with an ascending number is automatically placed into the text line immediately preceding the image data. When image data occur at the boundary between two pages, a page change mark is automatically placed into the text line just preceding the image data. When image data which has been read and merged using text is updated, text data such as the previous line immediately preceding the image data are displayed in a table format. Thereafter, selected image data are displayed and updated.

Thus, in merging image data with a text,

[1] a frame size is automatically set in accordance with the size of the image data,

[2] the image data are cut in accordance with a designated frame size or a maximum frame size and the frame size is automatically set,

[3] the image data to be cut are scrolled so that the operator can select a desired position thereof,

[4] text data such as the text line immediately preceding the image data being merged is also displayed,

[5] a scale in accordance with the size of the image data is displayed,

[6] an identifier is automatically placed to the image data,

[7] if the image data occur at the boundary between two pages, they are automatically moved to the latter page, and

[8] when the image data are updated, text data such as the text line immediately preceding the image data being merged are displayed in a table format so that the operator can readily select and update them.

FIG. 3 is a block diagram showing an online transmission and reception controlling portion of the terminal equipment in accordance with the present invention.

A transmission file generating portion 25 generates a transmission file 22, a reception file 23, and a receipt reception file 24.

A transmission processing portion 26 performs a transmission and reception controlling operation, a transmission status display operation, an automatic receipt request operation, an automatic continuation request operation, and so forth.

A proof check processing portion 27 compares the content of the transmission file 22 with that of the reception file 23 so as to perform a proof check thereof.

A management information file 30 correlates text data (a procedure) with a unique management number so as to manage the transmission statuses ("not transmitted" status, "transmitting" status, "transmitted" status, "transmission result" status, and so forth).

A storage device 28 is provided with the transmission file 22, the reception file 23, and the receipt reception file 24. The display portion 29 displays a procedure (a text) to be transmitted, a transmission status, and a transmission result.

As shown in FIG. 3, in a transmission mode, the transmission file generating portion 25 generates (partitions) the transmission file 22, the reception file 23, and the receipt reception file 24 in the storage device 28. Thereafter, the transmission processing portion 26 transmits text data retrieved from the transmission file 22 through a line to a remote party. Text data received from an opposite party are stored in the reception file 23. Receipt data are stored in the receipt reception file 24. In the transmission mode, the transmission processing portion 26 causes the display portion 29 to display a table of text data (procedures) to be transmitted so as to display which text data is being transmitted (by highlight indication or the like). In addition, the transmission processing portion 26 causes the display portion 29 to display transmission statuses (such as pre-processing status, transmission status, reception status, post-processing status) and the result of replies (such as acceptance or not-acceptance) from the party on a real time basis. When the number of cases of text data (procedures) which have been transmitted exceeds a predetermined number (for example, 300 cases), the transmission processing portion 26 automatically transmits a receipt request to the party while connecting the line. Receipt data received in accordance with the request are stored in the receipt reception file 24. After the line is disconnected, the proof check processing portion 27 compares the content of the transmission file 22 with that of the reception file 23 stored on completion of the transmission and reception so as to perform a proof check thereof. After the transmission is resumed, the transmission processing portion 26 retrieves the transmission status of the management information file 30. When the transmission processing portion 26 detects a "transmitting" status, it retransmits the text data (the procedure) with this management number to the party and then sets the "transmitted" status to the text data.

Thus, when text data necessary for a patent application are transmitted or received on line, the reception file 23 and the receipt reception file 24 are prevented from shorting the storage capacity. A text (procedure) being transmitted and the transmission status can be displayed on a real time basis. A receipt request can be automatically issued so as to receive a receipt. In addition, texts which have not been transmitted can be automatically retransmitted. Consequently, the operator can readily perform online transmitting and receiving operations.

BRIEF DESCRIPTION OF DRAWINGS

FIGS. 6A-6C designate contents of a procedure generation reference file;

FIG. 7 is a schematic diagram showing the content of a procedure management information file;

FIG. 12 is an example of a code conversion table;

FIG. 16A is a schematic diagram showing an example of a procedure selection screen;

FIG. 16B is a schematic diagram showing an example of an intermediate code table;

FIG. 16C is a schematic diagram showing examples of codes;

FIG. 16G is a schematic diagram showing an example of a structure of a structured text file for a patent application;

FIG. 18 is a schematic diagram showing an example of a document selection screen;

FIG. 23 is a schematic diagram showing a text information table;

FIG. 25A is a schematic diagram showing an example of the content of an environmental setting file;

FIG. 25B is a schematic diagram showing an example of the content of a procedure management information file;

FIG. 27A is a schematic diagram showing an operational environment information updating screen;

FIG. 28E is a schematic diagram describing the paragraph number assignment process where a paragraph number assignment mark is present;

FIGS. 30-1 and 30-2 are schematic diagrams describing a transmission file generation process;

FIGS. 31-1 and 31-2 are schematic diagrams describing a text read process;

FIGS. 32-1 through 32-3 are schematic diagram describing a bibliographic information generation and text check process;

FIG. 34 is a schematic diagram showing an item attribute table;

FIG. 35 is a schematic diagram showing an item table;

FIG. 53A is a schematic diagram showing an example of a procedure table screen displayed by the offline application portion;

FIG. 53B is a schematic diagram showing an example of a file name designation screen displayed by the offline application portion;

FIG. 57A is a schematic diagram showing a print range designation;

FIG. 58 is a schematic diagram showing an example of a journal list.

MODES FOR CARRYING OUT THE INVENTION

Here, constructions and operations of various embodiments of the present invention are described in detail.

Figure 4:
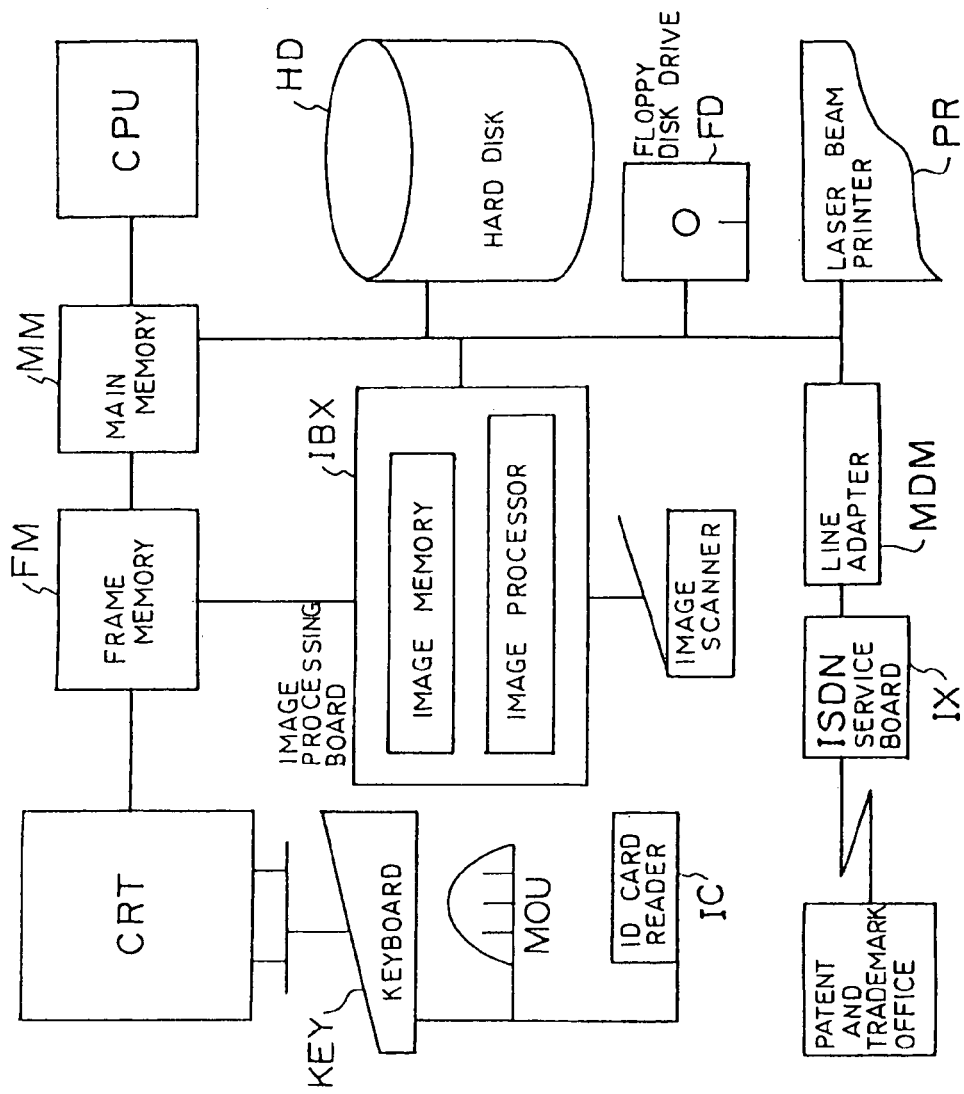
FIG. 4 is a block diagram showing a hardware construction of an electronic application system in accordance with an embodiment of the present invention.

FIG. 4 is a constructional block diagram of hardware of an electronic application system in accordance with an embodiment of the present invention. A CPU is connected to a main memory MM. For example, the CPU loads a program from a hard disk HD and executes the program. By executing the program, various processes and functions (described later) are executed. A frame memory FM is provided in a part of an address space of the main memory MM. By writing data to the frame memory FM, a corresponding video signal is generated and displayed on a display CRT. This process is also executed by the CPU which has loaded the program. The display CRT is connected with a keyboard KEY, a mouse MOU, and an ID card reader IC. With the keyboard KEY and the mouse MOU, a desired command can be issued, that is, a desired function can be commanded. As basic I/O's of the electronic application system, as well as the hard disk HD, the electronic application system is provided with a floppy disk drive FD, a printer PR, a line adapter MDM, and an image processing board IBX. The image processing board IBX is provided with an image processor. Data read from a scanner or the like is stored in an image memory under the control of the image processor. When a particular command is received, the data stored in the image processing memory are outputted to the frame memory FM and then to the display CRT. When a patent application or the like is made, data are transmitted to the Patent and Trademark Office through the line adapter MDM and an ISDN service port IX.

Now a first embodiment of the electronic patent application system is described.

Figure 1:
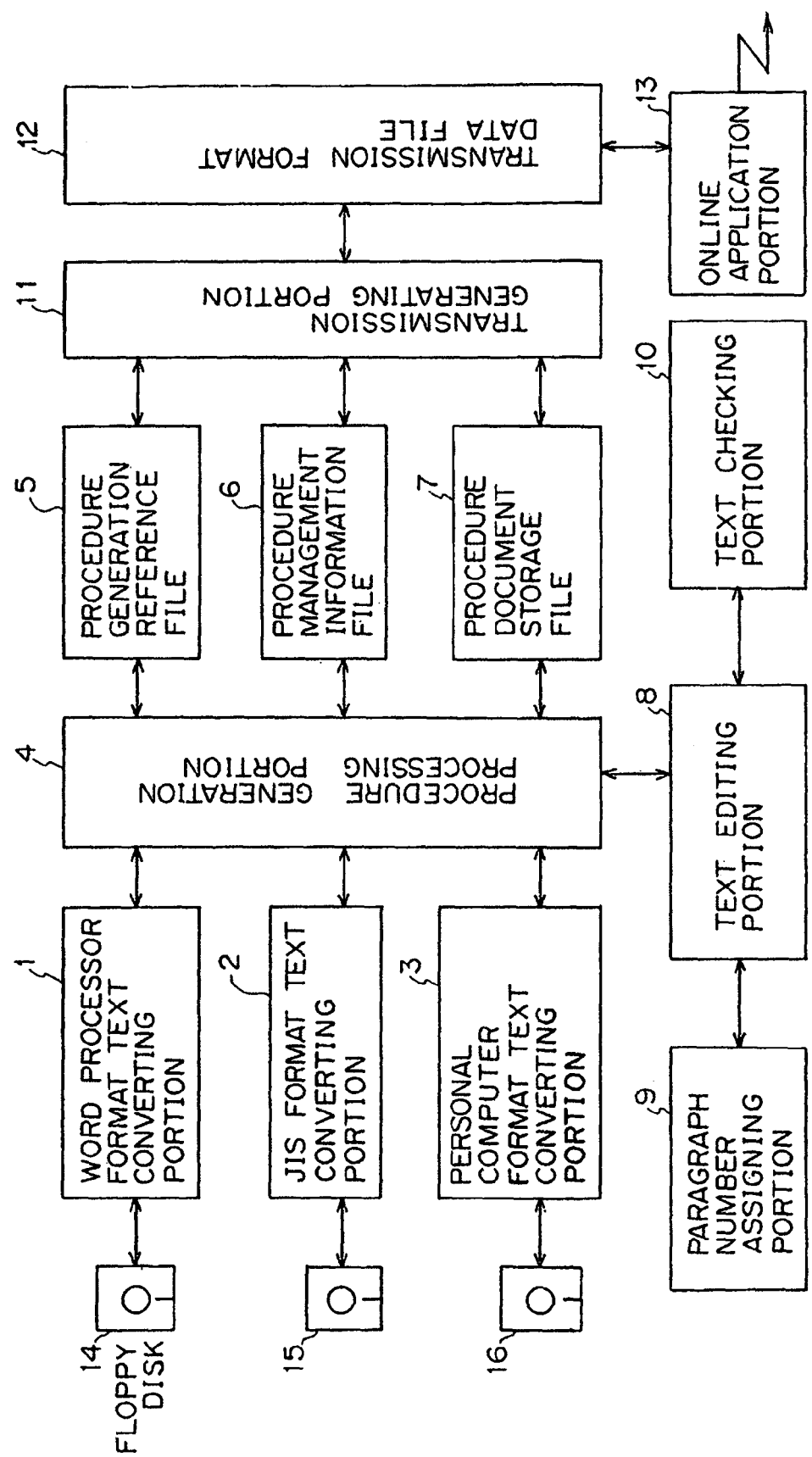
FIG. 1 is a block diagram for explaining the theory the present invention.

As shown in FIG. 1, a word processor format text converting portion 1, a JIS format [or other standard formats defined in various countries, for example, DIN (Deutsche Industrie Normen), ANSI (American National Standards Institute)] text converting portion 2, and a personal computer format text converting portion 3 convert their unique text data formats into the internal text format of the terminal equipment. These converting portions 1, 2, and 3 convert formats of text control codes which define control information of character codes, control codes, and text format into the internal format of the terminal equipment. Conventionally, when respective formats are converted by these converting portions, conversion tables are used to convert their unique formats into the internal format of the terminal equipment.

Figure 5:
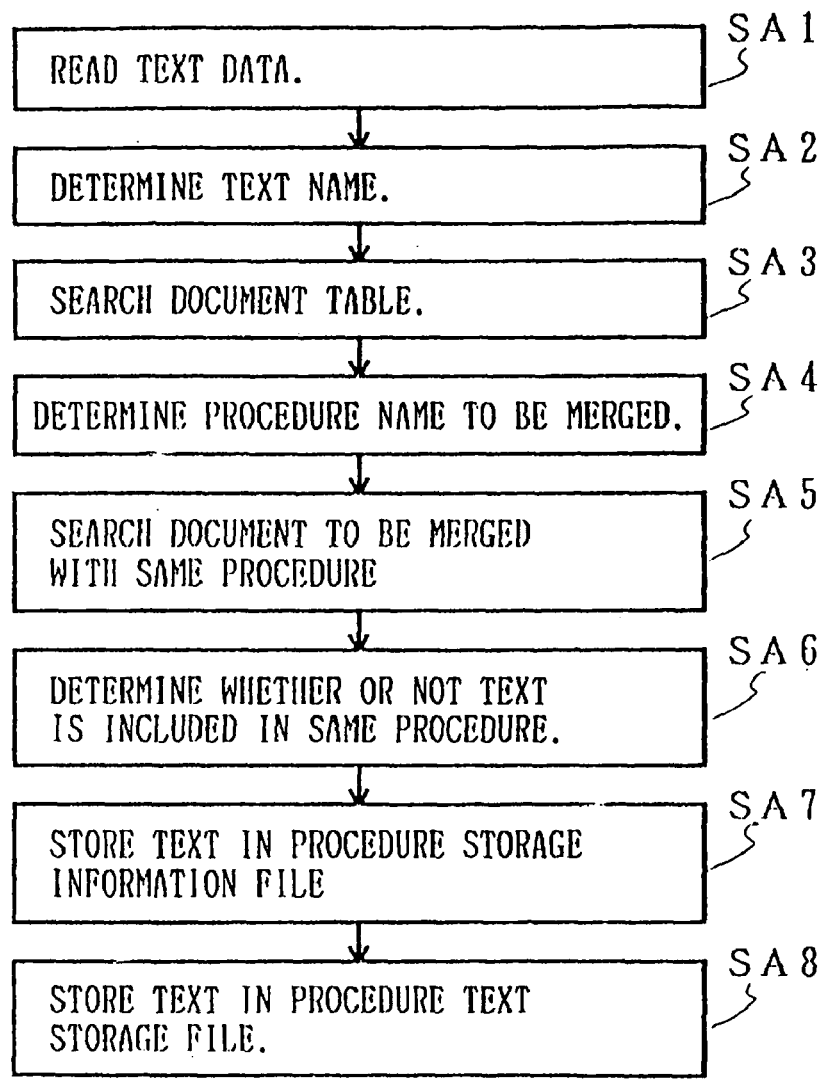
FIG. 5 is a control flow chart of a procedure generation processing portion.

FIG. 5 is a control flow chart for describing a process of a procedure generation processing portion 4 in accordance with a first embodiment of the invention. FIG. 6A is a schematic diagram showing the contents of a document table. FIG. 6B is a schematic diagram showing the contents of an identifier table. FIG. 6C is a schematic diagram showing the contents of a description item converting table (four-law category). FIG. 7 is a schematic diagram showing the contents of a procedure management information file 6.

Next, the process of the procedure generation processing portion 4 is described with reference to the control flow chart of FIG. 5.

At step SA1, the procedure generation processing portion 4 reads text data which have been converted into the internal text format of the terminal equipment. At step SA2, the procedure generation processing portion 4 determines the name of the text. The contents of bibliographic items of the procedure documents for the electronic applications are identified with identifiers. Thus, by searching for an identifier referred to as [text name] and checking the description associated with the identifier at step SA2, the name of the text can be determined.

After the text name is determined, at step SA3, a document table shown in FIG. 6A is searched from the tables included in the procedure generation reference file 5. Thereafter, at step SA4, when the text name being determined is "patent application", for example, data with the document name "patent application" is searched from the document table. Thus, it is determined that the procedure name is "application" and the document category is "main document". Thereafter, at step SA5, all data whose procedure names are "application" are searched from the document table. Thus, the document names are read. At step SA6, it is determined that documents such as "patent application preamble", "specification", "drawings", and "abstract" should be merged as one procedure. Thereafter, its document name is read in an order in which a text conversion is performed and it is determined whether or not the document is included in the same procedure. Thus, the procedure generation process is performed.

In this procedure generation process, the relation between procedures and documents included therein are treated as a hierarchical structure. Thus, a text structure should be defined in this structure so as to manage the procedure documents.

For example, when a specification contains several hundred pages of text data, it can be divided into "specification M1", "specification M2", ..., and so forth.

At SA7 of FIG. 5, such management information is stored in a procedure management information file 6. At step SA8, each of the text data constructing each of the procedures is stored in a procedure document storage file 7.

When the procedure generation processing portion 4 inversely converts the internal format of a document stored in the procedure document storage file 7 into an external format by using the management information stored in the procedure management information file 6, text data merged by a procedure can be separated into several parts or a plurality of parts of text data stored and merged.

The text editing portion 8 edits text data merged with a procedure. The text editing portion 8 performs conventional text generation and update operations. However, when the text editing portion 8 operates along with the procedure generation processing portion 4, a text can be generated and updated procedure by procedure.

Figure 8:
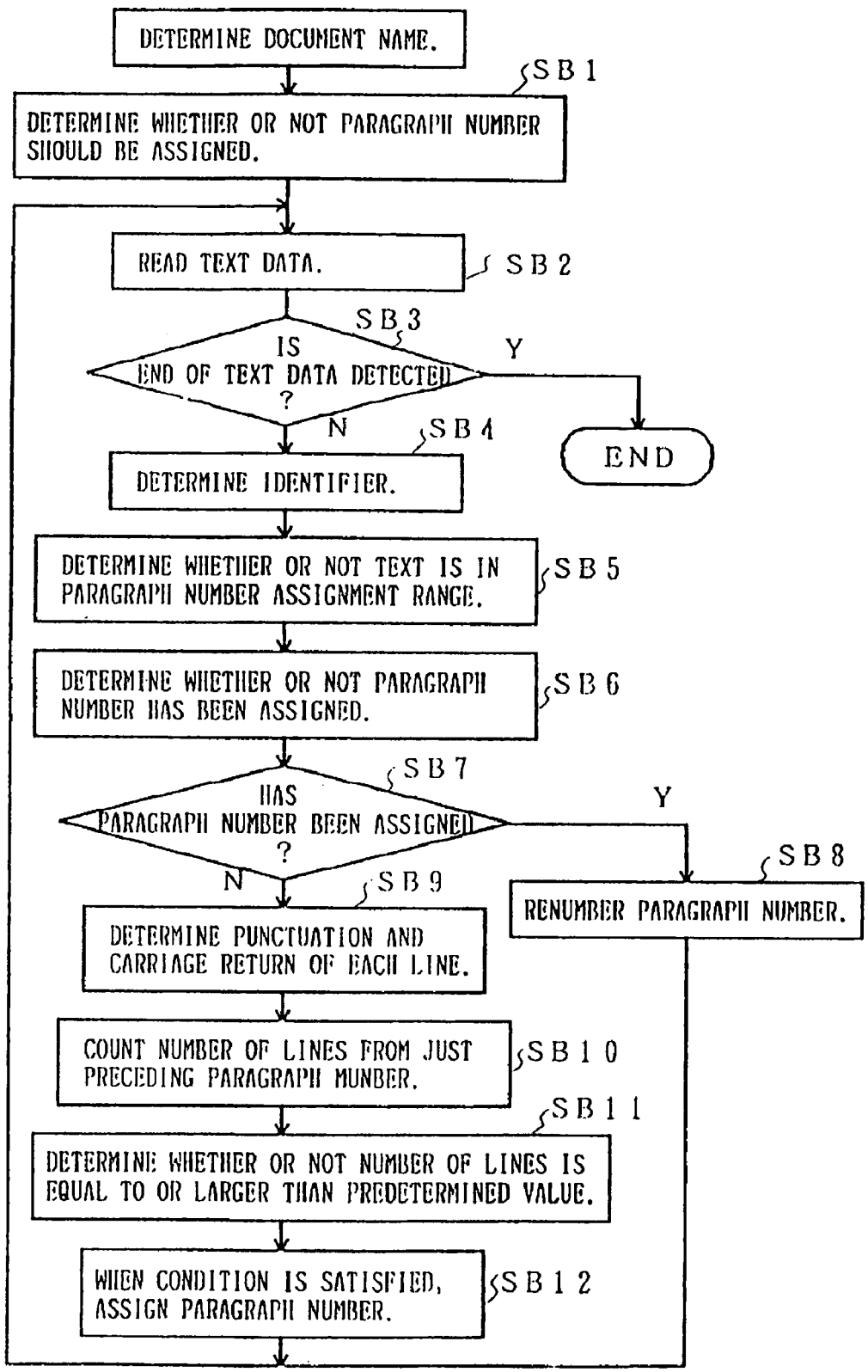
FIG. 8 is a control flow chart of a paragraph number assigning portion.

FIG. 8 is a control flow chart showing a process of a paragraph number assigning portion 9. At step SB1, the paragraph number assigning portion 9 determines a text name by using the management information stored in the procedure management information file 6 and determines whether or not a paragraph number should be assigned. At step SB2, when a paragraph number should be assigned, text data stored in the procedure document storage file 7 is read. Thereafter, an identifier of the text is checked to determine whether or not the text is in a predetermined paragraph number assignment range.

When a [Detailed Description of the Invention] is determined as an identifier, it is determined that the text associated with this identifier is in the paragraph number, assignment range. When a [Brief Description of the Drawings] or the end of text is detected at step SB3, the assignment of a paragraph number is ended. Unless a [Brief Description of the Drawings] or the end of text has not been detected, at step SB4, an identifier is determined. Thereafter, at step SB5, it is determined whether or not the text is in the paragraph number assignment range. At step SB6, it is determined whether or not the paragraph number has been assigned. When the determined result at step SB7 is YES, that is, the paragraph number has been assigned, at step SB8 the paragraph number which has been assigned is renumbered in an incrementing order rather than newly assigned. When the determined result at step SB7 is NO, that is, the paragraph number has not been assigned, data of each line of the text is determined at step SB9. Thereafter, at step SB10, when the last line of the text ends with a punctuation code and a carriage return code and the number of lines counted from the immediately preceding paragraph number is equal to or larger than a predetermined value at step 11, a paragraph number is assigned between the punctuation code and the carriage return code.

When the number of the line being counted is smaller than the predetermined value, the paragraph number assigning portion 9 determines the next line rather than assigning a paragraph number. When this condition is satisfied at step SB12, a paragraph number is assigned to the text.

Thereafter, this process is repeated until an end of the paragraph number assigning process is detected. Thus, paragraph numbers can be optimally assigned to target text data.

The text checking portion 10 reads text data of a procedure document and checks whether or not the text contains an error. When the text checking portion 10 detects an error, it informs the operator.

Thus, the text checking portion 10 reads text data stored in the procedure document storage file 7 and checks the content of the text by using the management information such as the procedure name, the document name, and the text file name of the target procedure document stored in the procedure management information file 6.

The text checking process includes steps for checking character codes and control codes in text data, identifiers placed therein, and contents of description following identifiers, and for checking contents of description of related identifiers each other.

These checking steps are performed by searching the identifier table and the description item conversion table included in the procedure generation reference file 5.

FIG. 6B is a schematic diagram showing the contents of an identifier table. FIG. 6C is a schematic diagram showing an example of a four-law category conversion table included in the description item conversion table.

The text checking portion 10 reads target text data to determine an identifier; searches the identifier table to check whether or not the identifier is correct; references different information such as attribute, the number of columns, conversion method, description item conversion table name, and so forth which are stored in the identifier table; and checks the description item following the identifier. In this case, when a description item conversion table name is present, the table is searched and the information therein is checked.

The text checking portion 10 performs the process for all identifiers present in the text so as to determine whether or not the procedure document has been correctly prepared.

The transmission file generating portion 11 converts the format of a completed text into the transmission format so as to transmit a procedure to outside the terminal equipment.

The transmission format data for use in an electronic application is constructed of a bibliographic information portion for storing data such as an application preamble included in a header portion and a document information portion for storing data such as a specification, drawings, an abstract, and so forth included in a body portion.

The information necessary to convert text data stored in the internal text format of the terminal equipment into the transmission format is stored in the procedure generation reference file 5 and the procedure management information file 6. Thus, in a similar process of the text checking portion 10, the transmission file generating portion 11 searches these files and performs the conversion process so as to generate the transmission format data.

The online application portion 13 transmits the generated transmission format data to outside the terminal equipment.

Next, the construction and an operation of another embodiment are described in detail with reference to FIGS. 9 to 28.

Figure 9:
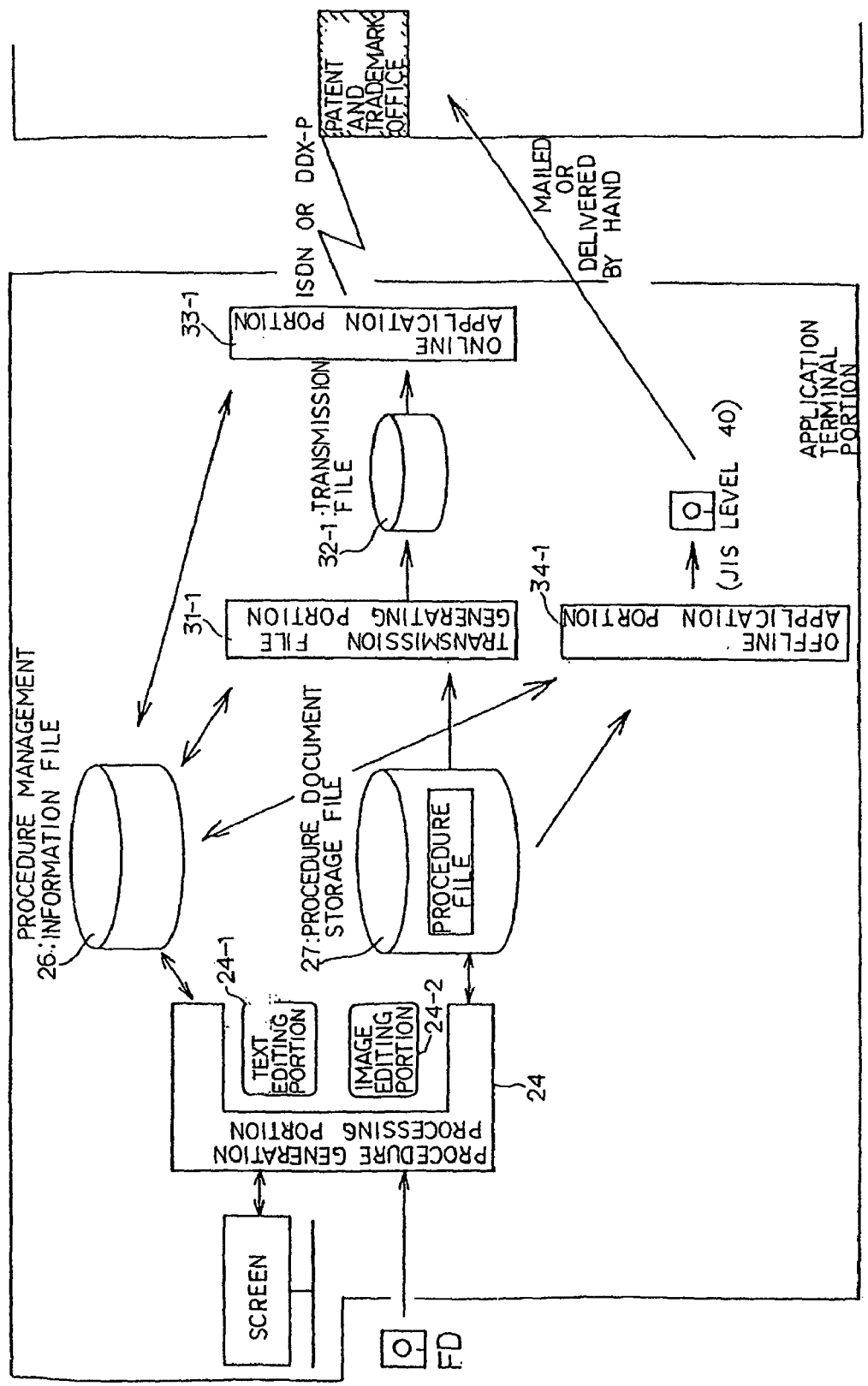
FIG. 9 is a block diagram showing a construction of the entire system in accordance with the present invention.

FIG. 9 is a constructional block diagram showing an entire system in accordance with the present invention.

[1] A procedure generation processing portion 24 automatically reads text data from an FD (floppy disk) and converts the format thereof into the internal format of the terminal equipment. Thereafter, the procedure generation processing portion 24 accesses a procedure management information file 26 or the like so as to generate a hierarchically structured procedure file in a procedure document storage file 27. (This process is described later with reference to FIG. 10.)

The procedure generation processing portion 24 is provided with a text editing portion 24-1 and an image editing portion 24-2 which edit a text and an image, respectively.

[2] A transmission file generating portion 31-1 retrieves a hierarchically structured procedure file from the procedure document storage file 27 and converts the format of the procedure file into the transmission format. The resultant data are stored in a transmission file 32-1.

[3] An online application portion 33-1 retrieves data from the transmission file 32-1 and transmits them to the Patent and Trademark Office as a patent application or a utility patent application through an ISDN network or a DDX-P network. Alternatively, an offline application portion 34-1 retrieves a procedure file from the procedure document storage file 27 and stores it on a floppy disk in JIS level 40. The floppy disk storing the file is mailed or delivered by hand to the Patent and Trademark Office.

Next, a third embodiment is described with reference to the constructional block diagram of FIG. 10.

Figure 10:
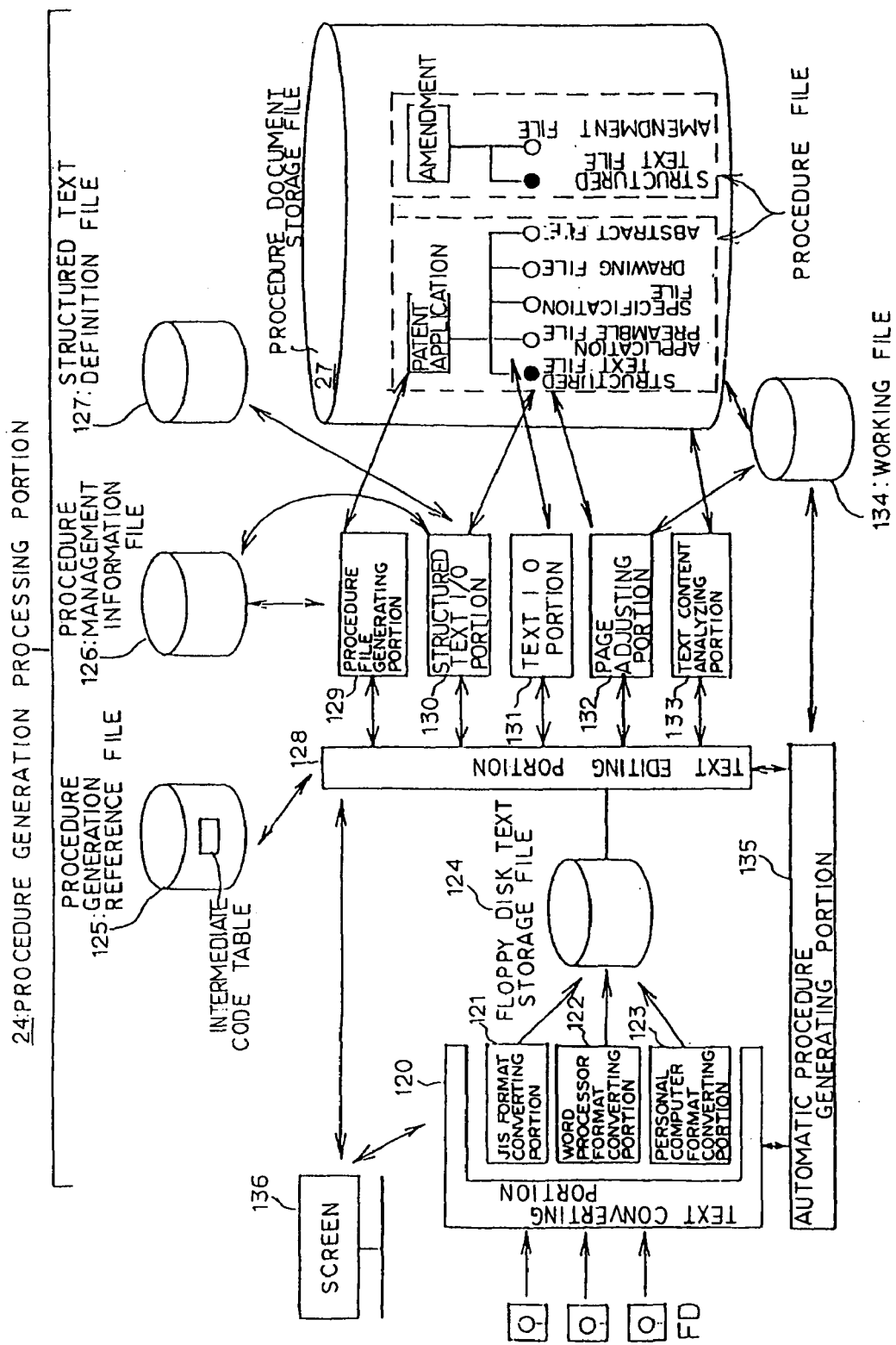
FIG. 10 is a block diagram showing another embodiment in accordance with the present invention.

In FIG. 10, a text converting portion 120 reads text data from an FD (floppy disk), converts the format of the text data into the internal format of the terminal equipment, and stores the resultant data in a floppy disk text storage file 124. The text converting portion 120 is provided with a JIS format converting portion 121, a word processor format converting portion 122, a personal computer format converting portion 123, and so forth. The JIS format converting portion 121 reads text data written in JIS format from an FD and converts the format of the text data into the internal format of the terminal equipment. The word processor format converting portion 122 reads text data written in a word processor format (for example, OASYS format used in word processors marketed by Fujitsu Limited) from an FD and converts the format of the text data into the internal format of the terminal equipment. The personal computer format converting portion 123 reads text data written in a personal computer format (for example, MS-DOS format) from an FD and converts the format of the text data into the internal format of the terminal equipment. (The processes performed by these converting portions 121, 122, and 123 are described in detail later with reference to FIGS. 11 and 12.)

A procedure generation reference file 125 stores an intermediate code table and so forth.

A procedure management information file 126 stores procedure management information.

A structured text defining file 127 stores a sample of a definition of a hierarchically structured text.

A text editing portion 128 generates and edits a patent text through a screen procedure by procedure in liaison with a procedure file generating portion 129 for generating a hierarchically structured procedure file; a structured text I/O portion 130 for inputting and outputting a structured text; a text I/O portion 131 for inputting and outputting a text; a page adjusting portion 132 for preventing an image from occurring at the boundary between two pages; a text content analyzing portion 133 for retrieving a field name embedded with control symbols (for example, [ ]) from text data, and so forth.

A procedure document storage file 27 stores hierarchically structured procedure files as shown in the figure. In this example, an application preamble file, a specification file, a drawing file, and an abstract file which have actual data are linked from a structured text file containing information necessary for hierarchically structuring a patent application. Thereby, one procedure file is constructed as a whole.

A working file 134 temporarily stores text data or the like in an edit mode.

An automatic procedure generating portion 135 automatically generates a procedure file for a patent text which is read from an FD (floppy disk) in liaison with the text converting portion 120 and the text editing portion 128.

Figure 13:
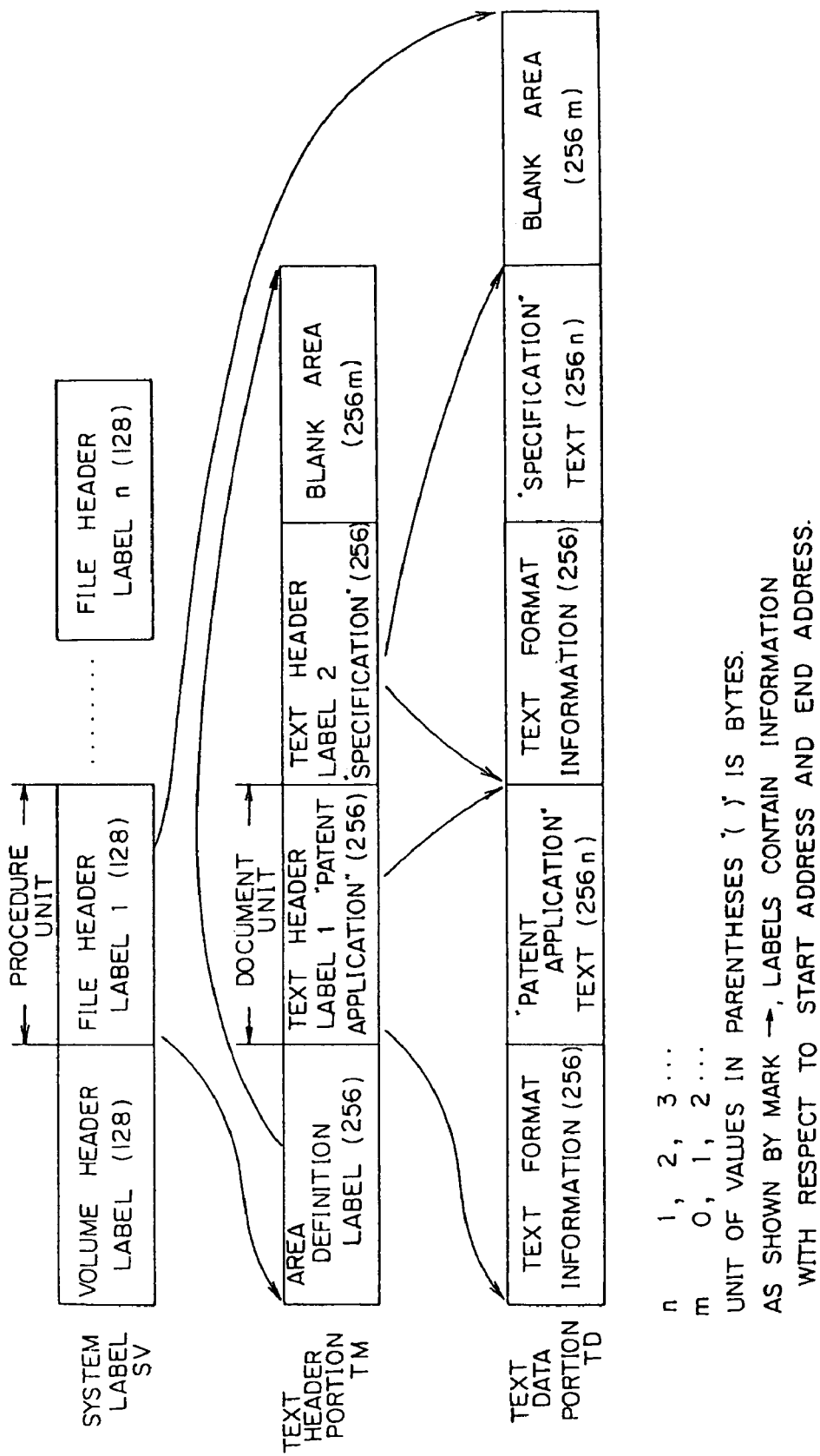
FIG. 13 is a schematic diagram showing a construction of a JIS file of a text stored in accordance with the JIS format.
Figure 14:
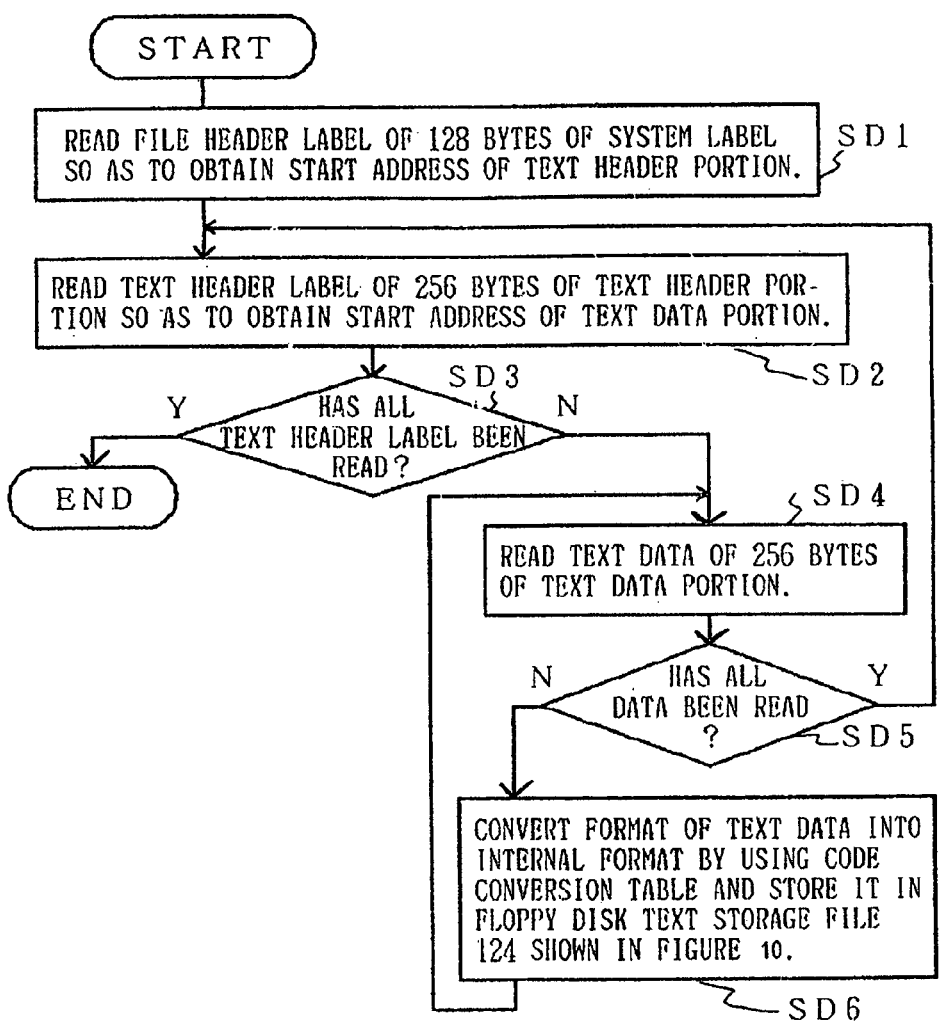
FIG. 14 is a flow chart of a code conversion process for a JIS file.

Next, the process shown in FIG. 13 is practically described with reference to FIGS. 11 to 16.

Figure 11:
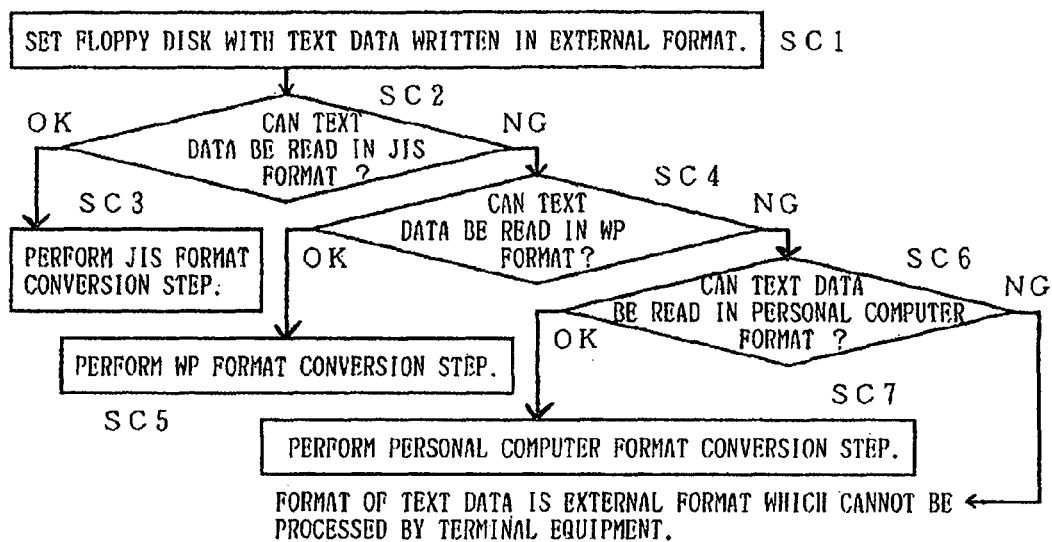
FIG. 11 is a control flow chart of an automatic medium identification control process.

(1) A process for automatically determining the text format of a floppy disk, for reading the text data, and for converting the format thereof into the internal format of the terminal equipment is described in detail in accordance with the steps shown in FIG. 11, with reference to FIG. 12.

At step SC1 in FIG. 11, a floppy disk in an external format is set. In other words, a floppy disk storing a patent text generated with a word processor or the like is set to the electronic application terminal equipment. At step SC2, the text is read in JIS format. That is, the first three bytes are read from track 0, sector 7, and side 0 (front side) of the floppy disk so as to determine whether the three bytes are VOL or the like in JIS codes. When the determined result is YES (OK), since it is determined that the text has been written in the JIS format, a JIS format conversion is performed at step SC3. In other words, the text data read from the floppy disk are converted from the JIS format into the internal format of the terminal equipment by referencing a code conversion table shown in FIG. 12. Thereafter, the resultant text data are stored in the floppy disk text storage file 124. When the determined result at SC2 is NO (NG), a format other than the JIS format is determined. Thus, the process advances to step SC4.

At step SC4, the text is read in WP format (or word processor format). When the WP format is, for example, OASYS format (the format of texts generated by word processors marketed by Fujitsu Limited), the first three bytes are read from track 0, sector 7, and side 0 (front side) of the floppy disk being set and it is determined whether or not the three bytes are VOL in EBCDIC codes. When the determined result at SC4 is YES (OK), since it is determined that the text has been written in WP format, at step SC5 the text data being read from the floppy disk is converted from the WP format into the internal format of the terminal equipment. Thereafter, the resultant text data are stored in the floppy disk text storage file 124. When the determined result at step SC4 is NO (NG), since it is determined that the format of the text data are other than the WP format, the process advances to step SC6.

At step SC6, the text data are read in personal computer format. That is, when the text data have been written in personal computer format such as MS-DOS, it is determined whether or not the first four bytes of track 0, sector 1, and side 0 (front side) of the floppy disk being set are IPL1 in JIS codes. When the result determined at SC6 is YES (OK), since it is determined that the text has been written in the personal computer format, the process advances to step SC7. At step SC7, which is the personal computer format conversion step, the text data being read from the floppy disk are converted from the personal computer format into the internal format of the terminal equipment. Thereafter, the resultant text data are stored in the floppy disk text storage file 124. When the determined result at step SC6 is NO (NG), since the format of the text data is other than a format which can be processed by the terminal equipment, a step for determining whether the text has been written in which format is performed or a message which reads that the format of the text data cannot be converted is displayed.

In the above process, the operator needs only set to the electronic application terminal equipment a floppy disk and need not input text data generated outside thereof and need not designate the format of the text data. In other words, the terminal equipment automatically determines the format thereof, converts it into the internal format of the terminal equipment, and retrieves the text data. Thus, a procedure file can be generated automatically.

FIG. 12 is a schematic diagram showing an example of a code conversion table for converting the format of text data from the JIS format into the internal format of the terminal equipment. For example, the code of the text data "あ (a) (Japanese Kana)" in the JIS format is "2422" (in hexadecimal notation) is equivalent to "a4a2" in the internal format.

FIG. 13 is a schematic diagram showing a construction of a JIS text file stored in the JIS format. As shown in FIG. 13, a JIS text file is constructed of a system label SV, a text header portion TM, and a text data portion TD. The system label SV is further constructed of a volume header label of 128 bytes and file header labels 1 to n, each of 128 bytes. Each of the file header labels 1 to n is a procedure unit. The file header label 1 represents a text header portion TM. The text header portion TM is constructed of an area definition label (256 bytes), a text header label 1 "patent application" (256 bytes), a text header label 2 "specification" (256 bytes), and a space area (256 bytes×n). The area definition label (256 bytes) also represents the last position of the text header. In addition, the file comprises a label which represents text format information and each text in the text data portion TD in units of the text. For example, the text header label 1 "patent application" represents the text format information of 256 bytes and the text "patent application" of 256×1 bytes. The header label 2 "specification" represents the text format information of 256 bytes and the text "specification" of 256×q bytes. In such a three-level construction, a JIS file is formed. Codes which are read from this JIS file are converted in accordance with a process flow chart (for JIS codes) shown in FIG. 14.

When the conversion process is started (START), the process advances to step SD1. At step SD1, the file header label (of 128 bytes) of the system label SV is read so as to obtain the start address of a target text header portion. The file header label of the system label is a file header label of the corresponding text. Thereafter, at step SD2, a text header label of 256 bytes of the text header portion TM is read so as to obtain the start address of the text data portion. Thereafter, at step SD3, it is determined whether or not the entire text header label of the text header has been read. When the entire label has been read (determined result is YES), the process is ended (END). When the entire label has not been read (the determined result is NO), at step SD4, the text data of 256 bytes are read. Thereafter, at step SD5, it is determined whether or not all the data have been read. When all the data have not been read, at step SD6, the format of the data is converted into the internal format of the terminal equipment by using the code conversion table and then the resultant data are stored in the floppy disk text storage file 124, shown in FIG. 10. When all the data have been read (the determined result is NO), the process returns to step SD2 so as to read all the text. Thereafter, at step SD5, the format of the text data is converted into the internal format of the terminal equipment.

Figure 15:
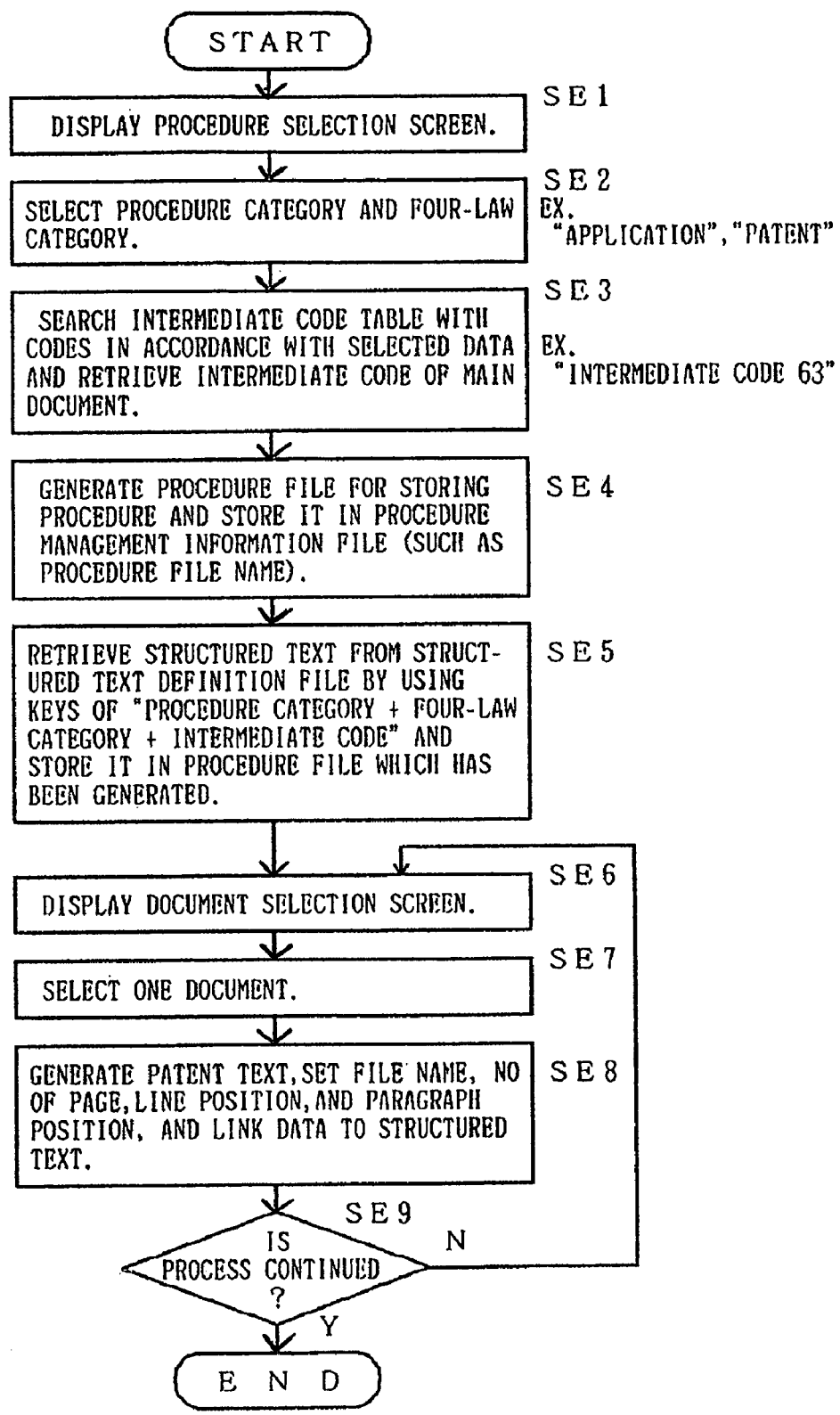
FIG. 15 is a flow chart of a procedure file generation process.

(2) A process for generating a hierarchically constructed procedure file by using retrieved text data is described in detail in accordance with the steps shown in FIG. 15, with reference to FIGS. 16A to 18.

At step SE1 in FIG. 15, a procedure selection screen is displayed. For example, a procedure selection screen as shown in FIG. 16A is displayed as the screen 136 shown in FIG. 10.

At step SE2, a procedure document and a four-law category are selected. For example, on the procedure selection screen shown in FIG. 16A (at step SE1), a procedure document of "application" and a four-law category of "patent" are selected with the mouse.

At step SE3, with codes according to the data selected at step SE2, the intermediate code table is searched so as to retrieve an intermediate code of the main document. For example, in accordance with "application" and "patent" which are selected at step SE2, as shown in "Code Example" of FIG. 16C, based on "1" for "application" and "1" for "patent", an intermediate code "63" referred to as Ⓐ entry with the procedure "1" and the four-law category "1" of the intermediate code table shown in FIG. 16B is retrieved from the procedure generation reference file 125 shown in FIG. 10.

At step SE4, a procedure file for storing one procedure is generated and then registered in the procedure management information file 126. That is, the procedure file generating portion 129 as shown in FIG. 10 generates in the procedure document storage file 27 a procedure file which comprises a structured text file and patent text files (which are an application preamble file, a specification file, a drawing file, and an abstract file) and assigns a unique number thereto. The procedure file is registered in a way of procedure file name "xxxx (a unique number)", procedure document "1 (application)", four law category "1 (patent)", intermediate code "63", procedure name "patent application", and so forth as shown in an example Ⓑ of a procedure management information file of FIG. 16D.

At step SE5, with keys of a procedure document, a four-law category, and an intermediate code, a structured text is retrieved from the structured text definition file 127 and then stored in a generated procedure file. That is, the structured text I/O portion 130 retrieves a structured text by using keys of "procedure document+four-law category+intermediate code". The structured text is stored as a structured file in the procedure file (shown in FIG. 16E) which has been generated at step SE4 (this operation is described in detail later). In addition, the file name of the structured text file is set to the procedure management information file shown in FIG. 16D.

Figure 17:
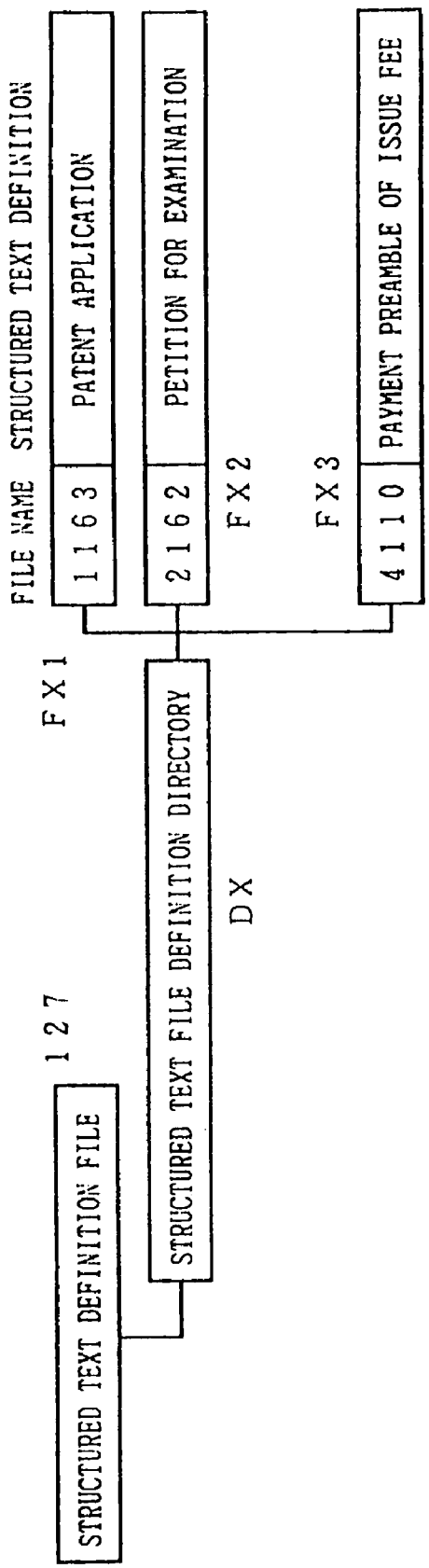
FIG. 17 is a schematic diagram showing a structured text definition file.

FIG. 17 is a constructional schematic diagram of a structured text definition file. The structured text definition file 127 has a structured text file definition directory DX. The structured text file definition directory DX represents files FX1 to FX3 which are, for example, a patent application preamble, a petition for examination, and a payment preamble of a patent issue fee, respectively. In other words, when a procedure category, a four-law category, and an intermediate code are read, the structured text file definition directory DX is searched with these codes so as to read a desired structured text file.

At step SE6, a document selection screen is displayed. For example, a document selection screen as shown in FIG. 18 is displayed on the screen 136. At step SE7, one of the documents is selected. In other words, one of the documents (for example, an application) is selected (for generation or update) from the document selection screen shown in FIG. 18.

At step SE8, a patent text is generated. By setting a file name, the number of pages, a line position, and a level position to a node, the patent text is linked to a structured text. (When a patent text is divided, the line number is changed.) When the "application preamble or petition" and the "generation/update" are selected on the document selection screen shown in FIG. 18, the text I/O portion 131 generates an application preamble file in the procedure file with regard to a selected application preamble. In addition, the structured text I/O portion 130 sets the application preamble file name "A0000001", the number of pages, the line position, the paragraph position, and so forth to node F corresponding to the application preamble in the third level of the structured text file as shown by Ⓒ in FIGS. 16G and 16H. Likewise, a specification file, a drawing file, and an abstract file are set to nodes G, H, and I in the third level of the structured text file, respectively.

At step SE9, it is determined whether or not the process is completed. When the determined result is YES (Y), the process is completed. When the determined result is NO (N), the steps of SE6 and later are repeated.

In the above process, a structured text file is generated in a procedure file generated in accordance with the procedure category and the four-law category selected on the screen. By linking files (an application preamble file, a specification file, a drawing file, and an abstract file) to a structured text file, a patent text is automatically formed in a hierarchical structure. Thus, patent texts can be readily managed and edited.

Figure 16D:
FIG. 16D is a schematic diagram showing an example of a procedure management information file.

FIGS. 16A to 16H are schematic diagrams describing a process for generating a procedure file. FIG. 16A is a schematic diagram showing an example of a procedure selection screen. The procedure selection screen is the screen displayed on the display 136 shown in FIG. 10. On this screen, a procedure category (application, intermediate procedure, payment of issue fee, and maintenance fee) and a four-law category (patent, utility patent, design patent, and trademark) can be selected one after the other.

FIG. 16B is a schematic diagram showing an example of an intermediate code table. This table is used to retrieve an intermediate code necessary for a structured text by using a procedure type or category and a four-law category. In addition, this table is used to retrieve another intermediate code by using a procedure name.

FIG. 16C is a schematic diagram showing an example of a code table. This table lists codes in accordance with fields selected as a procedure category, a four-law category, and so forth by using the mouse on the procedure selection screen shown in FIG. 16A. For example, when the procedure category "application" is clicked with the mouse on the procedure selection screen shown in FIG. 16A, code "1" is generated in accordance with this "application" field.

Next, processes shown in FIGS. 16A, 16B, and 16C are described in detail. When "application" and "patent" are selected as the procedure category and the four-law category, respectively, on the procedure selection screen shown in FIG. 16A, codes "1" and "1" are generated in accordance with the code table shown in FIG. 16C. Thus, the procedure category "1", the four-law category "1", and the intermediate code "63" of the main document record Ⓐ are retrieved from the intermediate code table show in FIG. 16B. In addition, the intermediate code "63" is retrieved in accordance with the "patent application" and the main document record Ⓐ which are automatically recognized and retrieved from text data automatically retrieved from a floppy disk.

FIG. 16D is a schematic diagram showing an example of a procedure management information file. As described at step SE4 of FIG. 15, this table lists an example of management information to be registered in the procedure management information file 126 when a procedure file is generated. For example, the procedure file name is a uniquely assigned number. In addition, the procedure category is "1 (application)"; the four-law category is "1 (patent)"; the intermediate code is "63"; and the procedure name is "patent application".

Figure 16E:
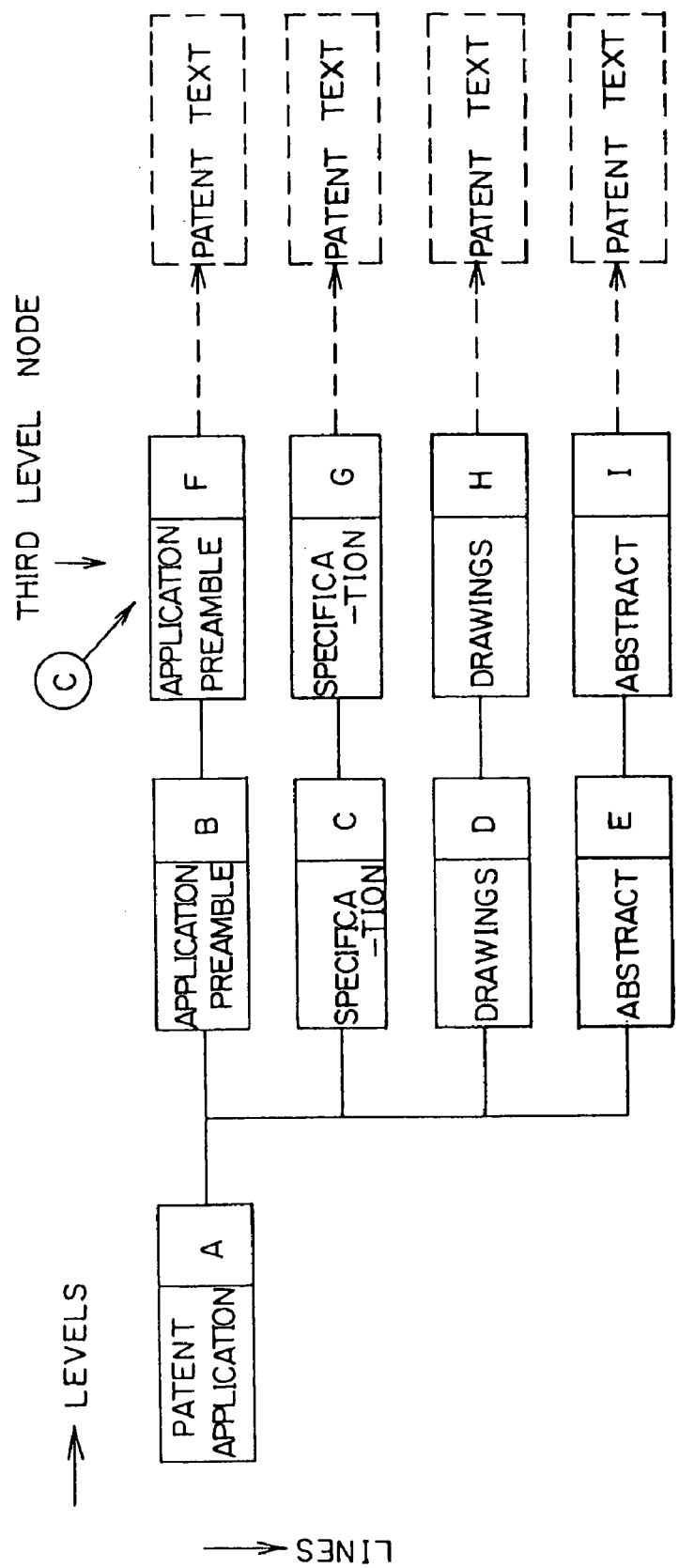
FIG. 16E is a schematic diagram showing an example of a definition of a structured text for a patent application.

FIG. 16E is a schematic diagram showing an example of a structured text definition of a patent application. Each procedure has been defined in the structured text definition file 127. The definition body name of each procedure is "GD+procedure category+four-law category+intermediate code". The definition body defines the sample structure of a procedure. Node A defines nodes B, C, D, and E as dependent nodes. In contrast, nodes B, C, D, and E define node A as their parent node. Nodes are constructed with respect to lines and levels. The contents of patent text files (an application preamble file, a specification file, a drawing file, and an abstract file) within one procedure file are linked from nodes F, G, H, and I positioned in the third level of the structured text file and managed in the hierarchical structure. Thus, in the second level, nodes B, C, D, and E are provided in accordance with patent text categories (an application preamble, a specification, a drawing, and an abstract). In addition, nodes F, G, H, and I, which link the contents of the patent texts, are provided in the third level. Thus, when patent texts are complicated (for example, the specification should be divided into two specifications due to the large number of pages), as shown in FIGS. 16F and 16G, by placing one node in the third level and by pointing to the node in the second level, a plurality of patent texts can be readily managed in a hierarchical structure.

Figure 16F:
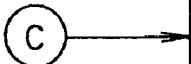
FIG. 16F is a schematic diagram showing an example of node positions.

FIG. 16F is a schematic diagram showing an example of node positions. This figure tabulates with line and level positions the nodes A to I for the structured text definition of the patent application shown in FIG. 16E. For example, the node F referred to as Ⓒ is positioned in line "1" and level "3". Thus, the node F is in accord with the "application preamble".

FIG. 16G is a constructional schematic diagram of a structured text file of a patent application. This figure shows a structured text file where node H, (which is "specification"), is placed in the structured text definition example shown in FIG. 16E.

Figure 16H:
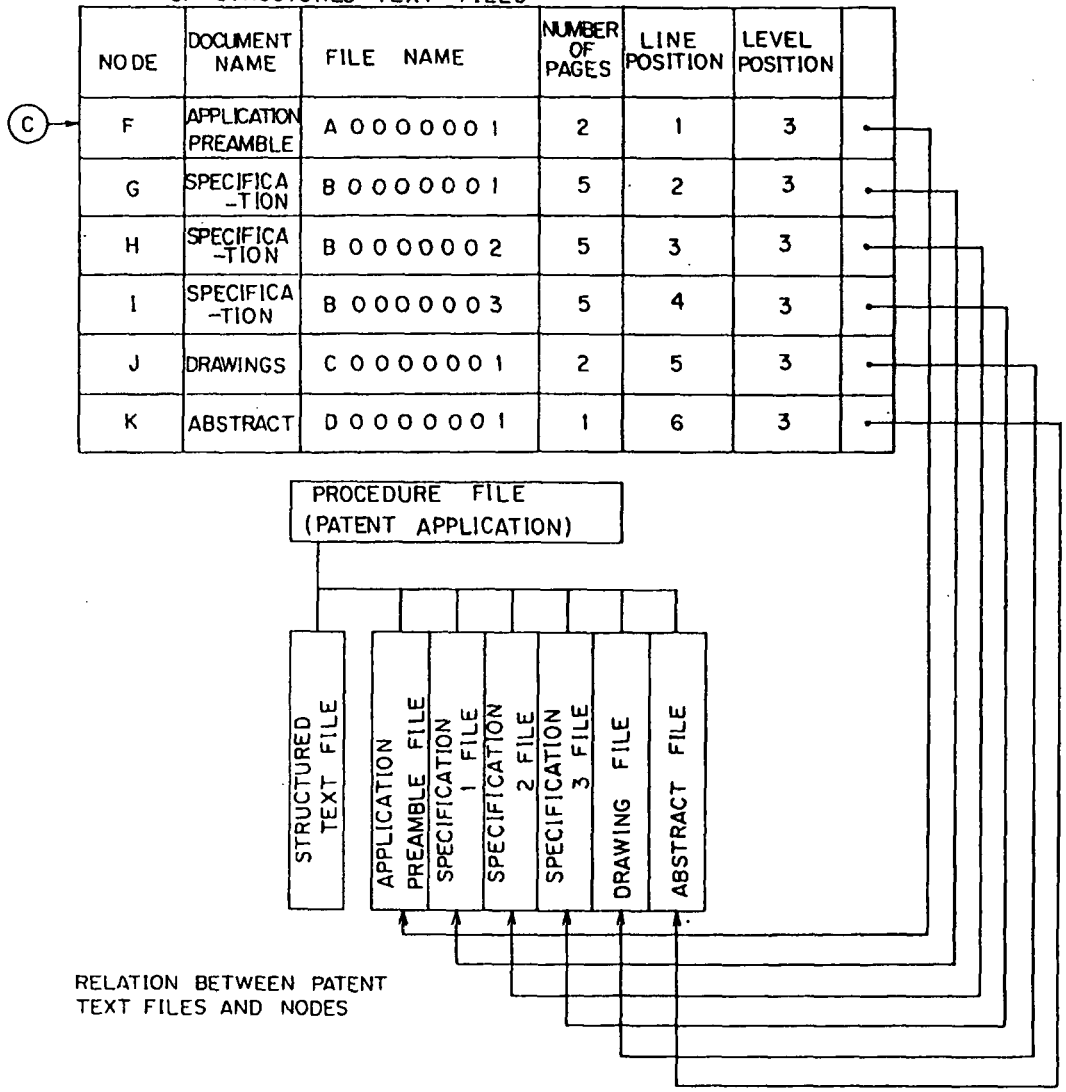
FIG. 16H is a schematic diagram showing the relation between patent text files and nodes.

FIG. 16H is a schematic diagram showing a relation between patent text files and nodes. This figure shows the case where one specification is placed after the node H (specification) in the third level of the structured text file of the patent application shown in FIG. 16G. In other words, the structured text file comprises a total of three specifications. As shown in the figure, each of nodes F to K in the third level contains a document name, a unique file name, the number of pages, a line position, a level position, and so forth.

FIG. 18 is a schematic diagram showing an example of a document selection screen. With respect to document names, i.e., "application preamble", "specification", "drawing", and "abstract", necessary for a procedure name "patent application", various modes such as generation/update, page adjustment, division, floppy disk text, and so forth can be selected on the screen.

[1] When a combination of "text name+generation/update" is selected, the text I/O portion 131 generates a patent text file (an application preamble file, a specification file, a drawing file, or an abstract file) in a procedure file generated by the procedure file generating portion 129 with respect to a selected patent document (application preamble, specification, drawings, or abstract). In addition, the structured text I/O portion 130 sets the content of the patent text file to a corresponding node in the third level of the structured text file. For details, see FIG. 16H. (In the update mode, the contents of the patent text file are not set.)

[2] When a combination of "text name+floppy disk text" is selected, the text converting portion 120 converts text data of an external format into the internal format of the terminal equipment and copies the patent text file (text data) stored in the floppy disk text storage file 124 to a procedure file generated by the procedure file generating portion 129. In addition, the structured text I/O portion 130 sets the content of the patent text file to a corresponding node in the third level of the structured text file (see FIG. 16H).

Figure 19A:
FIGS. 19A and 19B are schematic diagrams describing a text separation.
Figure 19B:
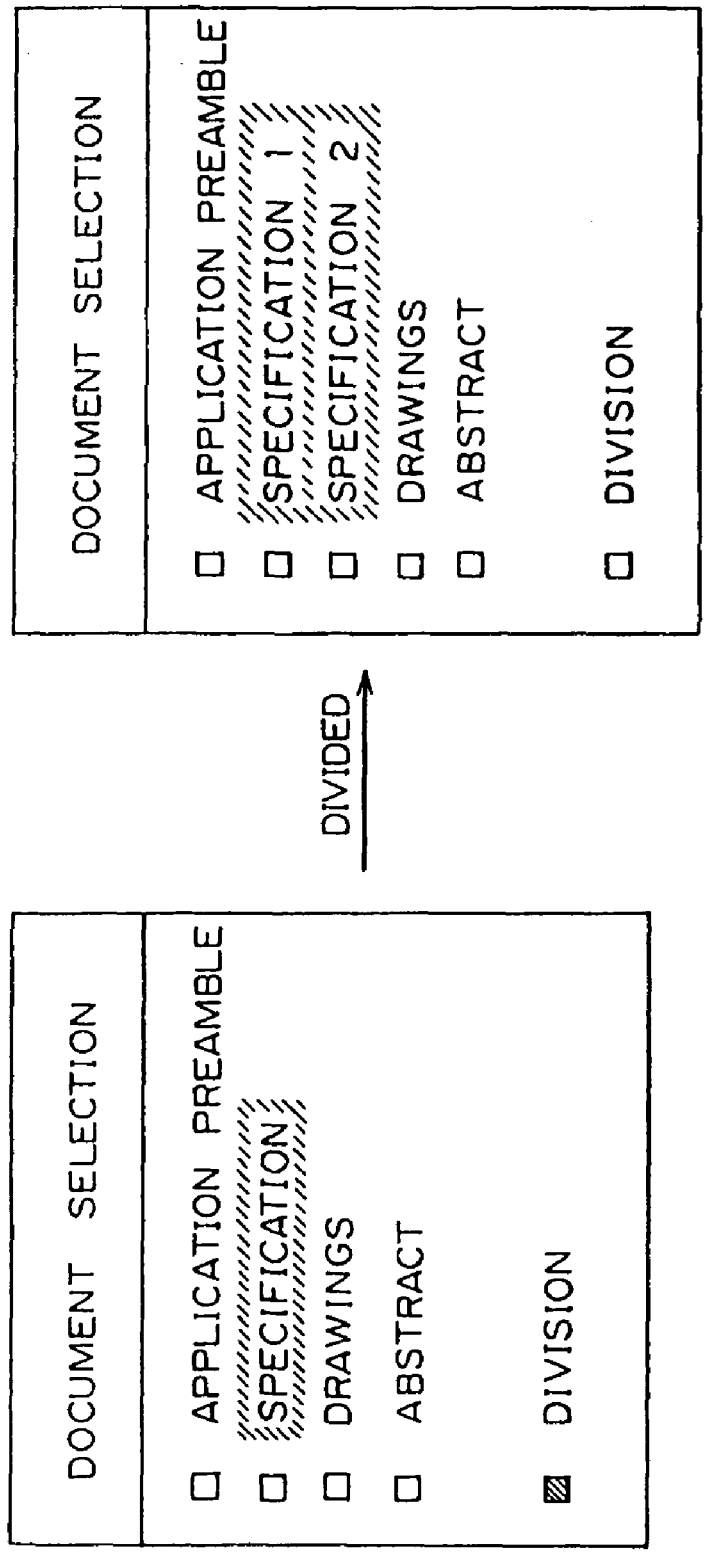

[3] When a combination of "text name+division" is selected, the text I/O portion 131 generates a new patent text file in a procedure file generated by the procedure file generating portion 129 with respect to a selected document. In addition, the structured text I/O portion 130 sets the content of the patent text file to a corresponding node in the third level of the structured text file and changes the structure of the structured text file. In other words, as shown in FIG. 19A, the structure of the structured text file shown in the left side table of FIG. 19A is changed to the right side table thereof. On the right side table, "1" is added to each line position of the drawing and the abstract. Thus, as shown in FIG. 19B, on the document selection screen, the specification is divided into specification 1 and specification 2. In other words, a specification containing several hundred pages can be divided into a plurality of child texts (for example, specification 1, specification 2, ..., specification n). However, when the operator wants to treat a plurality of specifications as one specification, the structured text I/O portion 130 refers to information of nodes in the third level and merges child texts having the same text name.

[4] When "page adjustment" is selected, if a patent text is divided into a plurality of child texts and then merged into one patent text, the page adjusting portion 132 prevents image data from being present at the boundary between two pages. Examples of image data are schematic diagrams, mathematical formulas, and chemical formulas merged with a specification file or a drawing file and so forth.

(3) With reference to FIGS. 20A to 20D and FIG. 21, a page adjustment process is described in detail.

FIGS. 20A to 20D are schematic diagrams describing a page adjustment process. They schematically illustrate a merging operation where a text of specification 1 and a text of specification 2 are merged into one specification.

Image data are merged with text data as a set comprising a frame start code, a frame number, and a frame end code. The line length and so forth of the real image data are retrieved from the position in accordance with the frame number.

Figure 20A:
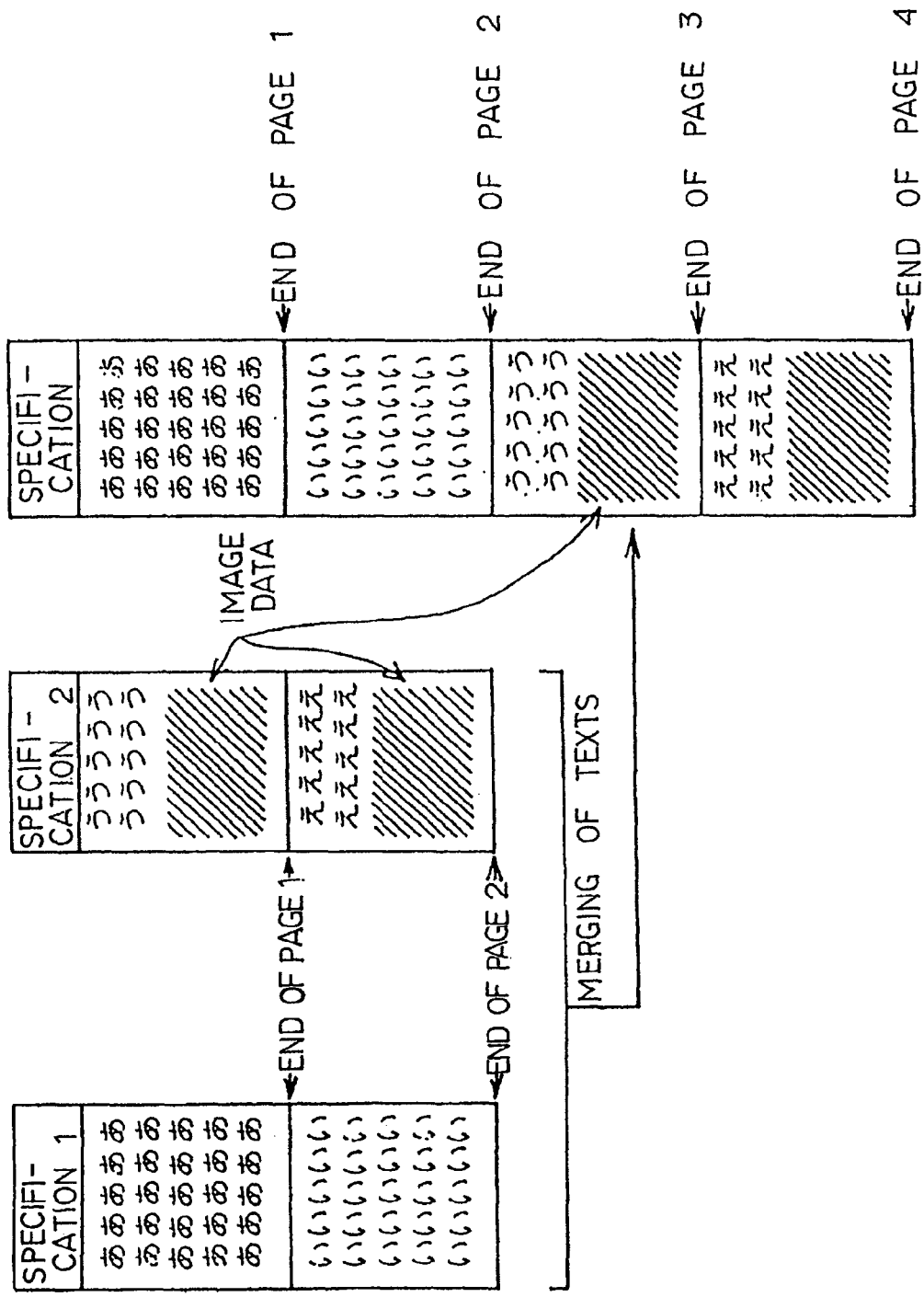
FIG. 20A is a schematic diagram describing a page adjustment process in the case where no "image at page boundary" takes place.

FIG. 20A is a schematic diagram showing a specification in which two texts, specification 1 and specification 2, have been merged. In this case, no image is present at the boundary between two pages.

Figure 20B:
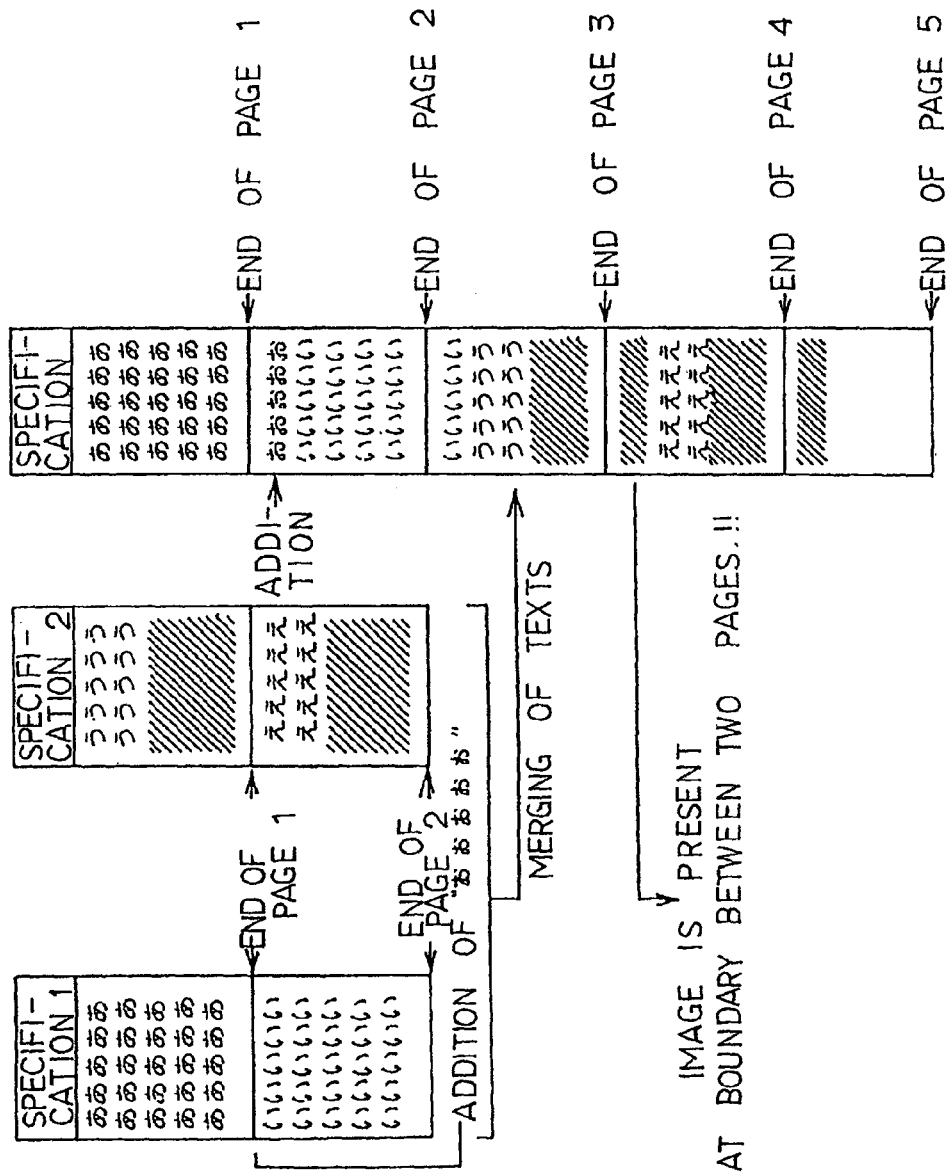
FIG. 20B is a schematic diagram describing the page adjustment process in the case where an "image at page boundary" takes place.

FIG. 20B is a schematic diagram showing a specification in which character string "ょょょょ" is added to the end of the text of specification 1 and then this text is merged with the text of specification 2. In this case, an image is present at the boundary between two pages. In this case, the image should be moved to the next page by the page adjustment process.

Figure 20C:
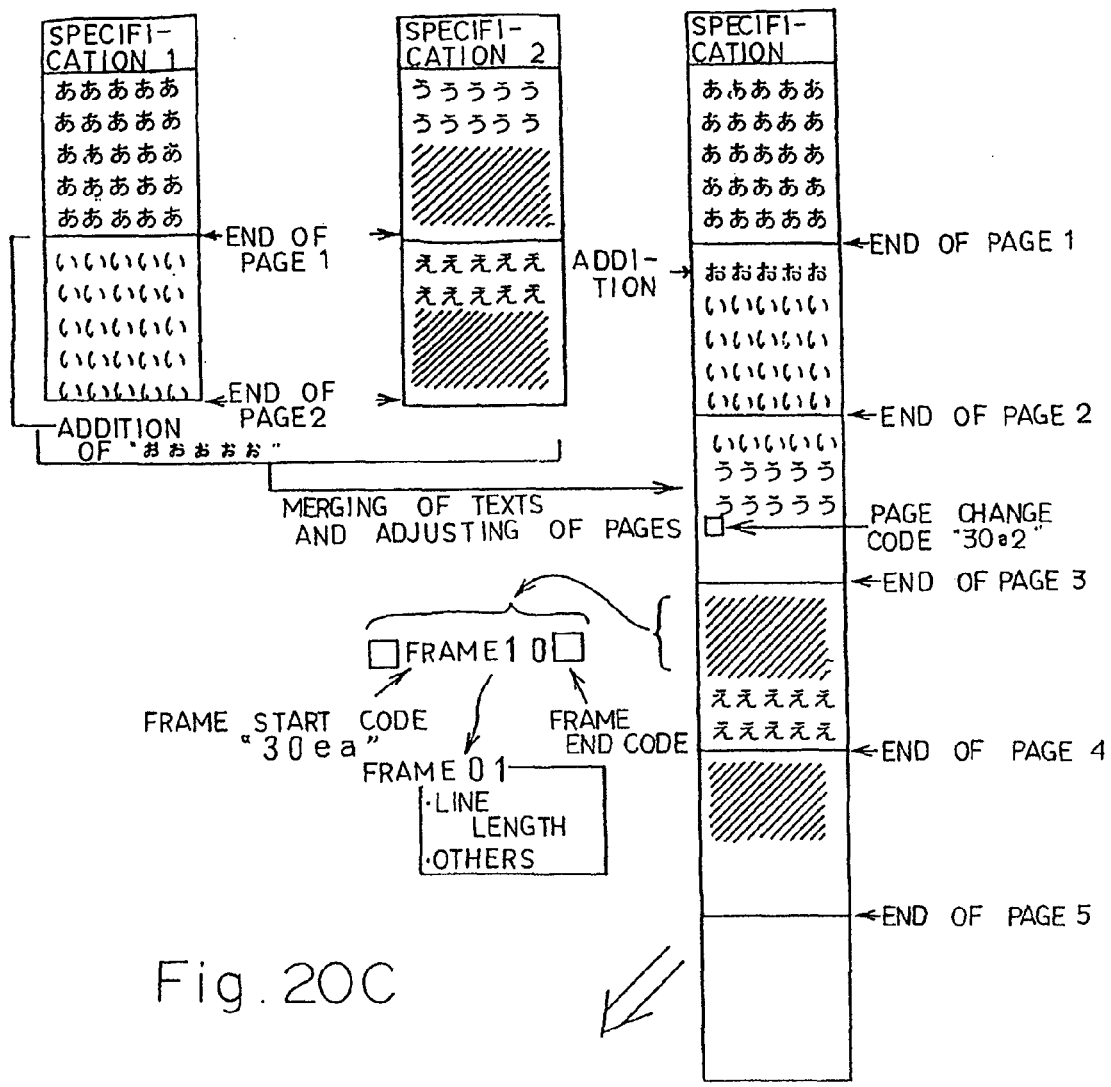
FIG. 20C is a schematic diagram describing the page adjustment process where the "image at page boundary" is solved.

FIG. 20C is a schematic diagram showing a specification in which an "image at page boundary or bridging" of FIG. 20B is solved. In other words, since it is determined that image data occur at the boundary between pages 3 and 4 in FIG. 20B, a page change (page break) code □ is placed just before an image data start mark in page 3 (a frame start code, for example, 30ea), and then the image data are moved to page 4. Thus, the "image at page boundary" can be prevented.

Figure 20D:
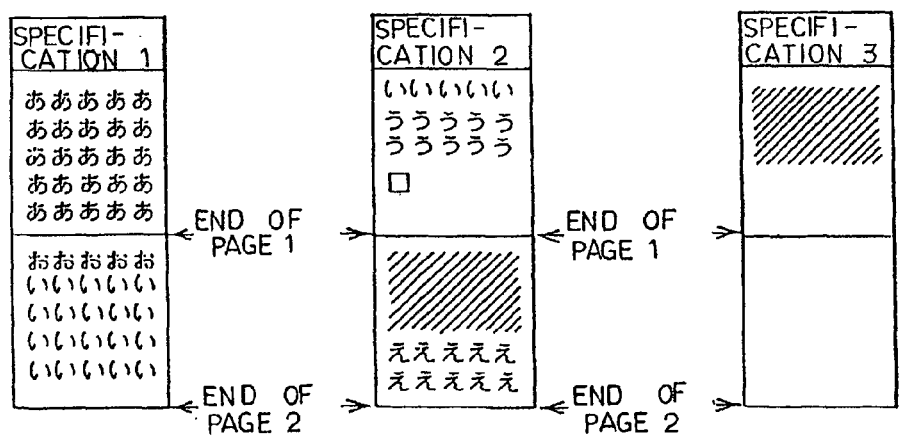
FIG. 20D is a schematic diagram describing the page adjustment process where a text is divided into child texts.

FIG. 20D is a schematic diagram showing the case where the right hand specification of FIG. 20C is managed as three subtexts or child texts (specification 1, specification 2, and specification 3), each child text being two pages.

As schematically described, when texts are merged, if image data are present at the boundary between two pages, a page change code is placed just before the image data and the image data are moved to the beginning of the next page. Thus, as shown in FIG. 20C or FIG. 20D, where child texts of up to two pages are managed, pages of text are adjusted.

Figure 21:
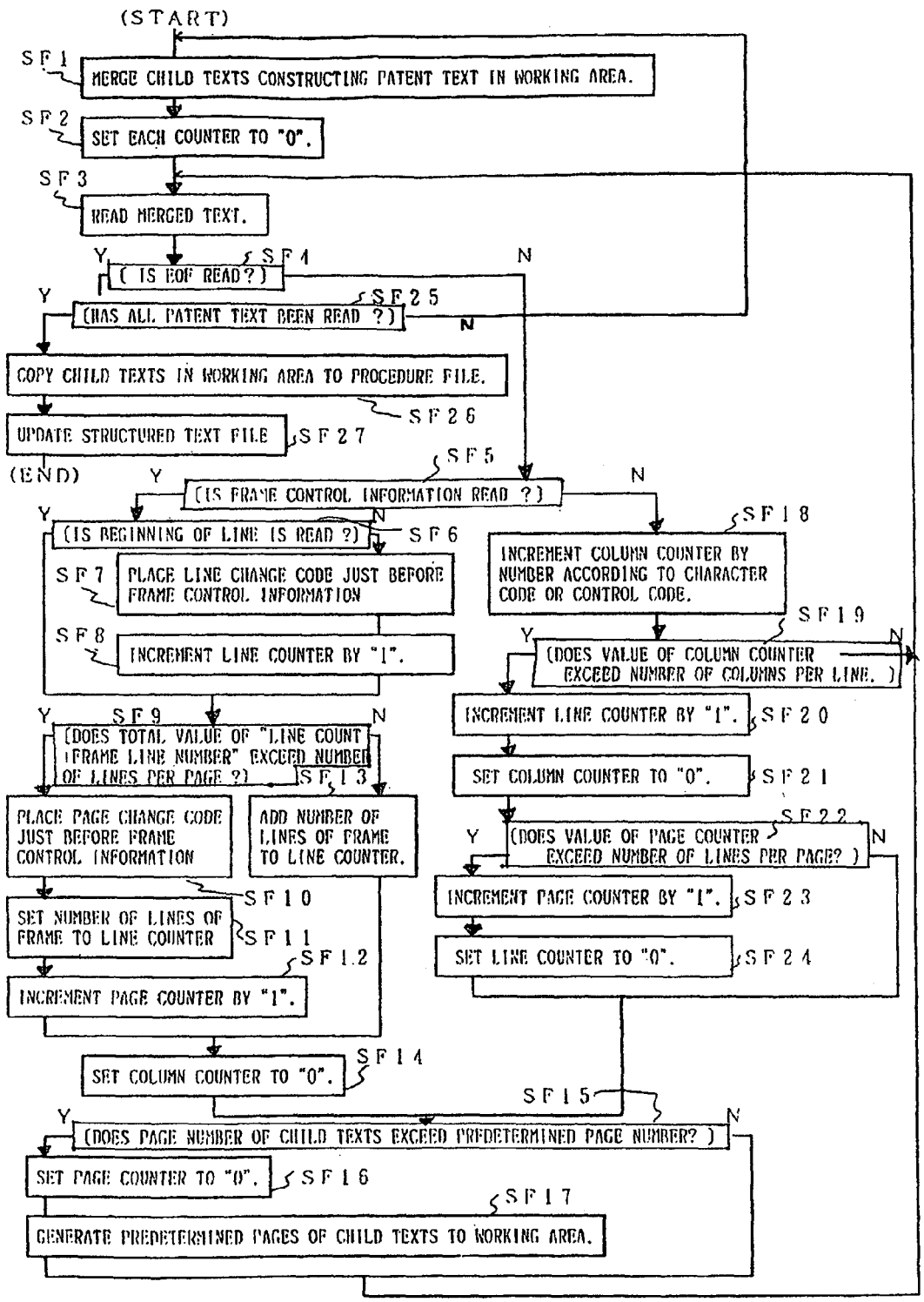
FIG. 21 is a control flow chart describing the page adjustment process.

Next, a flow of an actual page adjustment control process is described in accordance with the flow chart of FIG. 21.

In FIG. 21, at step SF1 child texts used to construct a parent text are merged with a working area. At this step, the structured text I/O portion 130 shown in FIG. 10 references node information in the third level of a structured text file, merges the child texts with the same text name, and stores the merged text in the working file 134.

At step SF2 individual counters (a page counter, a line counter, and a column counter) are reset to "0".

At step SF3 the merged text is read.

At step SF4 it is determined whether or not an EOF code (End Of File code) representing the end of the merged text has been read. When the determined result is YES, at step SF25 it is determined whether or not all the patent texts have been read. When the determined result is YES, at step SF26 the child texts in the working area are copied to a procedure file. Thereafter, at step SF27 the structured text file is updated and this page adjustment process is ended (END). When the determined result is NO, the steps of SF1 or later are repeated. When the determined result at step SF4 is NO, the page adjustment process and so forth are performed at steps SF5 or later.

At step SF5, it is determined whether or not the code being read is frame control information. When the determined result is YES, since it is determined that a frame control information code "30ea" representing the beginning of image data has been detected, merging media definition information of text control information at the header portion of the merged text is referenced. Thereafter, the number of lines of the merging media is added to the present position. If an "image at page boundary" takes place, the determined result at step SF9 becomes YES. In this case, at step SF10, a page change control code "30a2" (□) is placed just before the frame control information code "30ea" representing the beginning of the image data. Thereafter, at step SF15 it is determined whether or not the page number of the child texts becomes a predetermined value. When the determined result is YES, at step SF16 the page counter is set to "0". At step SF17 the predetermined pages of the child texts are sequentially stored in the working file 134. When the determined result at step SF5 is NO, at steps SF18 to SF24 the line counter and the column counter are started.

At step SF6 it is determined whether or not a code being read is at the beginning of a line. When the determined result is YES, the process advances to step SF9. When the determined result is NO, the process advances to step SF7. At step SF7 a line change code is placed just before frame control information. In addition, image data is placed at the beginning of the next line. Thereafter, at step SF8 the line counter is incremented by "1". Thereafter, the process advances to step SF9.

At step SF9 it is determined whether or not the total number of lines of "line counter+frame" exceeds the number of lines per page. In other words, at this step, the number of lines (line length) of image data read in accordance with a frame number are added to the line being counted, thereby determining whether or not the number of lines being added exceeds the number of lines per page. When the determined result is YES (or when the number of lines being added exceeds the number of lines per page), since the image data is present at the boundary between two pages, at step SF10 a page change code is placed just before frame control information, thereby moving the image data to the beginning of the next page. Thereafter, at step SF11 the number of lines of the frame is set to the line counter and then the number of lines of next data is set. At step SF12, the page counter is incremented by "1" and then the process advances to step SF14. When the determined result is NO (or when the number of lines being added does not exceed the number of lines per page), at step SF13 the number of lines of the frame is added to the line counter. Thereafter, the number of lines of the next data is set and then the process advances to step SF14.

At step SF14 the column counter is set to "0".

At step SF15 it is determined whether or not the number of pages of the child texts becomes the predetermined value (or a predetermined maximum page number per text). When the determined result is YES, at step SF16 the page counter is set to "0". At step SF17 the predetermined number of pages of the child texts is generated in the working area. Thereafter, the steps of SF3 and later are repeated. When the determined result is NO, since the page number of the child texts do not become the maximum page number, steps SF3 and later are repeated.

Thereafter, since the determined result at step SF5 is NO, that is, the code being read is not frame control information, at step SF18, upon occurrence of a character code or a control code (other than a frame control code), the column counter is incremented. When a two byte character code (such as a Japanese character) is read, the column counter is incremented by "1". When another two byte character code (such as a double size Japanese character) is read, the column counter is incremented by "2". When a one byte character code is read, the column counter is incremented by "0.5".

At step SF19 it is determined whether or not the value of the column counter exceeds the number of columns per line. When the determined result is YES, at step SF20 the line counter is incremented by "1". Thereafter, at step SF21 the column counter is set to "0" and then the process advances to step SF22. When the determined result is NO, since the value of the column counter does not exceed the number of columns per line, step SF3 is repeated.

At step SF22 it is determined whether or not the value of the line counter exceeds the number of lines per page. When the determined result is YES, at step SF23 the page counter is incremented by "1". Thereafter, at step SF24 the line counter is set to "0". Thereafter, the steps of SF15 or later are performed. When the determined result is NO, the steps of SF15 or later are performed.

With this process, when frame control information is read from a merged text, if it is determined that image data occur at the boundary between two pages, the page adjustment process, where a page change code is forcibly placed and the image data are moved to the beginning of the next page, is performed (steps SF9 (YES), SF10, SF11, and SF12). Thus, the pages of the merged text can be automatically adjusted.

(4) Next, a control process for automatically generating a procedure file by using patent text data being read from a floppy disk is described in detail with reference to FIGS. 22 and 23.

Figure 22:
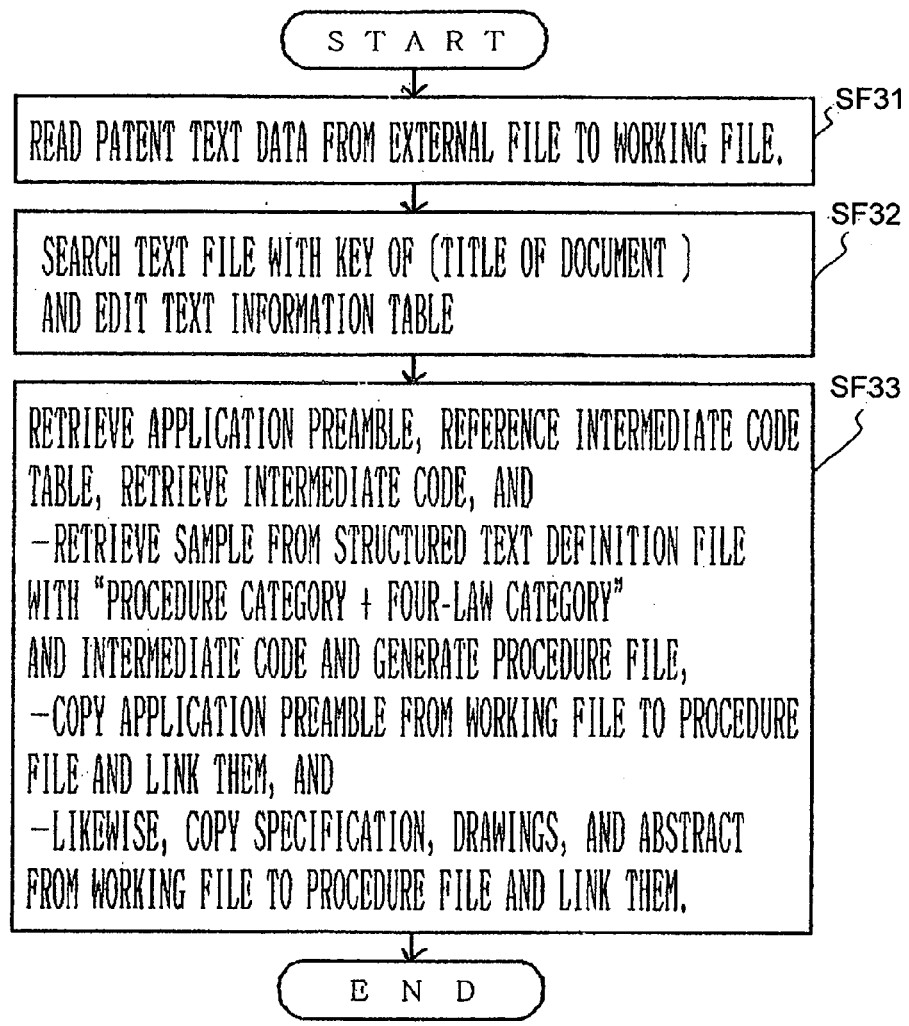
FIG. 22 is a control flow chart describing an automatic procedure generation process.

In FIG. 22, at step SF31 patent text data are read from an external file to the working file. Then the automatic procedure generating portion 135 shown in FIG. 10 commands the text converting portion 120 to read patent text data from an FP (floppy disk), convert the format thereof into the internal format, and store the resultant data in the working file 134.

At step SF32, with a key of [title of document or document name], a text file is searched and thereby a text information table is edited. Namely, with a key of [title of document], the text content analyzing portion 133 searches a text file (storing patent text data) which has been read to the working file at step SF31 and edits a text information table 161 as shown in FIG. 23.

At step SF33, an application preamble is retrieved. Thereafter, with reference to the intermediate code table, an intermediate code is retrieved and a sample is retrieved from the structured text definition file 127 by using the "procedure category+four-law category" and the intermediate code, and the procedure file is generated the application preamble is copied from the working file to the procedure file and then linked, and likewise, the specification, drawings, and abstract are copied to the procedure file and then linked.

In other words, identifiers contained in a patent text for use in an electronic application represent the contents of bibliographic items thereof. Thus, by searching for an identifier [title of document] and checking the description item, the text name is determined and a text information table 161 shown in FIG. 23 is generated.

Thereafter, the intermediate code table shown in FIG. 16B of the procedure working reference file 125 is referenced with the key of the text name of the text information table 161. Thus, an intermediate code is determined. For example, when the text name is "application preamble", data having the text name "application preamble" are searched. Thus, the intermediate code "63", which is a main document, is determined based on the procedure name "patent application". In addition, the procedure category "1 (application)" and the four-law category "1 (patent)" are determined. In liaison with the structured text I/O portion 130, the procedure file generating portion 129 generates a procedure file in the procedure document storage file 27, the procedure file storing a structured text file. In addition, with reference to the text information table 161 shown in FIG. 23, the patent text files (an application preamble file, a specification file, a drawing file, and an abstract file) stored in working file 134 are copied to corresponding files (an application preamble file, a specification file, a drawing file, and an abstract file) of the procedure file one after the other. Thereafter, the contents of these files are set to the node information in the third level of the structured text file and the structure of the sample structured text file is changed. Thus, the automatic procedure generating portion 135 automatically generates a procedure file by using an external file in liaison with the text converting portion 120, the procedure file generating portion 129, the structured text I/O portion 130, the text I/O portion 131, the page adjusting portion 132, the text content analyzing portion 133, and so forth.

Next, a paragraph number assignment process is described with reference to FIGS. 24 to 28.

Figure 24:
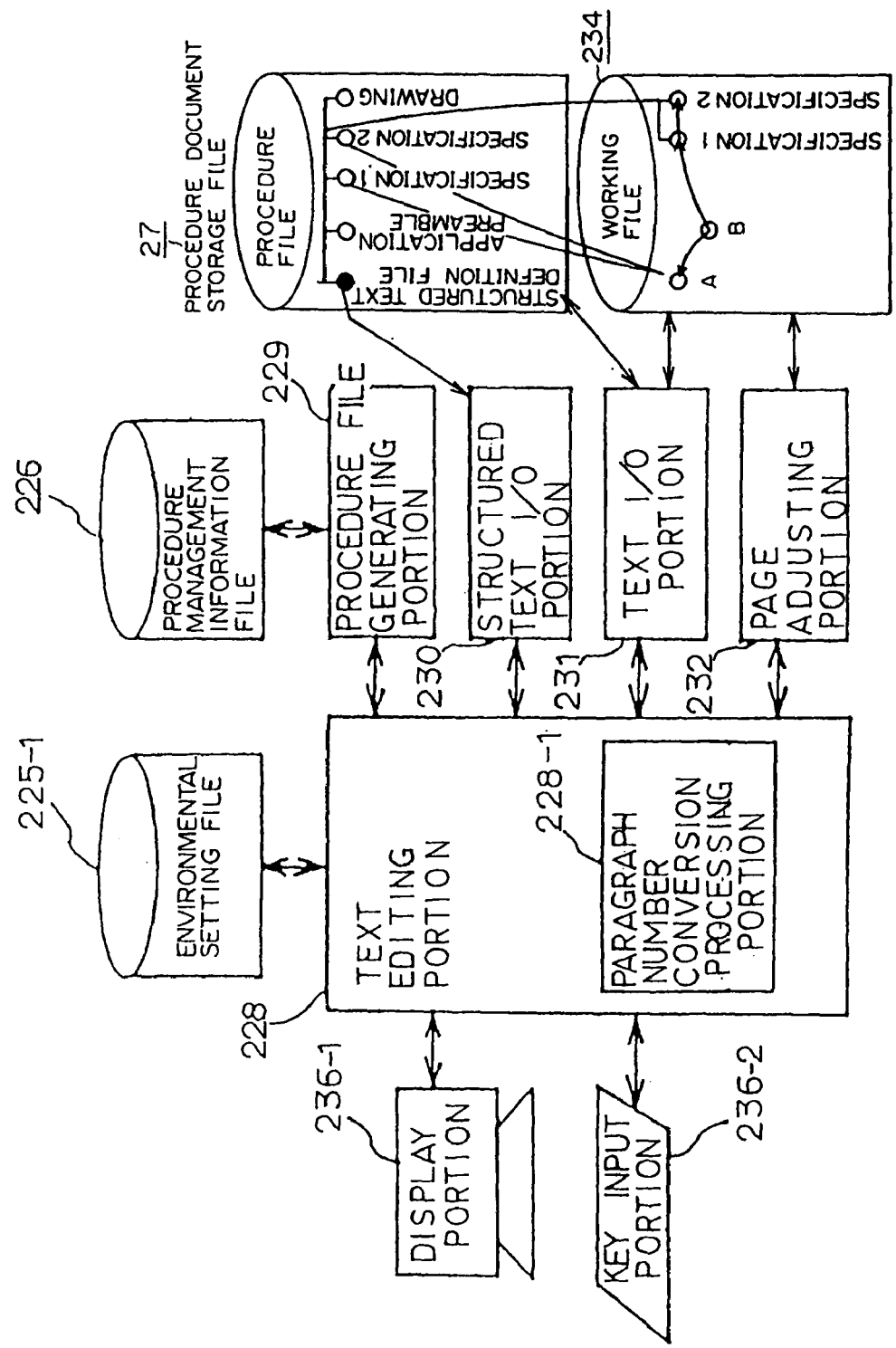
FIG. 24 is another constructional block diagram in accordance with the present invention.

FIG. 24 is a block diagram showing another construction of the present invention.

A text editing portion 228 performs various text editing operations. The text editing portion 228 is constructed of a paragraph number conversion processing portion 228-1 and so forth.

Figure 26:
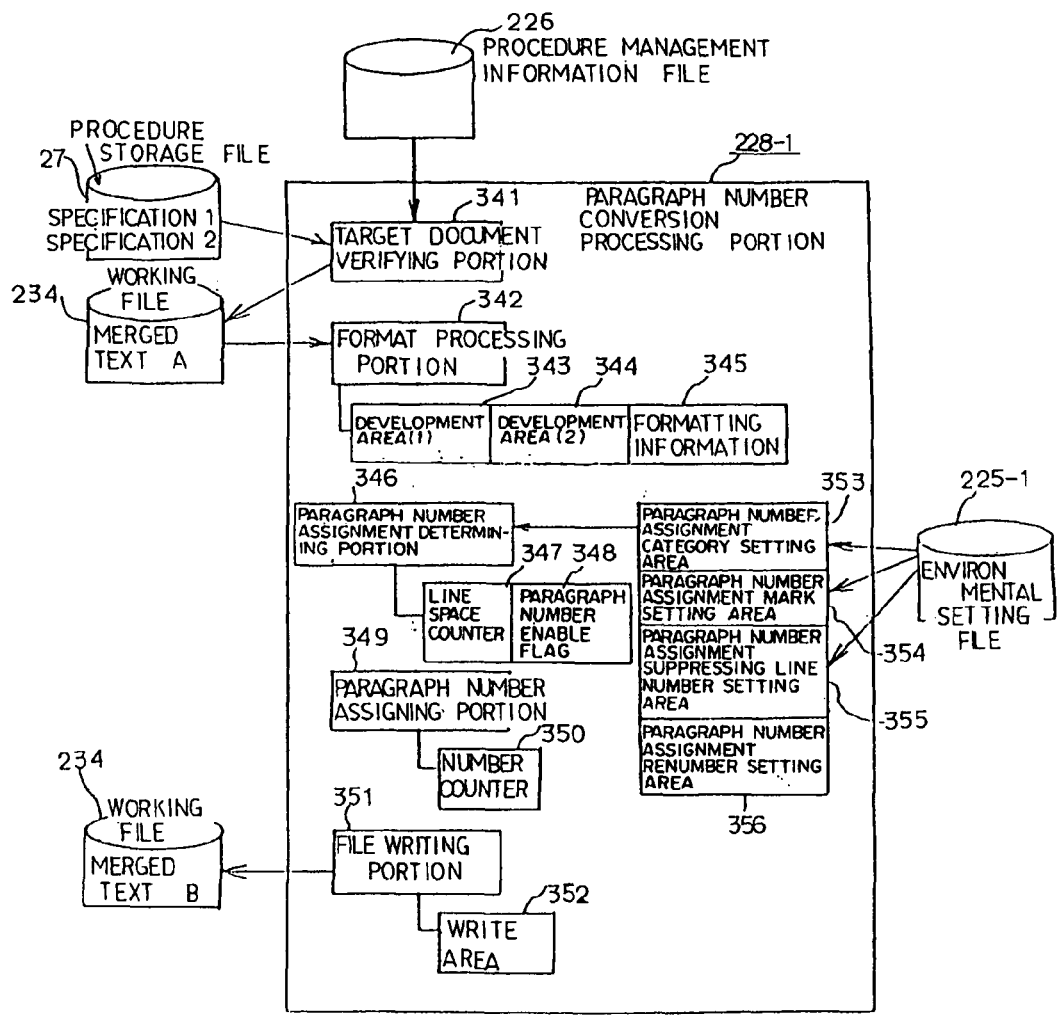
FIG. 26 is a constructional block diagram of a paragraph number assigning portion.

The paragraph number conversion processing portion 228-1 assigns paragraph numbers in the construction shown in FIG. 26.

A procedure management information file 226 stores procedure information for use in managing procedure documents.

A procedure file generating portion 229 generates a procedure file. A structured text I/O portion 230 inputs and outputs a hierarchically structured procedure file which is stored in a procedure document storage file 27. A text I/O portion 231 inputs and outputs text files to and from the procedure document storage file 27 and a working file 234. A page adjusting portion 232 adjusts pages of texts stored in the working file 234. The procedure document storage file 27 stores a hierarchically structured procedure file. A working file 234 stores text data and so forth to be edited. A display portion 236-1 displays various screens. A key input portion 236-2 inputs data in accordance with various keys.

FIGS. 25A and 25B show the contents of files.

FIG. 25A is a schematic diagram showing an example of the content of an environmental setting file 225-1. A paragraph number assignment category represents modes such as automatic mode, replace mode, and automatic & replace mode for use in assigning a paragraph number.

The "automatic" mode is used to assign paragraph numbers in ascending order.

The "replace" mode is used to assign paragraph numbers in ascending order whenever a predetermined paragraph number assigning mark is detected.

The "automatic & replace" mode is used for both the "automatic" mode and the "replace" mode.

Besides these modes, a renumbering function for renumbering the paragraphs is provided.

A paragraph number assigning mark is for setting paragraph numbers. An example of a paragraph number assigning mark is @.

A paragraph number assignment suppressing line number is the number of lines which suppresses the assignment of the next paragraph number in successively assigning paragraph numbers. An example of this line number is 5.

FIG. 25B is a schematic diagram showing an example of the content of a procedure management information file 226. Management number is the number which manages a text to be assigned paragraph number.

A procedure file name is the name of a procedure file which stores text data.

A procedure category is a category of a procedure. Examples of categories are application, intermediate procedure, registration setting (payment of issue fee), and payment of maintenance fee.

A four-law category is a category for patent, utility patent, design patent, trademark, and so forth.

An intermediate code is for use in retrieving a sample of a hierarchically structured procedure file (see the intermediate code table shown in FIG. 16B).

A transmission result flag represents a transmission result of a transmission file where a procedure file has been converted into the transmission format. Examples of the transmission result are "not transmitted", "transmitting", "transmitted", and so forth.

FIG. 26 is a block diagram showing the construction of the paragraph number assigning portion.

In FIG. 26, a paragraph number conversion processing portion 228-1 is constructed of devices 341 to 356. This processing portion 228-1 assigns paragraph numbers and renumbers them.

A target document verifying portion 341 verifies whether or not a text retrieved from the procedure document storage file is a document in which paragraph numbers should be assigned.

A format processing portion 342 reads a procedure where paragraph numbers should be assigned and formats the text. As a result of the format processing, a development area (1) 343 is for storing text data including control information developed in the unit of lines, a development area (2) 344 is for storing text data excluding the control information, and formatting information 345 is page and line information for representing the lines of a page on which developed lines are located.

A paragraph number assignment determining portion 346 determines whether or not to assign paragraph numbers in accordance with the data developed by the format processing portion 342. A line space counter 347 is for counting the space between successive paragraph numbers. A paragraph number assignment enable flag 348 is for storing the validity of a paragraph number assignment range. A paragraph number assignment category setting range 353 is for presetting a paragraph number assignment category (such as automatic mode, replace mode, automatic & replace mode, and so forth). A paragraph number assignment mark setting area 354 is for presetting a predetermined paragraph number assignment mark. A paragraph number assignment suppressing line number setting area 355 is for presetting the number of lines for suppressing consequent assignment of paragraph numbers. A paragraph number assignment renumbering setting area 356 is for presetting assignment and renumbering of paragraphs.

When the paragraph number assignment determining portion 346 determines the assignment of paragraph numbers, a paragraph number assigning portion 349 assigns them in ascending order. A number counter 350 is for counting paragraph numbers in ascending order.

A file writing portion 351 outputs text data with assigned paragraph numbers to a file. A write area 352 is for temporarily storing text data to be written line by line.

Figure 27B:
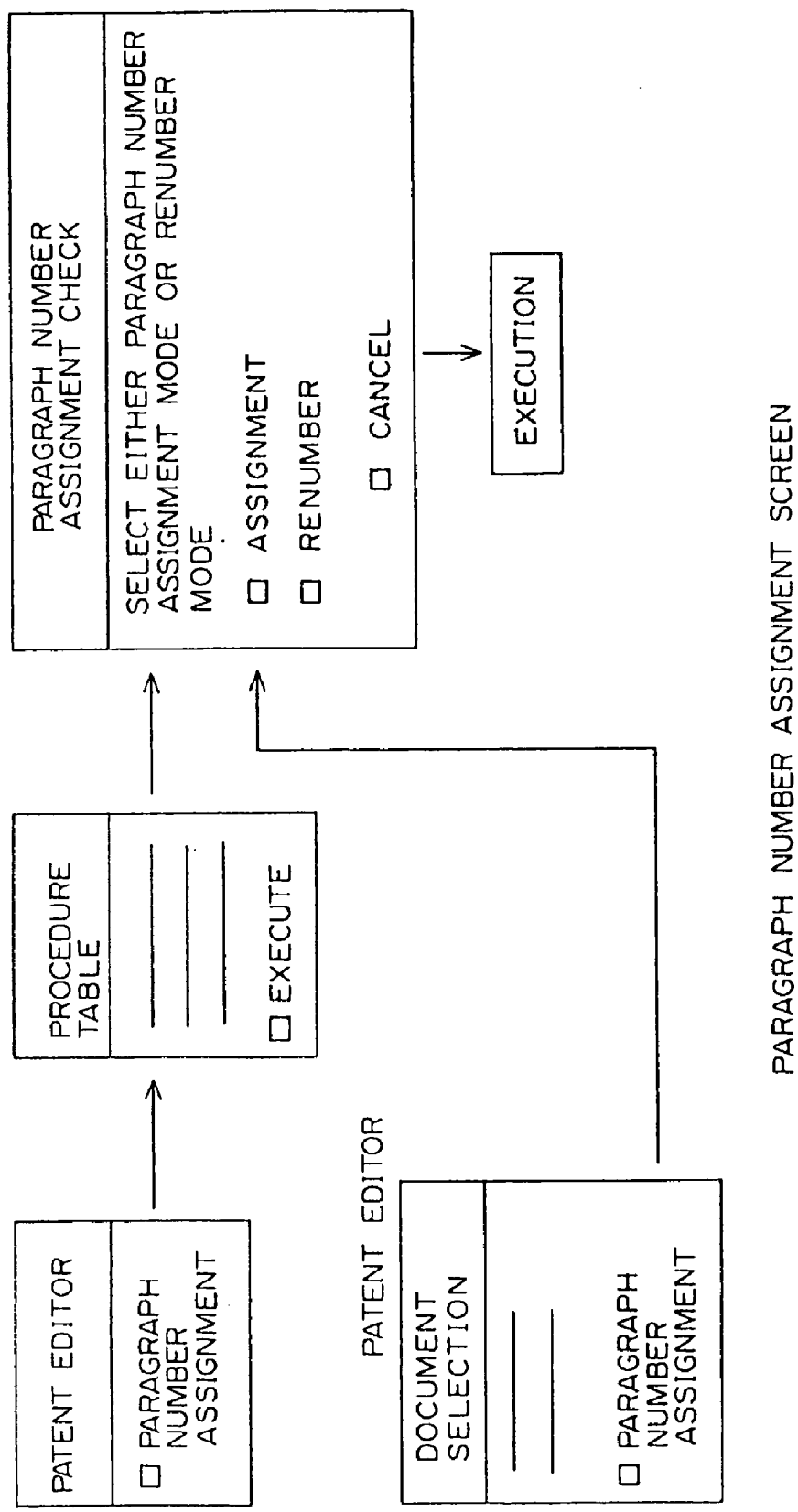
FIG. 27B is a schematic diagram showing a screen transition of a paragraph number assigning screen.

Next, a paragraph number assignment process and a paragraph renumber process are described in detail in accordance with FIG. 26, with reference to FIGS. 27A, 27B and 28.

[1]: As shown in FIG. 27A, on an operation environmental information update screen which is displayed on the display portion 236-1, the operator will perform one of the following operations for the paragraph number assignment process.

When the automatic assignment mode is selected, the operator will input an assignment suppressing line number.

When the replace mode is selected, the operator will input one assignment mark.

When the automatic & replace mode is selected, the operator will input both an assignment suppressing line number and one assignment mark.

The selected and inputted information is stored in the environmental setting file 225-1 shown in FIG. 25A.

[2] As shown in FIG. 27B, the operator will select the paragraph number assignment mode on either a patent editor screen, which is a paragraph number assignment screen, or a document selection screen. When a paragraph number is selected on the patent editor screen, the operator will select a target procedure on the procedure table screen. When the paragraph number assignment mode is selected on the document selection screen, since a target procedure has been selected, it is not necessary to further select a procedure. With one of the above selection modes, the paragraph number assignment verifying screen on the right side of FIG. 27B is displayed. The operator will select either the paragraph number assignment mode or the renumber mode. The selected renumber information is stored in the paragraph number assignment renumber setting area 356 shown in FIG. 26.

[3]: To check whether or not the procedure selected first is a target matter where paragraph numbers are assigned, the target document verifying portion 341 reads, through the procedure file generating portion 229, the procedure management information file 226 shown in FIG. 25B. The procedure management information file 226 reads a procedure file name, a procedure category, and a transmission result flag by using an eight-digit unique management number. The target document verifying portion 341 checks the transmission result flag. When the procedure is in the "Transmitting" status or "Receipt Received", the target document verifying portion 341 outputs an error message. Otherwise, the target document verifying portion 341 checks a procedure category. When the procedure category is other than "application" and "amendment", the target document verifying portion 341 outputs an error message. When these checked results are OK, the target document verifying portion 341 accesses the procedure document storage file 27 through the structured text I/O portion 230 by using a key of the procedure file name. When the procedure category is "application", the target document verifying portion 341 checks the name of a file which stores a specification. When the procedure category is "amendment", the target document verifying portion 341 checks the name of a file which stores an amendment. Thereafter, the target document verifying portion 341 reads the contents of the respective texts through the text I/O portion 231. Thereafter, the target document verifying portion 341 checks whether or not an identifier [title of document] is followed by a specification or an amendment. When the identifier is followed by an amendment, the target document verifying portion 341 checks whether or not [title of document for amendment] is "specification"; [name of item for amendment] is "full text"; and [method of amendment] is "change". When these check results are NG, the target document verifying portion 341 outputs an error message. When the results are OK, a target document for paragraph number conversion is copied from the procedure document storage file 27 to the working file 234 so as to start a following paragraph number conversion process. When the specification or the amendment contains a plurality of divided texts, they are merged into one text and then stored. In addition, the contents of the environmental setting file 225-1 shown in FIG. 25A, which are paragraph number assignment category (one of automatic mode, replace mode, and automatic & replace mode), a paragraph number assignment mark (for example, @), and a paragraph number assignment suppressing line number (for example, 5 lines), are set to the paragraph number assignment category setting area 353, the paragraph number assignment mark setting area 354, and the paragraph number assignment suppressing line number setting area 355, respectively as shown in FIG. 26. In addition, the line space counter 347, the assignment enable flag 348, and the number counter 350 are initialized.

[4]: The format processing portion 342 develops and retrieves a target text line by line. Thereafter, the format processing portion 342 stores text data including control information in development area (1) 343, text data excluding control information in development area (2) 344, and information representing what text data stored in the development area (2) 344 is present in which line of which page in the formatting information 345.

[5]: The paragraph number assignment determining portion 346 analyzes data stored in the development area (1) 343 and the development area (2) 344 and checks whether the data is in a paragraph number assignment range. When the paragraph number assignment determining portion 346 checks an identifier and detects [detailed description of invention], it turns on the assignment enable flag 348. When the paragraph number assignment determining portion 346 detects [brief description of drawings] or the end of the text, it turns off the assignment enable flag 348. Only when the assignment enable flag 348 is turned on does the paragraph number assignment determining portion 346 determined whether or not to assign paragraph numbers in accordance with the following conditions.

[6]: The paragraph number assignment determining portion 346 performs the following determinations in accordance with the conditions set in areas 353 to 356 shown by FIGS. 28A to 28E. (Refer to the description of FIGS. 28A to 28E.)

[6]-1: When the paragraph number assignment renumber setting area 356 is set to "assignment" and the paragraph number assignment category setting area 353 is set to "automatic", the paragraph number assignment determining portion 346 determines execution of steps shown in FIGS. 28A to 28E.

[6]-2: When the paragraph number assignment renumber setting area 356 is set to "assignment" and the paragraph number assignment category setting area 353 is set to "replace", the paragraph number assignment determining portion 346 determines execution of steps shown in FIGS. 28D and 28E.

[6]-3: When the paragraph number assignment renumber setting area 356 is set to "assignment" and the paragraph number assignment category setting area 353 is set to "automatic & replace", the paragraph number assignment determining portion 346 determines execution of steps shown in FIGS. 28A to 28E.

[6]-4: When the paragraph number assignment renumber setting area 356 is set to "renumber", the paragraph number assignment determining portion 346 determines execution of a step shown in FIG. 28D.

[7] When the paragraph number assignment determining portion 346 determines execution of one of [6]-1 to [6]-4, paragraph number assigning portion 349 increments the number counter 350 by "1", determines a paragraph number, and stores write data in the write area 352 of the file writing portion 351. The file writing portion 351 outputs text data with paragraph numbers to the working file 234 as a new merged text.

[8]: Last, the page adjustment portion 232 adjusts the merged text with paragraph numbers, and if necessary divides the text into a plurality of texts. Thereafter, the page adjusting portion 232 replaces, with the adjusted text(s), the former text without paragraph numbers through the text I/O portion 231.

FIGS. 27A and 27B are schematic diagrams showing screen transition.

FIG. 27A is an operation environmental setting update screen on which the operator can select one of automatic mode, replace mode, and automatic & replace mode for assigning paragraph numbers. When the automatic mode is selected, the operator inputs a paragraph number assignment suppressing line number. When the replace mode is selected, the operator inputs an assignment mark (for example, @). When the automatic & replace mode is selected, the operator inputs both a paragraph number assignment suppressing line number and an assignment mark. The information which is selected and inputted is stored in the environmental setting file 225-1 shown in FIG. 26.

FIG. 27B is a schematic diagram showing a paragraph number assignment screen. As described above, on this screen the operator selects one of the paragraph number assignment mode and the renumber mode so as to set "assignment" or "renumber" to the paragraph number assignment renumber setting area 356 shown in FIG. 26.

FIGS. 28A through 28E are schematic diagrams showing a paragraph number assignment process. In these diagrams, "before assignment" represents text data where a paragraph number has not been assigned, whereas "after assignment" represents text data where a paragraph number has been assigned.

Figure 28A:
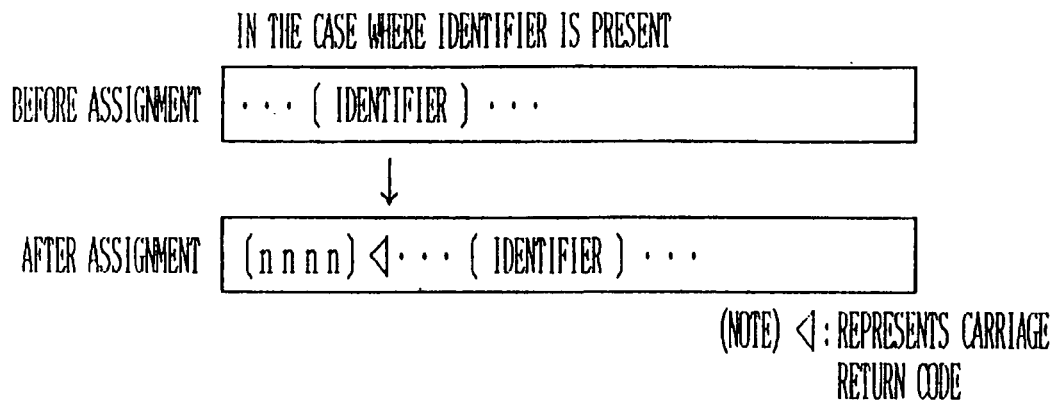
FIG. 28A is a schematic diagram describing a paragraph number assignment process where an identifier is present.

FIG. 28A shows the case where text data has an identifier. When a particular identifier for representing the assignment of a paragraph number (for example, [identifier]) is detected, a paragraph number ([nnnn]) and a carriage return mark (◁) are placed at the beginning of the line.

Figure 28B:
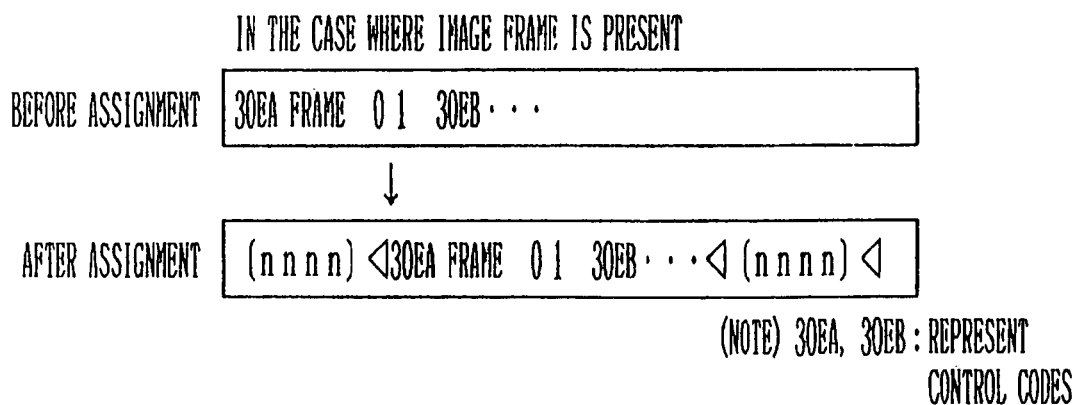
FIG. 28B is a schematic diagram describing the paragraph number assignment process where an image frame is present.

FIG. 28B shows the case where an image frame is present. When an image frame (image start code "30EA"+image frame 01+image end code "30EB") is detected, a paragraph number ([nnnn]) and a carriage return mark (◁) are placed before and after the image frame.

Figure 28C:
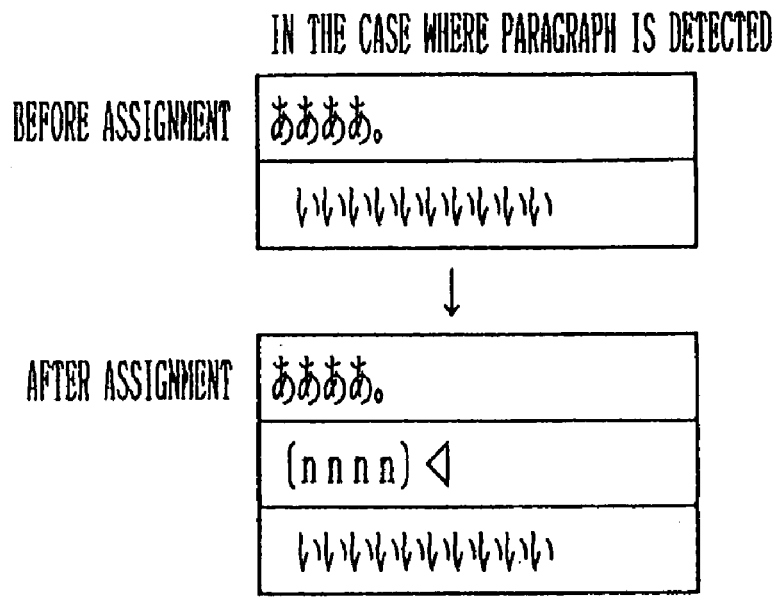
FIG. 28C is a schematic diagram describing the paragraph number assignment process where a paragraph is detected.

FIG. 28C shows the case where a paragraph is detected. When the preceding line ends with a punctuation code and the next line starts with a blank code, a paragraph number ([nnnn]) and a carriage return mark (◁) are placed on the line following the punctuation code. However, in this case, the line space counter 347 counts the number of lines from the position of the last paragraph number being assigned. When the counted value is equal to or larger than the suppressing line number which is set to the paragraph number assignment line number setting area 355, the paragraph number and the carriage return mark are placed.

Figure 28D:
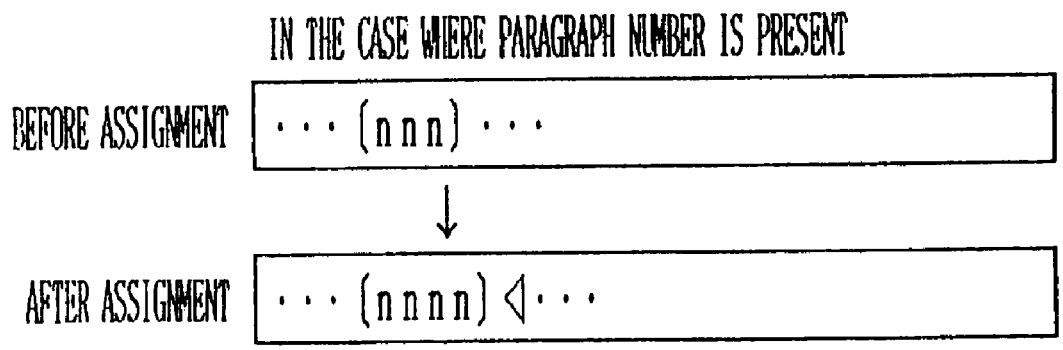
FIG. 28D is a schematic diagram describing the paragraph number assignment process where a paragraph number is present.

FIG. 28D shows the case where a paragraph number is present. When an identifier consisting of numeric characters (for example [nnn]) is detected, if a paragraph number error occurs due to the effect of an edit operation (deletion, merge, insert, or the like), paragraph numbers are renumbered in ascending order.

FIG. 28E shows the case where a paragraph number assignment mark is present. When a paragraph number assignment mark (for example, @) is present in a text being searched, a paragraph number ([nnnn]) and a carriage return mark (◁) are placed instead of the paragraph number assignment mark.

Figure 29:
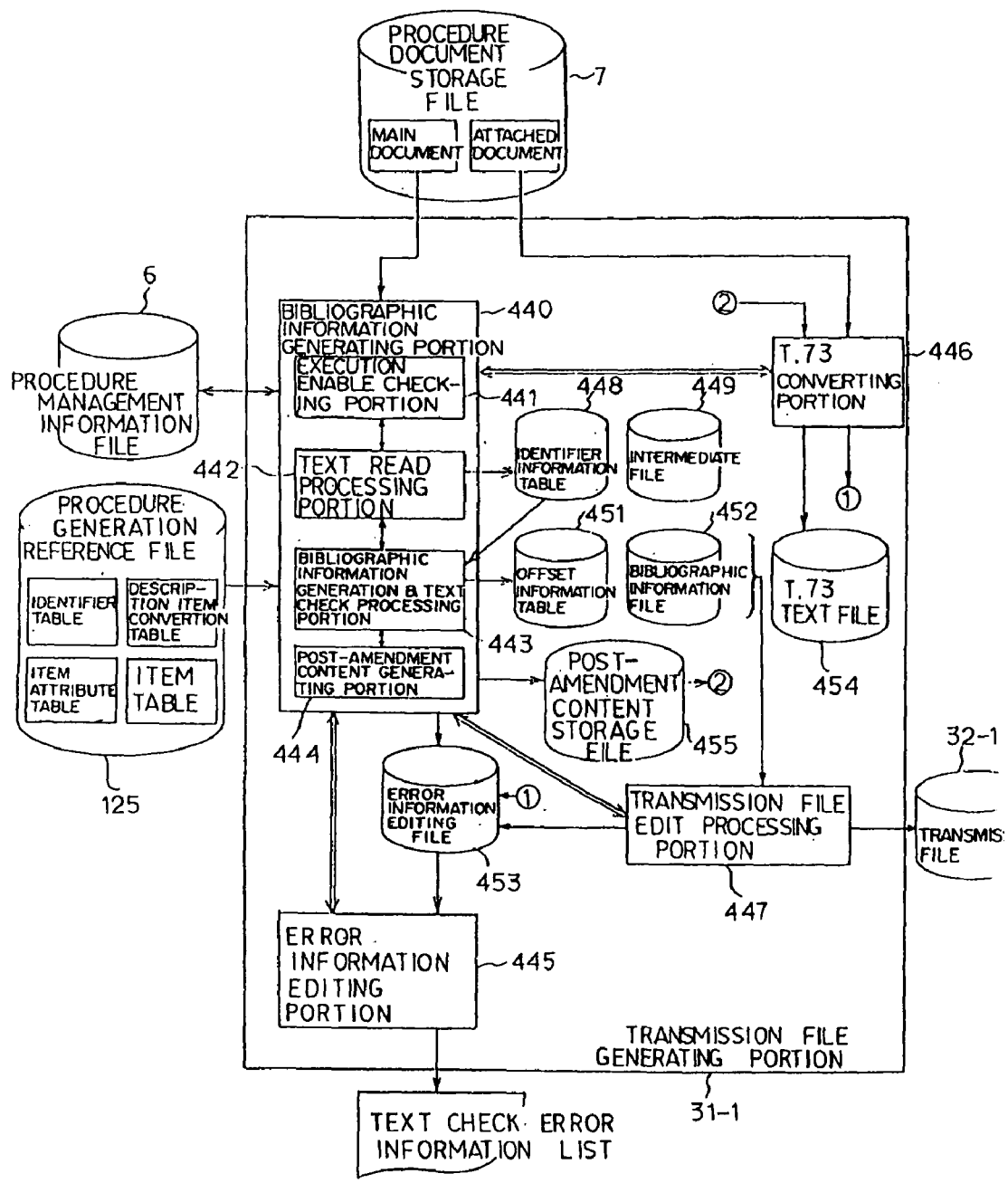
FIG. 29 is a constructional block diagram of a transmission file generating portion.

FIG. 29 is a block diagram showing a construction of a transmission file generating portion. A transmission file generating portion 31-1 is connected with a procedure management information file 6, a procedure generation reference file 125, a procedure document storage file 7, and a transmission file 32-1. The transmission file generating portion 31-1 is provided with a bibliographic information generating portion 440, an error information editing portion 445, a T73 converting portion 446, and a transmission file edit processing portion 447.

An execution enable check, a text read process, a bibliographic information generation and text check, a post-amendment content generation, and so forth, are performed by an execution enable checking portion 441, a text read processing portion 442, a bibliographic information generation and text checking portion 443, a post-amendment content generating portion 444, and so forth respectively disposed within the bibliographic information generating portion 440. The procedure generation reference file 125 contains the above identifier table, the description item conversion table, the item attribute table, and the item table.

The transmission file generating portion 31-1 generates a document name "patent application preamble P1", a document name "specification P2", and a document name "drawing P3" for an application procedure in accordance with the format of a transmission file to be generated, as illustrated by a transmission file generation process shown in FIG. 30. The transmission file format contains text information categorized as an applicant information header and a body T73. The applicant information header is categorized as a length portion and a bibliographic information portion. The length portion comprises a total information length, an information length of length portion, an information length of bibliographic information portion, an information length of document information portion, a document length of non-structured document, a document length of specification, a document length of drawings, a document length of post-amendment content, and the number of other documents. All these fields have 4 bytes. The bibliographic information portion represents the document name "patent application preamble P1". As a document information offset, sets of item ID, item length, and item position, each of 4 bytes, are repeated. In addition, the bibliographic information portion contains a separator (of 4 bytes) and real data of bibliographic information (of variable length). With such bibliographic information, the document name "patent application preamble P1" is generated. The body (T73) is a text information portion categorized as a specification document substance and a drawing document substance which represent the document name "specification P2" and the document name "drawing P3", respectively.

To generate a transmission file in such a format, the execution enable checking portion 441 of the transmission file generating portion 31-1 determines the validity of execution of a transmission file generation process. In this determination of the validity, the execution enable checking portion 441 checks the procedure management information file 6 being read (see FIG. 16D) and verifies the content of the status flag. When the status flag represents a text check error status, the "Transmitting" status, or the "Received" status, the execution of the transmission file generation process is disabled. In this case, a particular message is outputted and the process is stopped.

This check step is performed so as to prevent a document or the like which has been transmitted from being mistakenly transmitted again.

When the check result of the execution enable checking portion 441 is OK, the text read processing portion 442 reads the main document and generates an identifier information table 448 and an intermediate file 449. In other words, with reference to the management information file, the text read processing portion 442 reads the procedure document storage file 7 and retrieves the main document. In the case of the structured text format, when the file being retrieved is at the first node, the file is treated as a main document. When the file is at other than the first node, it is treated as an attached document. The main document is read and data with respect to each [identifier] is retrieved. The retrieved data is written to the identifier information table 448 and the intermediate file 449. The real data is written from the beginning of the intermediate file 449. The write position of the intermediate file 449 and the data length are stored in the identifier information table 448. For example, the position and the length of the text name shown in FIG. 31 are the 12th byte and 6 bytes, respectively. A code "patent application" (6 bytes) is stored in the intermediate file 449 at this position and with this length.

When the real data are stored in the intermediate file 449, the leading and trailing spaces are removed therefrom. For example, in the case of "[title of invention] Hand scanner", the first space between the [title of invention] and "Hand scanner" and the second space followed by the "Hand scanner" are removed.

The text read processing portion 442 correlates the text with the identifier information table 448 and the intermediate file 449 as shown in the descriptive schematic diagram of the text reading process shown in FIG. 31.

When the process of the text read processing portion 442 is completed, the execution of the bibliographic information generation and text check processing portion 443 is started. With reference to the procedure generation reference file 125, the bibliographic information generation and text check processing portion 443 generates an offset information table 451 and a bibliographic information file 452 by using the identifier information table 448 and the intermediate file 449. In addition, the processing portion 443 checks the text. In other words, the bibliographic information generation and text check processing portion 443 reads the identifier information table 448 from the beginning and searches the item attribute table (see FIG. 34) in the procedure generation reference file 125 with a key of an identifier being read. Thus, "general item" or "group item" is determined. In the item attribute table shown in FIG. 34, the "identifier" represents an identifier of a group item; the "item attribute" represents an attribute of a group item; and the "member item name" represents an identifier of a member item. For example, since there may be a plurality of inventors, the identifier "inventors" is used as a group item.

Thereafter, by searching the identifier information table 448 (see FIG. 6B), the bibliographic information generation and text check processing portion 443 reads an item ID, an attribute, a number of columns, a converting method, and the name of a description item conversion table. Then, if a match is not detected, an identifier error occurs. This error is written to an error information file 453. Thereafter, the content (real data) of the intermediate file in accordance with the identifier stored in the intermediate file is converted in accordance with the information being read from the identifier information table 448. Thereby, the offset information table 451 and the bibliographic information file 452 are generated. In other words, the real data in the intermediate file 449 is successively converted in accordance with the attribute column number conversion method and read from the identifier information table 448. Thereafter, the converted data are written to the bibliographic file 452. When a code is necessary in this process, a conversion table such as a four-law category conversion table written in a description item conversion table is searched.

The bibliographic information generation and text check processing portion 443 outputs an item ID (for example, in the case where an item ID represents a destination), such as "1001" in accordance with the above identifier and information of a length and a position from a beginning which are written to the bibliographic information file 452 to the offset information table 451. When an error takes place during this conversion process, the bibliographic information generation and text check processing portion 443 writes the error to the error information file 453.

When all the data in the identifier information table 448 has been converted and then written to the offset information table 451 and the bibliographic information file 452, the item table (see FIG. 35) is searched for a corresponding item ID and a mandatory category with keys of an intermediate code (in the procedure management information file) and a law code (in the case of a application preamble). Thereafter, it is determined whether or not the item ID is present on the offset information table. When the item ID is not present, information representing that a mandatory identifier is absent is outputted to the error information file 453.

Thereafter, when the main document is an amendment for the content of a specification or drawings, data of an identifier [content after amendment] is outputted to a post-amendment content storage file 455. In this case, the format of the text should be converted into the format of T73.

Figure 3:
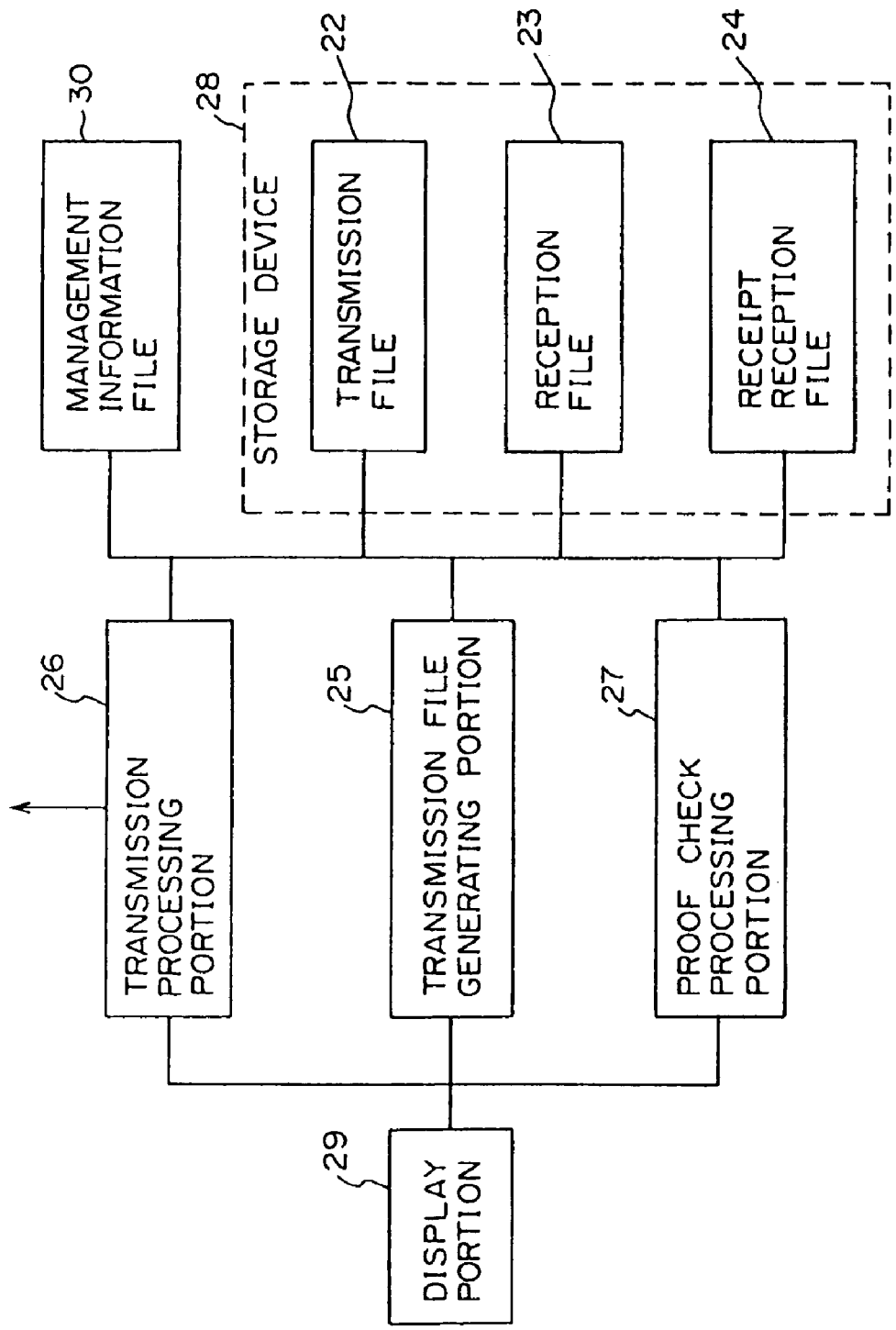
FIG. 3 is a block diagram showing an online transmission and reception controlling portion of the terminal equipment in accordance with the present invention.
Figures 2, 32:
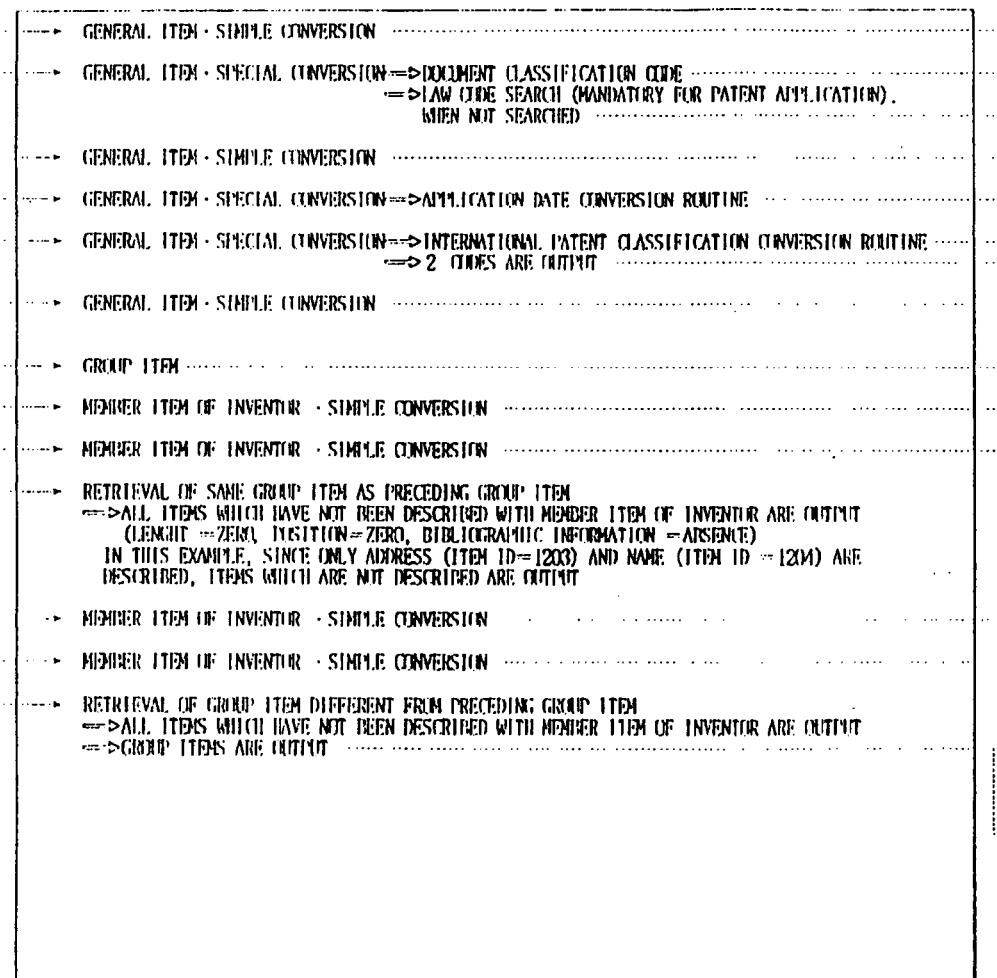

In the above bibliographic information generation and text check process, as shown in FIGS. 32-1 through 32-3, the bibliographic information generation and text check processing portion 443 generates the offset information table 451 and the bibliographic information file 452 by using the identifier information table 448 and the intermediate file 449 as shown in FIGS. 32-1 through 32-3. When the process of the bibliographic information generation and text check processing portion 443 is completed, the T73 conversion processing portion 446 converts the format of an attached document into the T73 text format and then outputs the resultant text to a file.

Figure 33:
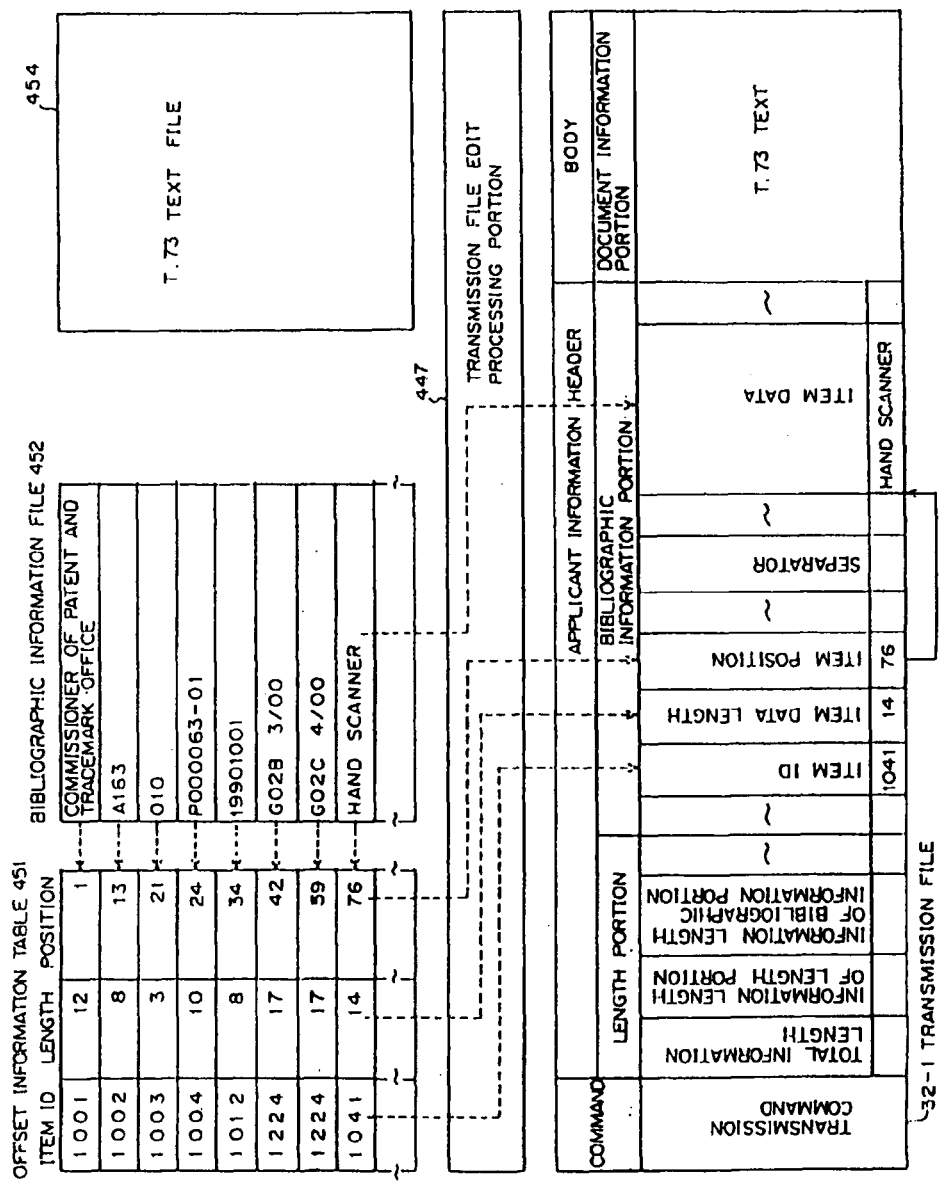
FIG. 33 is a schematic diagram describing a transmission file edit process.

FIG. 33 is a schematic diagram describing a transmission file editing process. The T73 converting portion 446 reads an attached document from the procedure document storage file 7 in accordance with the above procedure management information file 6. A document stored in the procedure document storage file 7 is a text in the internal format of the terminal equipment. This text is converted into the format of the T73 text and then outputted to the T73 text file 454. This process applies to a text stored in the post-amendment content storage file 455. The T73 converting portion 446 converts the T73 text file shown in FIG. 33 into the format of the T73 text of the document information portion.

When the process of the T73 converting portion 446 is completed, the execution of the process of the transmission file edit processing portion 447 is started. In other words, the transmission file edit processing portion 447 merges and edits the offset information table 451, the bibliographic information file 452, and the T73 text file 454. Thereafter, the transmission file edit processing portion 447 generates the transmission file 32-1. In other words, the transmission file edit processing portion 447 determines whether the selected mode is the text check mode or the transmission file generation mode. When the text check mode has been selected, the transmission file edit processing portion 447 skips the edit process. When the transmission file generation mode has been selected, the transmission file edit processing portion 447 performs the following process. In this process, transmission command information of '010010' is edited and outputted to the first 6 bytes of the transmission file. With the length information used when the bibliographic information file 452 and the T73 text file 454 were generated, the information of the length portion of the transmission file is edited and outputted. In addition, by using the offset information table 451 and the bibliographic information file 452, the transmission file edit processing portion 447 edits a bibliographic information file for the transmission file. The bibliographic information portion in the applicant information header of the transmission file 32-1 shown in FIG. 33 comprises data length and its position in accordance with each item ID. For example, when the title of the invention is "hand scanner", the item ID represents position 1041. The data length is 14 bytes from the data position 1041. In other words, 14 bytes are assigned from the 76th byte of the item data. In this space, character codes representing "hand scanner" are stored. This construction is also applied to other items.

Thereafter, the transmission file edit processing portion 447 reads the T73 text file 454 and outputs it as a document information portion following the bibliographic information portion. With this edit process, information in the predetermined format is generated in the command and the length portion in the information header and the bibliographic information portion in the transmission file. After this process is completed, the process of the error information editing portion 445 is started. The error information editing portion 445 successively reads the content of the error information file 453 and edits text check error information in the list format. Thereafter, the error information editing portion 445 prints out the list. This process is performed so that the error is effectively issued to the operator.

With this process, information to be transmitted is stored in the transmission file 32-1.

Figure 36:
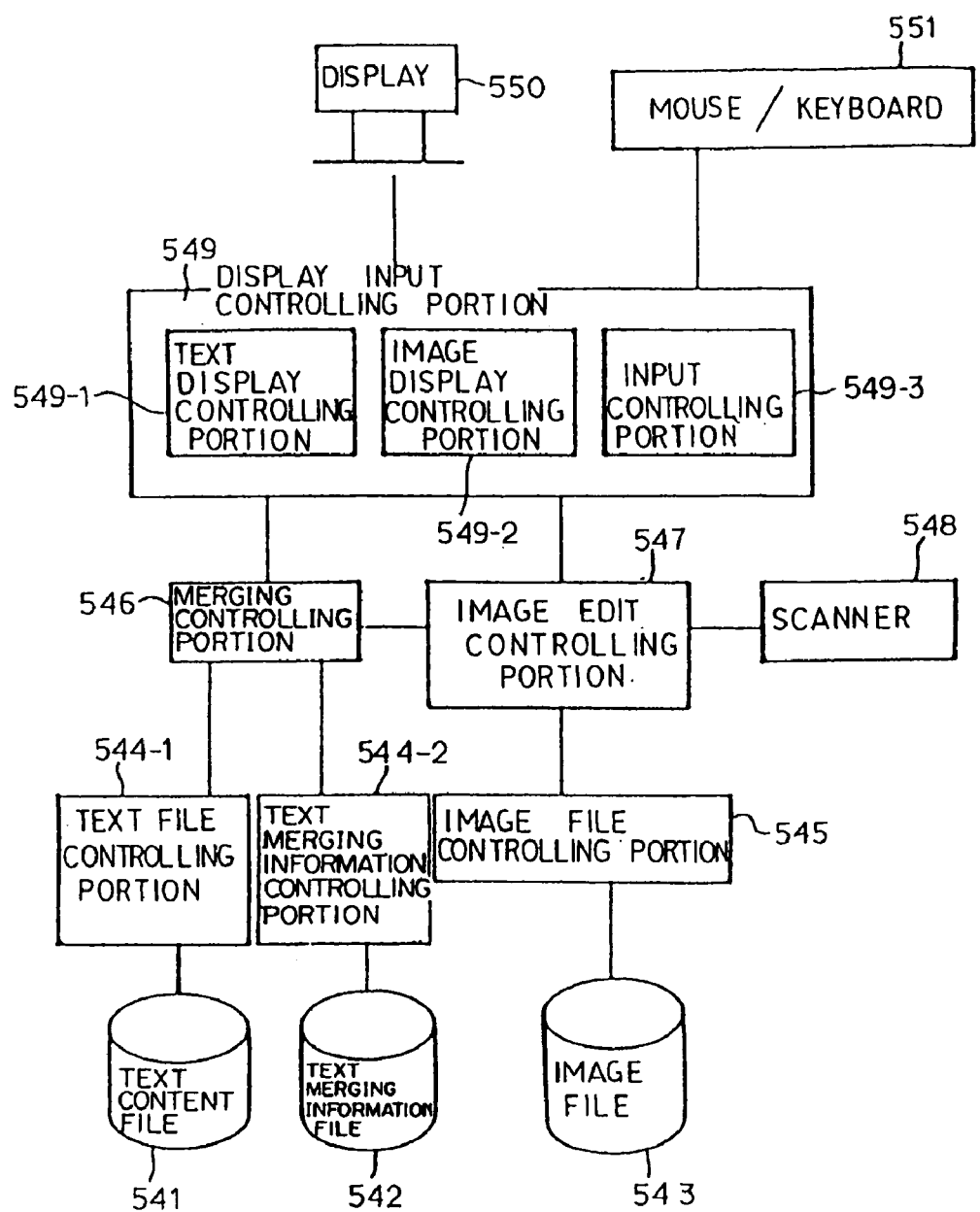
FIG. 36 is a constructional block diagram in accordance with another embodiment of the present invention.

FIG. 36 is a schematic diagram showing another embodiment of an image merging portion of the present invention.

Figure 37:
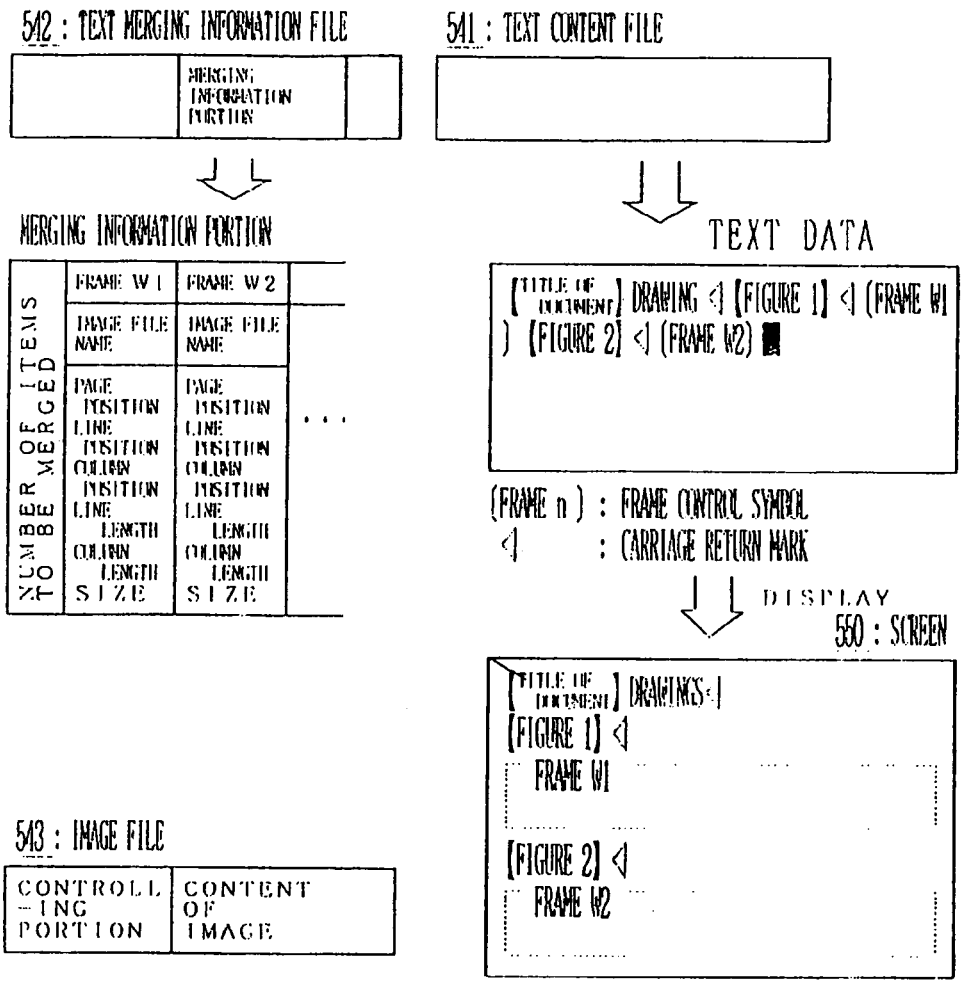
FIG. 37 is a schematic diagram showing a construction of a text including image data.

In FIG. 36, a text content file 541 is for storing a text (text code) which contains image data merging command identifiers (for example, [Figure n]+carriage return or ie change mark; [Table n]+carriage return mark; [Mathematics formula n]+carriage return mark; and [Chemical formula n]+carriage return mark) and image insertion marks (for example, @+carriage return mark) (see FIG. 37).

A text merging information file 542 is for storing an image file name, a frame size, a page position, a line position, and so forth in accordance with a frame ID of image data (see FIG. 37).

An image file 543 is for storing image data.

A text file controlling portion 544-1 accesses the text content file 541 and searches for image data merging commands (identifiers and image data insertion marks).

A text merging information controlling portion 544-2 accesses the text merging information file 542.

An image file controlling portion 545 accesses the image file 543.

A merging controlling portion 546 merges image data with text.

An image edit controlling portion 547 edits image data being read by a scanner or the like.

A scanner 548 reads an image from a paper and generates image data. In addition to the scanner, image data can also be generated by developing a drawing represented by codes, vector data, and so forth into a bit map.

A display input controlling portion 549 displays a text and an image on a screen 550 and receives an input of a mouse/keyboard 551. The display input controlling portion 549 is constructed of a text display controlling portion 549-1 for displaying a text on the screen 550, an image display controlling portion 549-2 for displaying an image on the screen 550, an input controlling portion 549-3 for receiving an input of the mouse/keyboard 551, and so forth.

The screen 550 is a screen of a display device for displaying a text, an image, and so forth.

The mouse/keyboard 551 inputs various commands and data to the display input controlling portion 549.

Next, a construction of a text including image data is described with reference to FIG. 37.

In the figure, text data stored in the text content file 541 is constructed of a text including a set comprising identifier (for example, [FIG. 1])+carriage return mark and a set comprising image insertion mark (for example, a @)+carriage return mark. These text data are displayed on the screen 550 as shown in the lower right-schematic diagram of FIG. 37. In a frame W1, indicated by dotted lines, an image with an image file name of the frame W1 of the merging information portion of the text merging information file 542 is retrieved from the image file 543 and then displayed on the screen 550.

Thus, in the text data, only image merging information (such as [frame W1] and [frame W2]) for representing (insertion) image data is merged. Real image data are retrieved from an image file name (a unique management number assigned in ascending order) obtained from the image file 543 in accordance with [frame W1], [frame W2], and so forth in text merging information file 542 and then displayed (inserted). Thus, a position (for example, [frame W1] and [frame W2]) at which image data are merged with a text can be readily edited (for example, moved). In addition, image data can be edited only by changing attribute information (such as frame size) of the text merging information file 542. Thus, image data can be readily and quickly edited. A transmission file is generated by merging image data with a text at positions of [frame W1], [frame W2], and so forth. Next, this process is described in detail.

Figure 38:
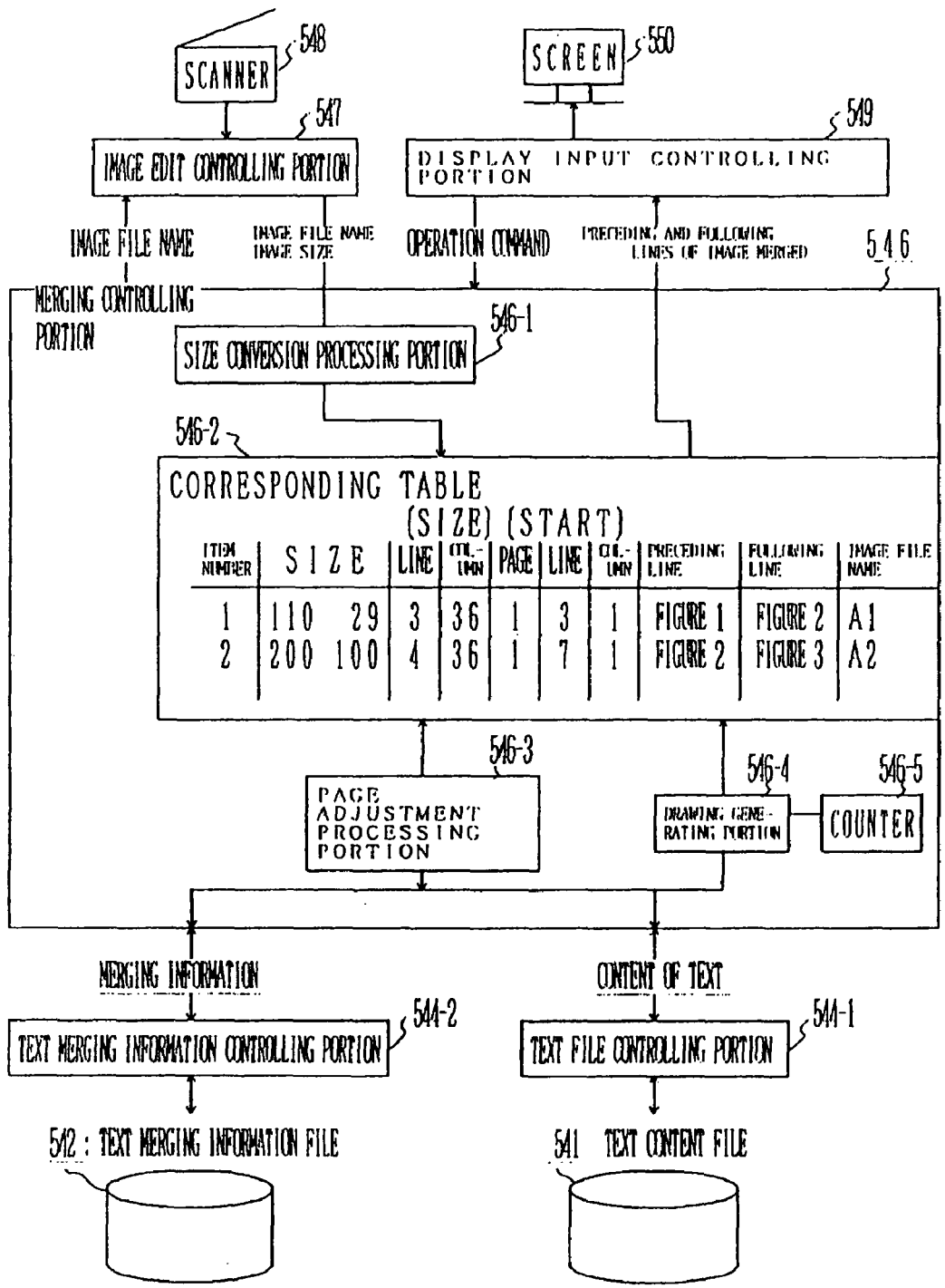
FIG. 38 is a constructional block diagram of an image merging portion.

FIG. 38 is a schematic diagram showing a construction of an image merging portion.

In FIG. 38, a merging controlling portion 546 comprises a size conversion processing portion 546-1, a corresponding table 546-2, a page adjustment processing portion 546-3, a drawing number generating portion 546-4, a counter 546-5, and so forth. The size conversion processing portion 546-1 divides by the size of each character an image size (for example, mm) of image data being read by a scanner 548 so as to calculate a frame size. The corresponding table 546-2 sets information with respect to the calculated frame size and so forth. The page adjustment processing portion 546-3 automatically places a page change mark on a line just preceding image data which is present at the boundary between two pages so as to move the image data to the later page. The drawing number generating portion 546-4 assigns a drawing number to image data. The counter 546-5 counts drawing numbers in ascending order. Since the constructions of the portions 541, 542, 544-1, 544-2, and 547 to 549 shown in FIG. 38 are the same as those of FIG. 36, their description is omitted.

The corresponding table 546-2 sets from beginning of text data a size, a number of lines, a number of columns, a start page, a start line, a start column of image data, text data on a line just preceding image data, text data on a line just following image data, an image file name, and so forth in accordance with merging commands (identifiers and image insertion marks) which are merged with a text.

Figure 39:
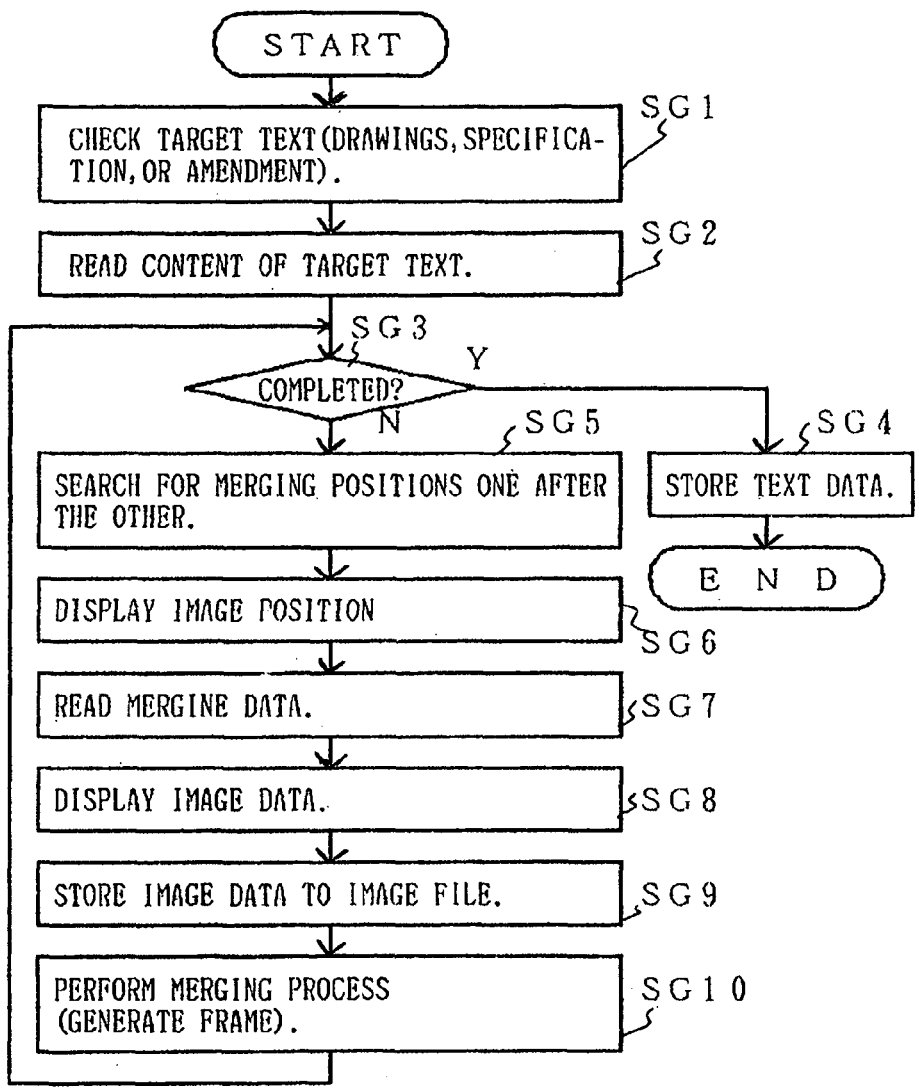
FIG. 39 is a flow chart showing an image data merge process.

Then, in accordance with a flow chart of FIG. 39, an operation of the merging controlling portion in the construction shown in FIG. 38 is described in detail.

When the execution of the process of the merging controlling portion is started, at step SG1 a target text is checked. At this step, the drawings, specification, or amendment is checked and found as a target text where image data are merged.

Thereafter, at step SG2, the content of the target text is read. At this step, the text file controlling portion 544-1 reads the content (text data) of the target text (specification, amendment, etc.) from the text content file 541.

At step SG3, it is determined whether or not all image data have been merged. When the determined result is YES, at step SG4 the text data merged with the image data are stored (updated) in the text contents file 541. Thereafter, this process is ended (END). When the determined result is NO, steps of SG5 and are repeated so as to merge the image data with the text data.

At stop SG5, merged positions are searched one after the other. In other words, the text file controlling portion 544-1 searches for text data (of a specification or an amendment) from the text content file 541 and retrieves merging commands (for example, an identifier [Figure n]+◁, image data insertion mark @+◁. At step SG6, merging positions are displayed. In other words, the merging positions of the text data which are retrieved at step SG5 are displayed on the screen 550.

At step SG7, image data are written. At step SG8, image data are displayed.

At step SG9, the image data are stored in the image file. At steps SG7, SG8, and SG9, the merging controlling portion 546 receives the content of a text and character positions with respect to merging commands searched at step SG3, informs the image edit controlling portion 547 of an image file name, and requests it to read the image data. Thus, the image edit controlling portion 547 reads the image data through the scanner 548 and then sends the image data to the display input controlling portion 549. Thus, the display input controlling portion 549 displays the image data on the screen 550. In addition, the image edit controlling portion 547 correlates the image data with the image file name and stores them in the image file 543. Thereafter, the image file name and the image size (for example, unit of mm) are returned to the merging controlling portion 546.

Figure 2:
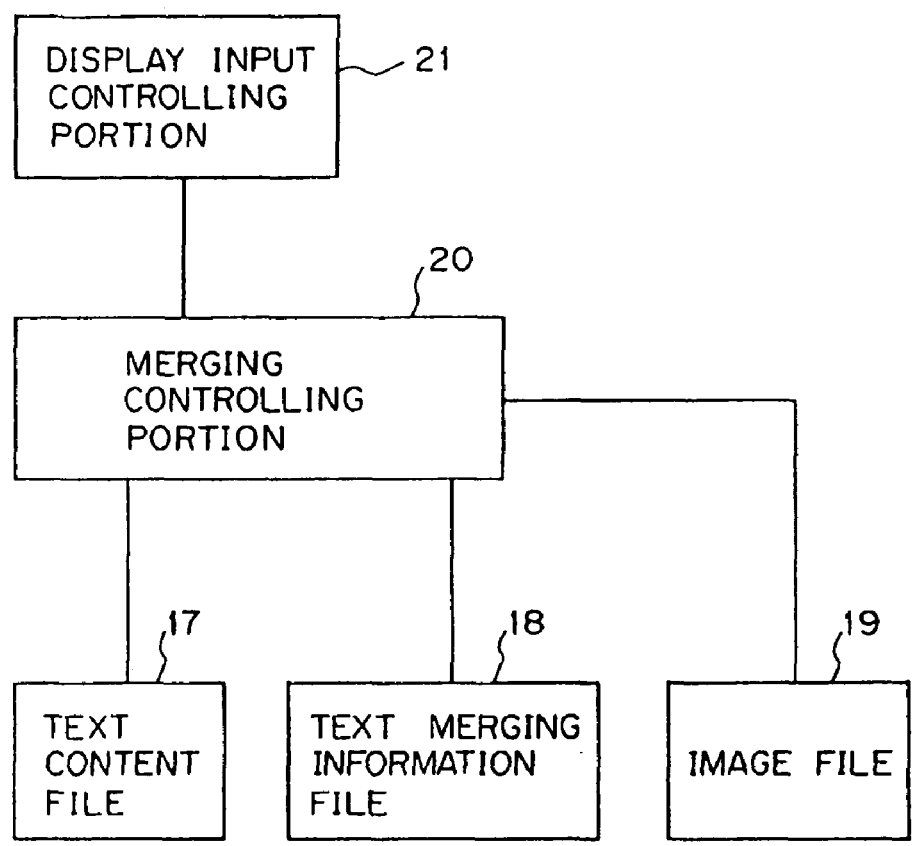
FIG. 2 is a block diagram of an image merging portion of terminal equipment in accordance with the present invention.

At step SG10, a merging process is performed. At this step, when the merging controlling portion 546 receives the image file name and the image size (for example, unit of mm), it calculates the frame size in which the image is merged by using the obtained image size. Thereafter, the merging controlling portion 546 sets the information with respect to the frame size (size, image file name, and so forth) to the corresponding table 546-2. In this process, the image size in the unit of length (for example, unit of mm) is returned. Thus, the frame size is calculated by dividing the length by the size per character. For example, when the image size is X×Y mm in the case of 6 cpi and 3 lpi, the numbers of columns and lines are expressed as X÷2.54×6 and Y÷2.54×3, respectively. Thus, the merging controlling portion 546 commands the text file controlling portion 544-1 and the character merging information controlling portion 544-2 to generate a frame of the size of the image data at a position corresponding to real text, and to merge the image. In other words, as shown with the text data of the text content file 541 of FIG. 37, "[FIG. 1]◁ Frame W1]" and "[FIG. 2]◁ [Frame W2]" are inserted. In addition, as shown with the merging information portion of the text merging information file 542 of the figure, an image file name, a size, and so forth are set in accordance with the frame W1 and the frame W2 (the image file 543 has stored image data in accordance with the image file name at SG9).

With the above process, the merging start position (the page position and the line position) and the frame size are set to the text merging information file 542 so that the frame size of the image data read by the scanner 548 is merged from the image merging start position of the text data. In addition, the image data are stored in the image file 543. Thus, image data can be merged with a text.

Figure 40A:
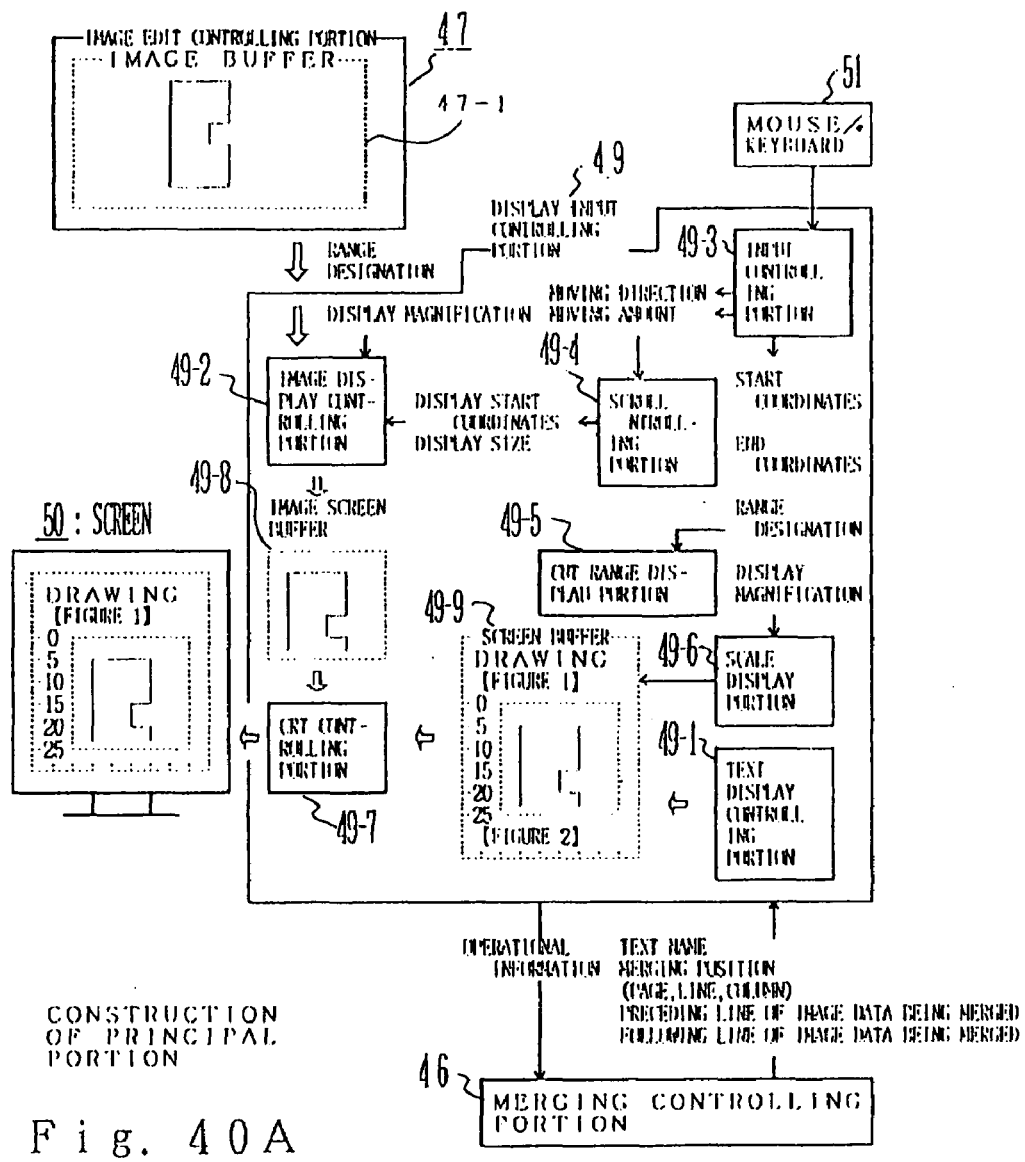
FIG. 40A is a schematic diagram showing a construction of an image displaying and cutting portion.
Figure 40B:
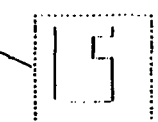
FIG. 40B is a schematic diagram showing the content of an image screen buffer (after scroll)

FIG. 40A is a schematic diagram showing a construction of principal portions of an image display/cut process. FIG. 40B is a schematic diagram showing the content of an image screen buffer which has been scrolled.

In FIG. 40A, the image edit controlling portion 47 controls the edit process of an image. In this construction, a scanner (not shown in the figure) reads image data of an entire paper. Thereafter, the data are stored in an image buffer 47-1. Image data where a cut range has been designated with a mouse/keyboard 51 are retrieved from the image buffer 47-1 and then stored in an image file 43.

A display input controlling portion 49 displays on a screen 50 data in a display frame (the dotted lines in the figure represent the frame) stored in a screen buffer 49-9 of image data stored in an image screen buffer 49-8. In addition, the display input controlling portion 49 displays a scale.

An image display controlling portion 49-2 has standard display start coordinates and a display size and writes image data transferred from the image buffer 47-1 to the screen buffer 49-8 in accordance therewith.

An input controlling portion 49-3 receives an area range designation, a scroll command, and so forth from the mouse/keyboard 51 or the like.

A scroll controlling portion 49-4 sends to the image display controlling portion 49-2 the display start coordinates and the display size in accordance with a moving direction and a moving amount being inputted with the mouse/keyboard 51. Thus, the image display controlling portion 49-2 writes image data to the image screen buffer 49-8 and scrolls the screen 50.

A cut range display portion 49-5 writes to a screen buffer 49-9 a cut rectangle in accordance with the designated range of the start coordinates and end coordinates being inputted with the mouse/keyboard 51 (their coordinates are entered by clicking the mouse as the start position and the end position).

A scale display portion 49-6 writes scales on outer peripheries of the image display frame of the screen buffer 49-9 in accordance with a display magnification of image data. When the display magnification of the image data is set to X times, the scale is decreased 1/X times so as to display the real size of the image data on the screen 50.

A CRT controlling portion 49-7 merges image data being read from the image screen buffer 49-8 with data read from the screen buffer 49-9 and displays the merged data on the screen 50. At the time, only the image data in the image screen buffer 49-8 in accordance with the image frame (the rectangular frame represented by the dotted lines in the figure) of the screen buffer 49-9 is displayed on the screen 50.

The image screen buffer 49-8 is for storing image data. The screen buffer 49-9 is for storing an image display frame, scales at outer peripheries of display frame, drawing numbers, and image data on a line just preceding and a line just following merged image data.

Figure 41:
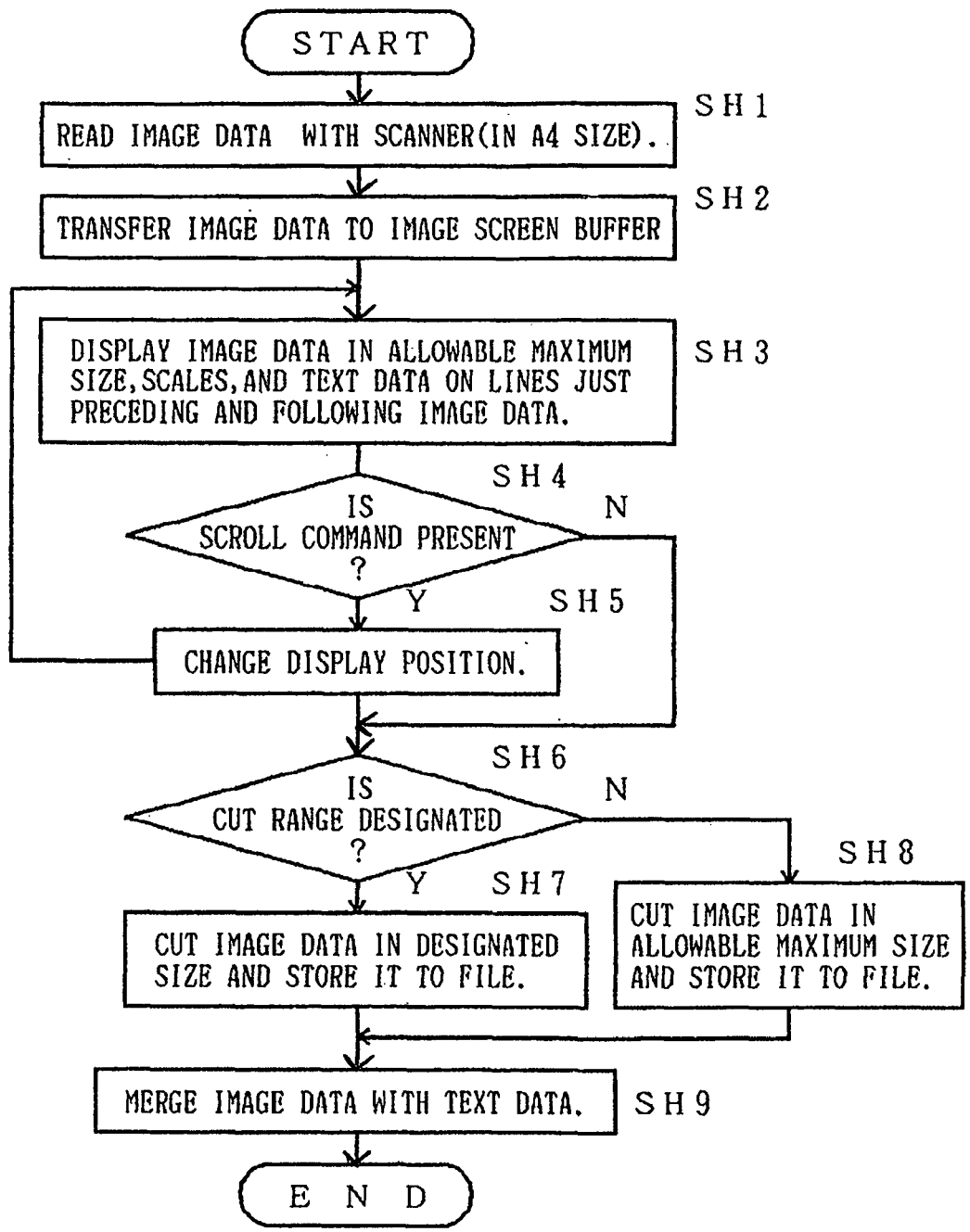
FIG. 41 is a flow chart showing an image data cut process and an image data merge process.

An operation in the construction shown in FIG. 40 is described in detail with reference to a flow chart showing an image cut and merge process shown in FIG. 41. When the cut process is started, at step SH1 a scanner (not shown in the figure) reads a drawing. The size of the drawing is, for example, A4. In other words, the scanner 548 reads all the content of the A4 size paper and stores the resultant data in the image buffer 47-1.

At step SH2, the image data stored in the image buffer 47-1 is transferred to the image screen buffer 49-8. In other words, the image display controlling portion 49-2 receives a display request from the image edit controlling portion 47 and then writes the resultant image data to the image screen buffer 49-8 in accordance with the standard display start coordinates and the display size which have been stored. At step SH3, image data are displayed in an allowable maximum size. In addition, scales and text data on a line just preceding and on a line just following the image data are displayed. In other words, the CRT controlling portion 49-7 merges the image data written to the image screen buffer 49-8 at step SH2 with text data of the maximum image frame size, scales, and text data on a line just preceding and on a line just following image data being merged and displays the merged data on the screen 50 as shown in the figure.

At step SH4, it is determined whether or not a scroll command is present. In other words, the input controlling portion 49-3 detects whether or not the operator has entered a scroll command (which has designated a moving direction and a moving amount) with the mouse/keyboard 51. When the determined result is YES, at step SH5 the display position is changed. In other words, after the scroll controlling portion 49-4 receives the moving direction and the moving amount, it updates the display start coordinates and sends to the image display controlling portion 49-2 the display start coordinates. Thereafter, the image display controlling portion 49-2 writes from the display start coordinates of the image data buffer 49-8 the image data received from the image buffer 47-1. The CRT controlling portion 49-7 displays the image data in the display frame of the screen buffer 49-9 as scrolled image data on the screen 50.

In this process, when the operator issues a scroll command, image data cut in the maximum size of text data from image data being read from an entire paper are displayed on the screen 50. Thus, the operator checks whether or not a desired image has been cut on the screen 50. Consequently, image data in the maximum merging size can be automatically cut. In addition, unnecessary image data such as a dirty portion at an edge of a paper can be readily deleted. Moreover, by displaying on the screen 50 scales in accordance with image data being read from a paper, a real size of the image can be readily determined on the screen 50.

When the determined result is NO, since no scroll command has been issued, step SH6 is executed.

At step SH6, it is determined whether or not a cut range has been commanded. In other words, the input controlling portion 49-3 determines whether or not the operator has commanded a cut range with the mouse/keyboard 51 (whether or not the operator has clicked two points of the start coordinates and the end coordinates which designate the cut range with the mouse). When the determined result is YES, the image data are cut in the designated size and then stored. In other words, after the cut range controlling portion 49-5 receives the start and end coordinates, it writes a rectangle in the cut range (a small rectangle represented by dotted lines) to the screen buffer 49-9. The CRT controlling portion 49-7 displays the image data, scales and so forth in the display frame (the small rectangle represented by dotted lines) of the screen buffer 49-9 on the screen 50. In addition, after the image edit controlling portion 47 being received cut range (start coordinate and end coordinate) receives the cut range from the image buffer 47-1, it cuts the image data in the cut range, correlates the image data in the image file 543 with the received image file name, and then stores the image data in the image file 543. On the other hand, when the determined result is NO, at step SH8 image data are cut in the maximum size and then stored.

Thereafter, the process advances to step SH9 from step SH7 or step SH8. As shown in step SG10 of FIG. 39, at step SH9, the text file controlling portion 541-1 and the character merging information controlling portion 544-2 generate a frame of the image size in accordance with the real text and merge an image.

When a cut range is designated in accordance with the above process, image data in the cut range can be merged with text data. Thus, only a desired image can be retrieved from a paper. For example, when a plurality of images are drawn on one paper, they can be divided into individual portions and then merged with text data one after the other. In addition, when a cut range has been designated, a display position thereof can be scrolled so as to cut image data in any position according to the process of steps SH3, SH4, and SH5.

Figure 42A:
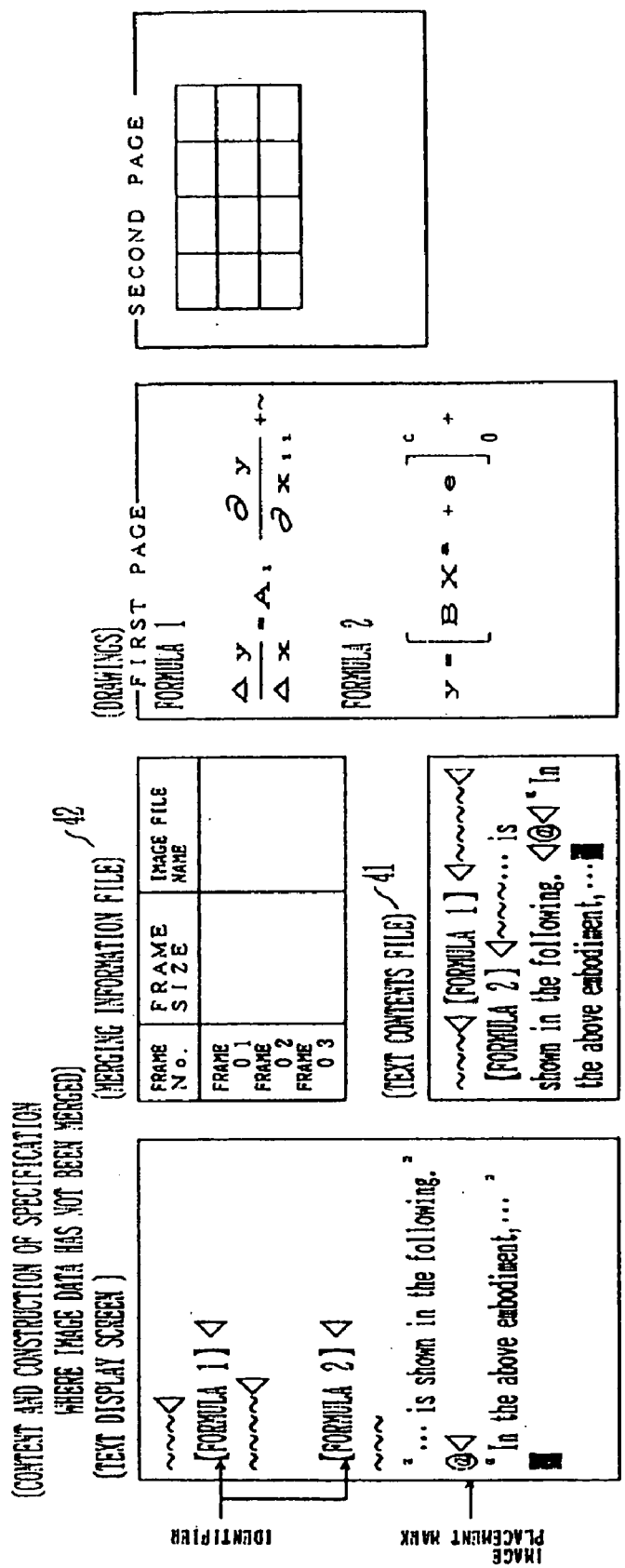
FIG. 42A shows schematic diagrams of content and construction of a specification where image data have not been merged in an image merge process.
Figure 42B:
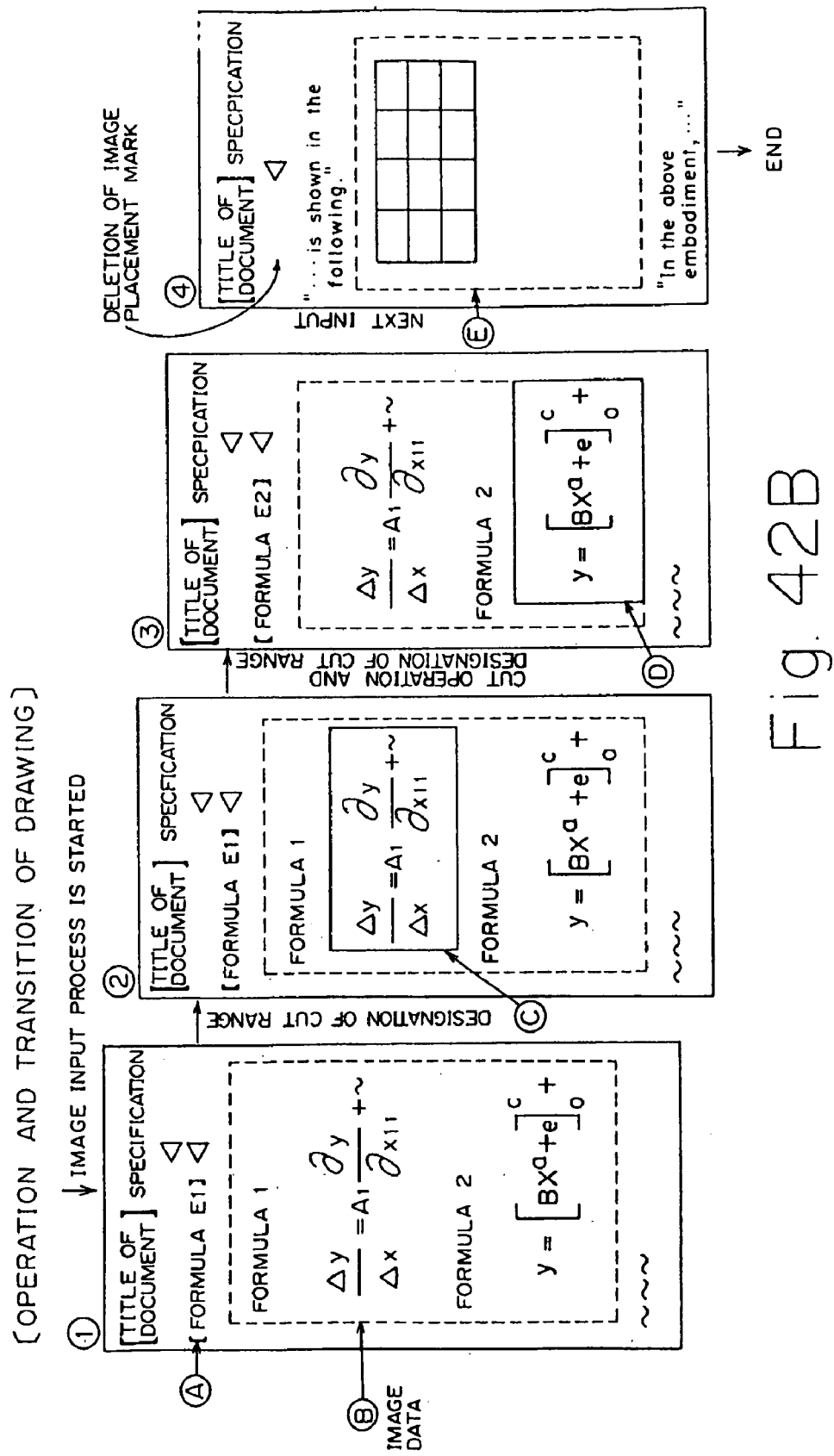
FIG. 42B shows schematic diagrams of operation and the corresponding screen transition in the image merge process.
Figure 42C:
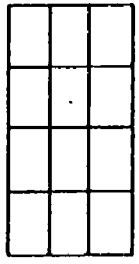
FIG. 42C shows schematic diagrams of content and construction of a text where image data have been merged in the image merge process.

FIGS. 42A through 42C are schematic diagrams for describing an image merging process.

FIG. 42A shows a content and a construction of a specification where image data have not been merged with a text content file 41. In this schematic diagram, [text display screen] is a screen of text data of the text content file 41 which is displayed on the screen 50. In this schematic diagram, "[Formula 1] ◁" or "[Formula 2]◁" is a set of identifier and carriage return i.e. line change marks; and "@ ◁" is a set of image insertion mark and carriage return marks.

In [a merging information file 42], image data have not been merged with text data. Thus, the frame size and image file name of the image data have not been set.

In [a text content file 41], text data have been stored as shown in the schematic diagram.

[Drawings] is an image drawn on a paper. On a first paper, two images of equations (formulas) E1 and E2 have been written; and on a second paper, one image has been drawn.

FIG. 42B shows [an operation and a transition of a screen]. When an image input process is started, images are merged with text data in the order from [1] to [4].

[1] represents an allowable maximum size of image data in a rectangle represented by a dotted line, the image data being merged with a text, image data being read by a scanner 548 from the first drawing paper to portion Ⓑ on a line following Ⓐ "[Formula 1] ◁" on the screen 50.

[2] represents that a cut range Ⓒ is designated in a rectangle represented by the dotted line of Ⓑ (by clicking the mouse at the upper left and lower right positions) so as to merge the portion Ⓒ with the text data as the image data of [Formula 1]. (At step SH6 of FIG. 41, since the determined result becomes YES, steps SH7 and SH9 are executed.)

[3] represents that a cut range Ⓓ is designated in the rectangle represented by the dotted line of Ⓑ (by clicking the mouse at the upper left and lower right positions) so as to merge the portion Ⓓ with the text data as the image data of [Formula 2]. (At step SH6 of FIG. 41, since the determined result becomes YES, steps SH7 and SH9 are executed.)

[4] represents an allowable maximum size of image data which are read by the scanner 548 from the second drawing paper and merged with the text at the portion Ⓔ on a line following text data " . . . is shown in the following" on the screen 50. In addition, [4] also represents a merging process of image data with the text (in this case, the image placement mark @ is deleted).

With the above process, as shown in FIG. 42C, image data are merged with a text.

FIG. 42C shows [a content and a construction of a specification where image data have been merged with the text content file 41]. However, image data are correlated with the text content file 41 in a format of [Frame 01] or the like. Thus, real image data are not directly merged with a text. [Text display screen] represents text data of the text content file 41 displayed on the screen 50. Image data are merged and displayed from the lines following "[Formula 1] ◁" and "[Formula 2]◁" and from the position of "@◁".

When image data are merged with text data, frame sizes and image file names are set in [a merging information file].

In [a text content file] image data have been merged as [frame 01], [frame 02], [frame 03], and so forth.

In addition, [an image file A] [an image file and B] and [an image file C] have been stored in an image file.

Figure 43:
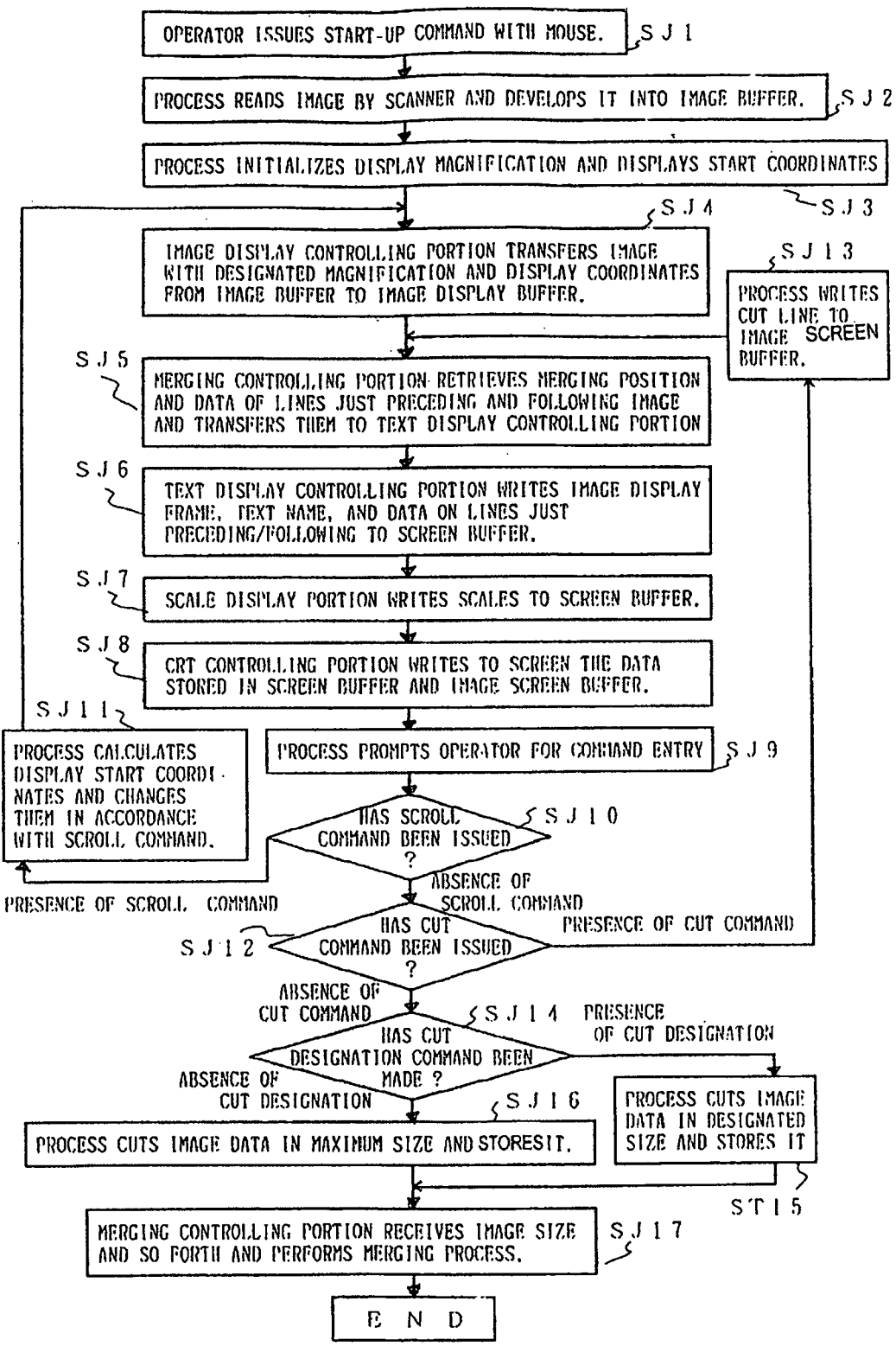
FIG. 43 is a flow chart showing an image display process and a cut process.

Then, with reference to FIG. 43, an image display/cut process is described in detail. First at step SJ1, a start command is issued with the mouse. Thereafter, at step SJ2, the image is read by a scanner 48 and developed into an image buffer. Thereafter, at step SJ3 a display magnification and display start coordinates are initialized. Thus, at step SJ2, the image being read can be displayed in the initial state. Thereafter, at step SJ4, an image display controlling portion 49-2 transfers the image with a designated magnification and display coordinates to an image screen buffer. Thereafter, at step SJ5, a merging controlling portion 46 retrieves data on lines just preceding and following the data dot of the merging position and sends this data to a text display controlling portion 49-1. At step SJ6, the text display controlling portion 49-1 writes the display frame, text name, and the preceding and following lines of the image to the screen buffer. At step SJ7, a scale display portion 49-6 writes scales to the screen buffer 49-9. The scales are displayed by the scale display portion 49-6 in display input controlling portion 49. Thereafter, at step SJ8, a CRT controlling portion 49-7 retrieves image data from the screen buffer 49-9 and the image screen buffer 49-8 and then outputs the image information to a screen 50.

The initialization is performed using this process. In this state, that is at step SJ9, the operator is prompted for a command input. When the operator enters a command, at step SJ9 it is determined whether or not the entered command is a scroll command. When the image position is improper, that is the area which is displayed on the screen 50 is narrower than the image stored in the image buffer 47-1 of the image controlling portion 47, the operator can move the mouse so as to display a desired drawing. The movement command of the mouse is referred to as a scroll command. At step SJ10, when it is determined that a scroll command has been issued, at step SJ11 the display start coordinates in accordance with the direction (up, down, right, or left) commanded with the mouse are calculated and updated. Thereafter, steps of SJ4 or later are executed again. Although the display start coordinates have been initialized at step SJ3, they are changed at step SJ11. Thereafter, at steps SJ4 to SJ8, a desired screen is displayed. At that time, since the operator does not issue a scroll command, at step SJ10 it is determined that no scroll command has been issued. Thereafter, at step SJ12, it is determined whether or not a cut command has been issued. When a cut command has been issued, at step SJ13 the cut point is written to the image screen buffer 49-8. Thereafter, steps of SJ5 and are executed again.

By repeating scroll step SJ10 and cut step SJ12, the cut size of a desired portion is determined. At step SJ12, it is determined that a cut command has not been issued. Thereafter, at step SJ13, it is again determined whether or not a cut designation has been made. When a cut designation has been made, the area surrounded by the cut line is stored at step SJ13. At step SJ14, image data are cut in the designated size and stored. When a cut designation has not been made at step SJ16, image data are cut at the maximum size and stored. After step SJ15 or SJ16, the merging controlling portion 546 receives an image size and performs a merging process at step SJ17.

With the above process, image data are read and displayed. When the displayed area differs from a desired area, the displayed area can be scrolled. In addition, only a desired area can be cut.

Figure 44:
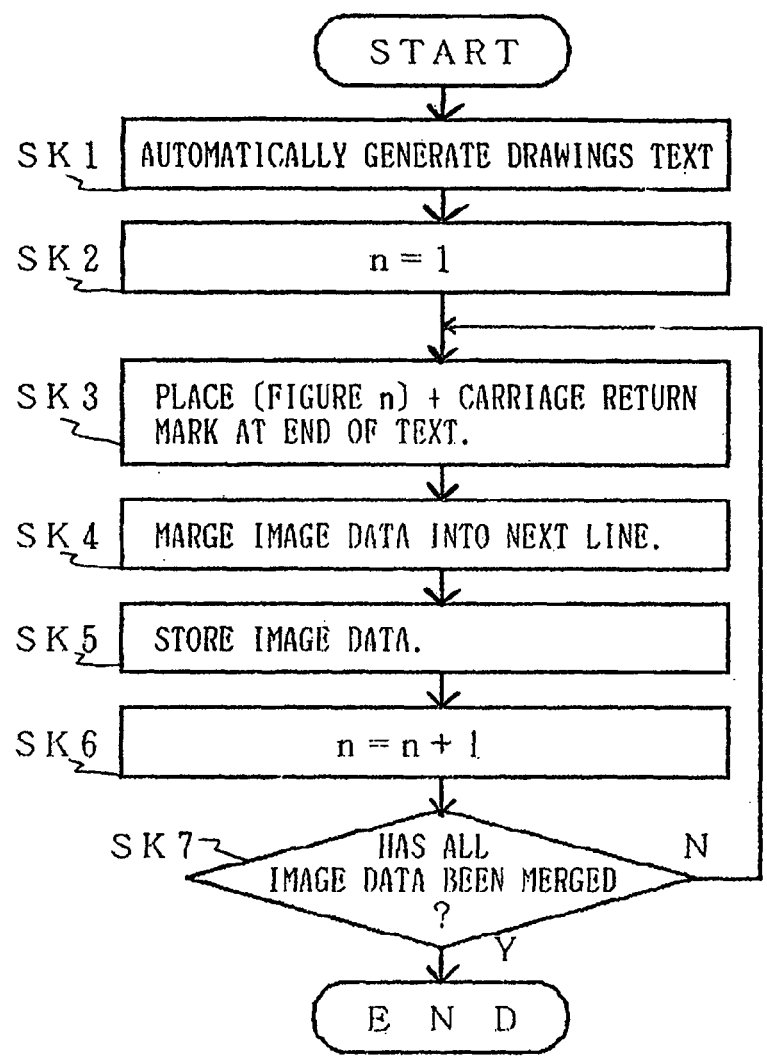
FIG. 44 is a flow chart showing an automatic drawing generation process.

FIG. 44 is a flow chart showing an automatic drawing generation process. In this process, when an image is merged with a text, [Figure n] and a carriage return mark are placed in the text.

When this process is started, a drawing text is automatically generated (at step SK1). Thereafter, variable n is initialized (n=1) (at step SK2). Thereafter, "[Figure n]+carriage return mark" are placed at the end of the text (where n=1, 2, 3, . . . , etc.) (at step SK3). For example, with this process, as shown by reference letter A of [text display screen] ① of FIG. 42B, "[Formula 1]+◁" are placed in the text.

Thereafter, image data are merged on the following line (at step SK4). For example, image data are merged on the line following "[Formula 1]+◁]" of the [text display screen] of FIG. 42C.

Following step SK4, the image data are stored (at SK5). At this step, the image data are correlated with the image file name and then stored in the image file 543. Thereafter, the variable n is incremented by 1, that is, n=n+1 (at step SK6). Thereafter, it is determined whether or not all image data has been merged (at step SK7). When the determined result is YES, the process is ended (END). When the determined result is NO, the steps of SK3 and later are repeated.

With the above process, drawing numbers "[Figure n]+◁" (where n=1, 2, 3, . . . , etc.) can be automatically placed on the line preceding image data to be merged with a text. When image placement mark @+◁ are present, the image placement mark @ is deleted and only ◁ is placed.

Figure 45:
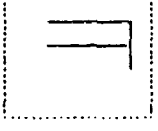
FIG. 45 is a schematic diagram describing an image data update process.

FIG. 45 is a schematic diagram describing an image data update process.

(1) The text merging information controlling portion 544-2 reads information of image data merged with a text from the text merging information file 542 and develops it in the corresponding table 546-2 (the preceding line and the following line are blank).

(2) The text file controlling portion 544-1 reads the content of text from the text content file 541. Thus, the text file controlling portion 544-1 reads merging commands (identifiers and image placement marks), position information, and text data on lines immediately preceding and immediately following image data. Thereafter, the text file controlling portion 544-1 places such information and text data in the corresponding table 546-2.

(3) The merging controlling portion 546 commands the text file controlling portion 544-1 to send the blanked information on the lines immediately preceding and immediately following image data. Thereafter, the merging controlling portion 546 receives the information and then fills with them.

(4) The merging controlling portion 546 sorts the corresponding table 546-2 in accordance with the start positions (start pages and lines). The image data without image file names have not been merged.

(5) After the corresponding table has been edited, an image table F1 shown in FIG. 45 is displayed. An image table F2 schematically illustrates the content of the image table F1.

(6) By selecting, for example, A from the image table F1, image data to be updated can be readily selected and updated.

Figure 46:
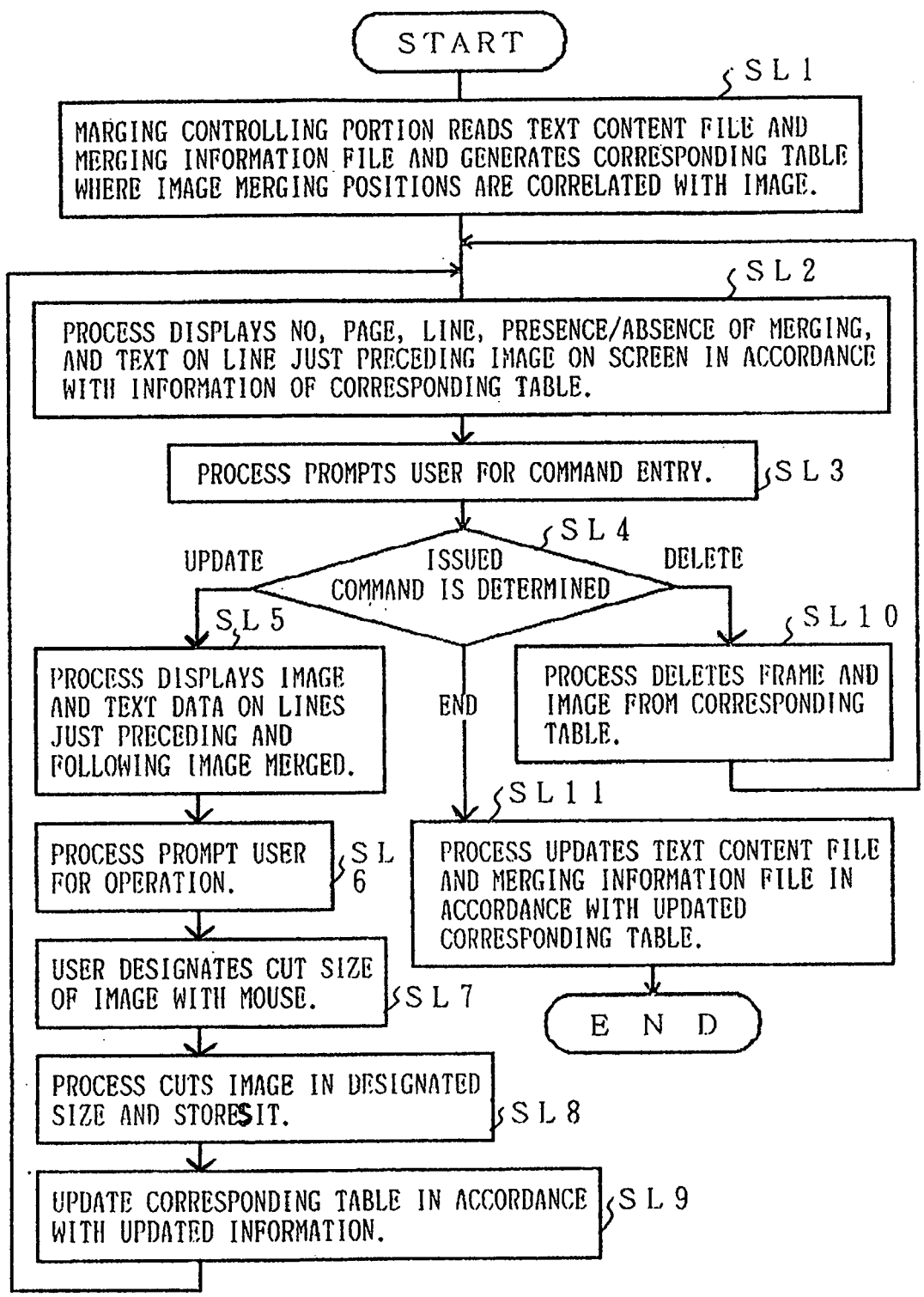
FIG. 46 is a flow chart showing the image update process.

FIG. 46 is a flow chart showing an image update process. When the execution of an image update process is started, at step SL1 the merging controlling portion 546 reads the text content file 541 and the text merging information file 542. Thereafter, the merging controlling portion 546 generates a corresponding table where image merging positions are correlated with image. Thereafter, the merging controlling portion 546 displays a merging number, line, presence/absence of merging, and text data of preceding line in accordance with the information of the corresponding table generated at step SL2. Thereafter, at step SL3, the process prompts the user for a command entry. When the user issues a command, at step SL4 it is determined whether the issued command is an update command, an end command, or a delete command. When the entered command is an update command, at step SL5 image data and text data on lines just preceding/following thereof are displayed. At step SL6, the process prompts the user for an operation. At step SL7, image data are cut with a mouse or the like. At step SL8, image data are cut in the designated size and stored. At step SL9, the corresponding table is updated in accordance with the updated information. Thereafter, steps of SL2 and later are repeated. Thus, image data newly cut, the page, the line, and the presence of merging are displayed. At step SL10, when the issued command is a delete command, the frame and the image are deleted from the corresponding table.

Thereafter, steps of SL2 or later are repeated.

When the issued command is an end command, at step SL11 the text content file and the merging information file are updated in accordance with the corresponding table being updated at step SL11.

In this process, the text content file and the merging information file are updated or deleted.

Next, a page adjustment process is briefly described.

(1) As shown in FIG. 38, a corresponding table 546-2 is generated.

(2) It is determined whether or not an "image at page boundary" takes place for each page frame. (When the "start line+line size" of the corresponding table 546-2 is larger than the maximum page number per page of text data, an "image at page boundary" takes place).

(3) When it is determined that an "image at page boundary" is taking place, a carriage return mark is placed just before the image frame and the image frame is moved to the next page. In accordance with the movement amount, the corresponding table 546-2 is updated. Likewise, steps (2) and (3) are repeated for all image frames.

With the above process, image data merged with a text can be free from an "image data at page boundary".

Figure 47:
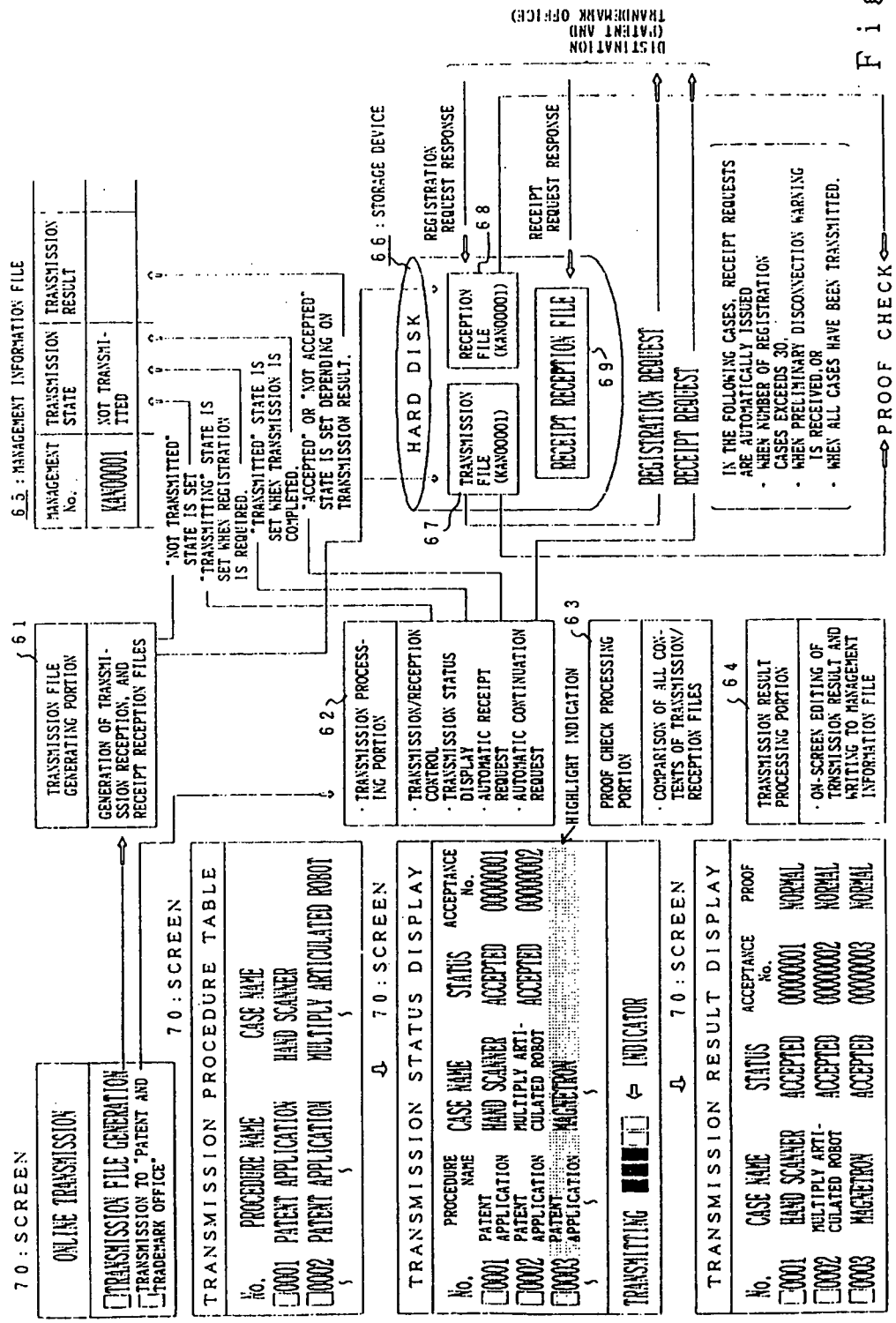
FIG. 47 is a schematic diagram showing a construction in accordance with a further embodiment of the present invention.

Next, the construction and an operation of a further embodiment of the present invention, comprising an online transmitting/receiving apparatus, is described in detail with reference to FIGS. 47 to 51. In FIG. 47, a transmission file generating portion 61 generates a transmission file 67, a reception file 68, and a receipt reception file 69 (or partition areas therefor) in an online transmission mode. When the operator selects a transmission file generation mode on an online transmission screen, the transmission file generating portion 61 is started.

A transmission processing portion 62 performs many operations such as controlling transmission/reception, displaying a transmission status, and issuing an automatic receipt request and an automatic continuation request, which are transmitted from the online transmission screen to a party. For example, when the operator selects a "Patent and Trademark Office" transmission mode, the transmission processing portion 62 is started. Transmission and reception of data are controlled in accordance with a predetermined transmission procedure defined between the operator and a party.

After all the text data have been transmitted, a proof check processing portion 63 compares the content of the transmission file 67 with that of the reception file 68 so as to proof check the text data being transmitted.

A transmission result processing portion 64 writes the transmission result to a screen edit and management information file.

A management information file 65 correlates text data (procedure) with unique management number and manages transmission statuses ("not transmitted" status, "transmitting" status, and "transmitted" status), transmission results ("accepted" and "not accepted"), and so forth.

A storage device 66 is a non-volatile recording device, for example, a hard disk device. The storage device 66 stores the transmission file 67, the reception file 68, the receipt reception file 69, and so forth.

A screen 70 displays online transmission data, a transmission procedure table, a transmission status, and a transmission result.

Figure 48:
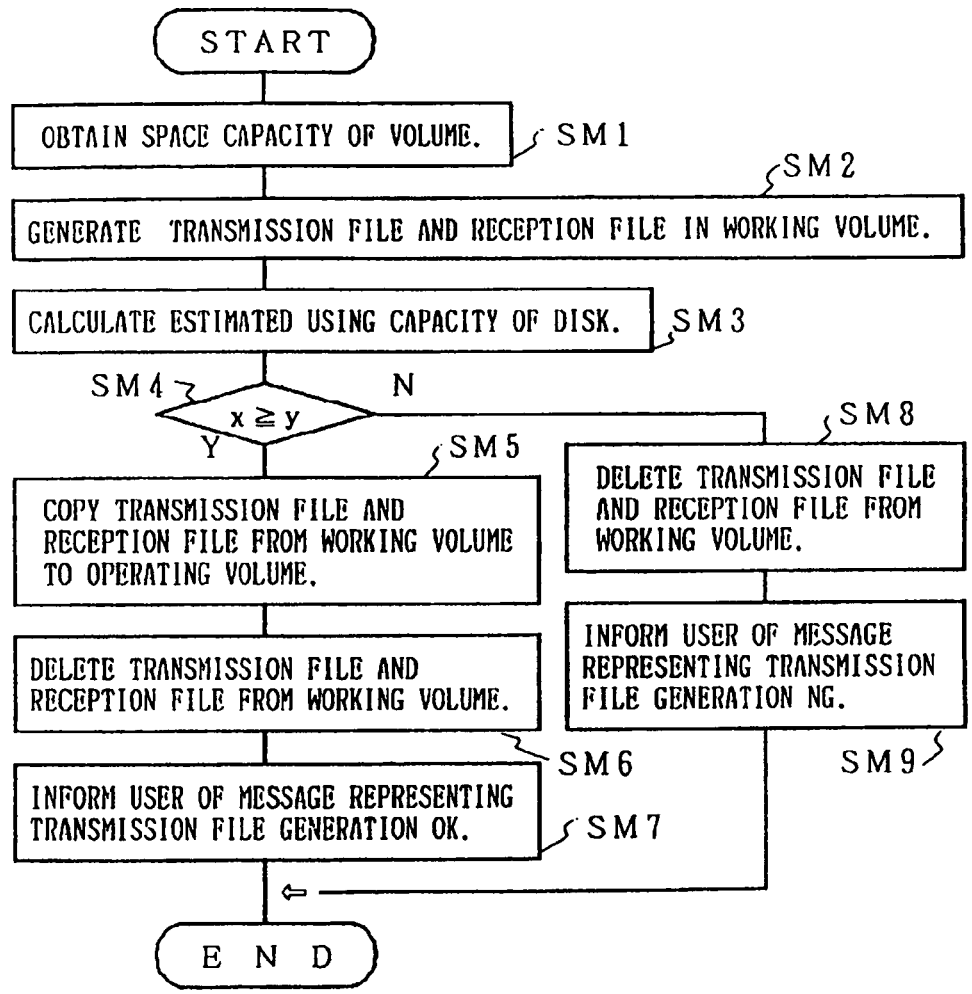
FIG. 48 is a flow chart showing a process for generating a transmission file, a reception file, and a receipt reception file.

Then, in accordance with a flow chart shown in FIG. 48, a generation process for a transmission file, a reception file, and a receipt reception file are described in detail.

When the execution of a generation process for each file is started, at step SM1 a volume space capacity is obtained. Thus, a space capacity x of a hard disk device, which is a storage device 66, is obtained.

Thereafter, at step SM2, a transmission file and a reception file are generated in a working volume. At step SM3, an estimated disk using capacity is calculated. At steps SM2 and Sm3, when the transmission file capacity is referred to as "a", the reception file capacity is estimated as:

When the proof operation is designated, the reception file capacity becomes (a+1024).

When the proof operation is not designated, the reception file capacity becomes (1024).

When the receipt reception file capacity is referred to as "b", the overall capacity (=y) is estimated as:

When the proof operation is designated, the overall capacity "y" becomes (2a+b+1024).

When the proof operation is not designated, the overall capacity "y" becomes (a+b+1024).

Following step SM3, at step SM4 it is determined whether or not x (disk space capacity) is larger than or equal to y (overall capacity). When the disk blank capacity x is larger than the overall capacity y necessary for the transmission file, the reception file, the reception file, and so forth can be obtained (that is, the determined result is YES), and at step SM5 the transmission file and the reception file are copied from the working volume to the operating volume. Thereafter, at step SM6 the transmission file and the reception file are deleted from the working volume. At step SM7, a message representing that transmission file generation is OK is sent to the user (that is, a message "transmission ready OK" is displayed on the screen 70). In contrast, when the blank capacity is smaller than the overall capacity y (that is, the determined result at step SM4 is NO), the files cannot be obtained. Thus, at step SM8, the transmission file and the reception file are deleted from the working volume. Thereafter, at step SM9, a message representing that transmission file generation is NG is sent to the user.

With the above process, when the user selects the transmission file generation mode on the screen 70, the transmission file generating portion 61 simultaneously generates the transmission file 67, the reception file 68, and the receipt reception file 69 in the transmission state. Thus, after the transmission is started a reception disable state due to insufficient storage space in the reception file 68 and the receipt reception file 69 can be prevented.

Figure 49:
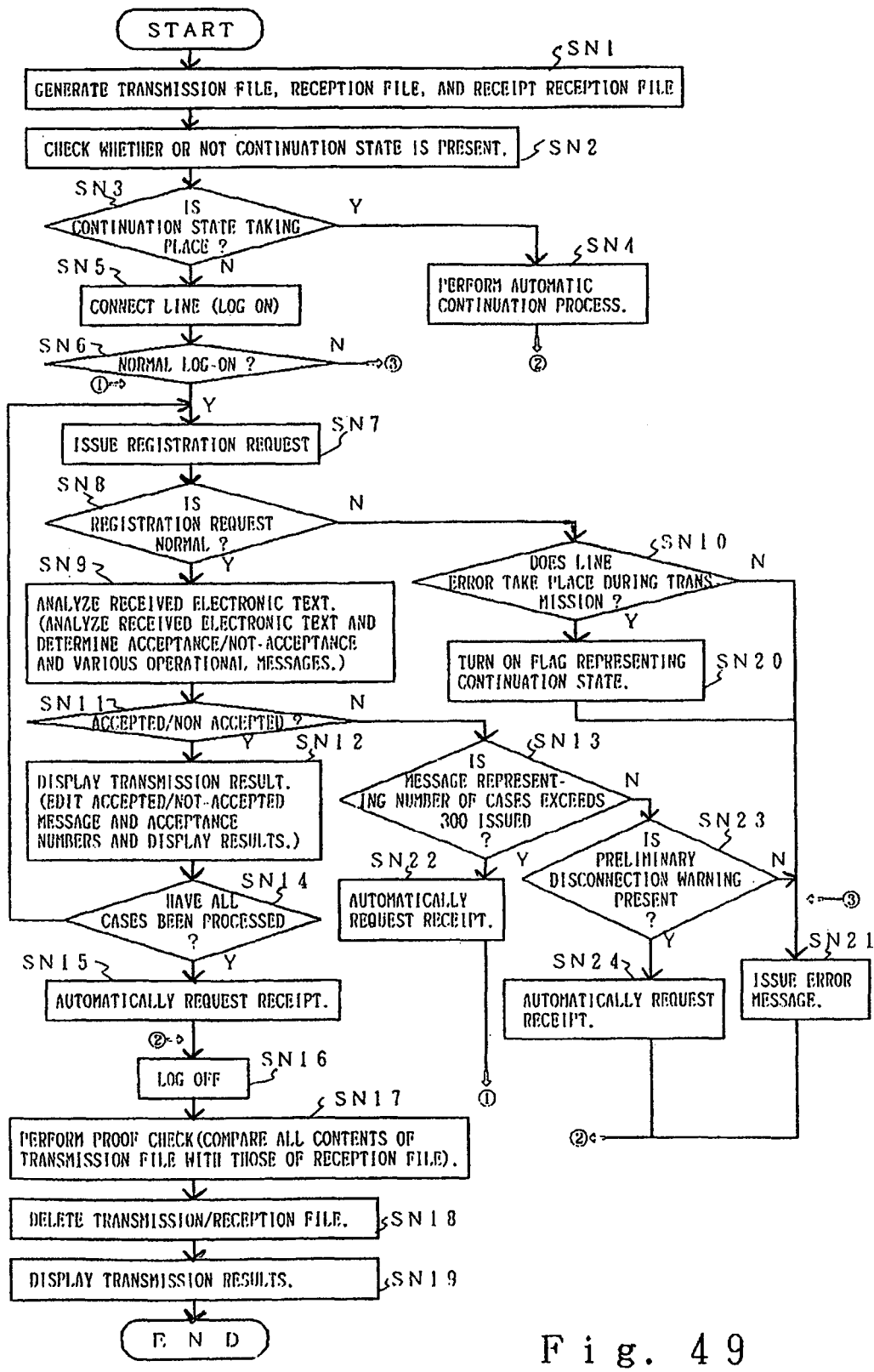
FIG. 49 is a flow chart showing an online process.

Next, an online process is described in detail with reference to the flow chart shown in FIG. 49.

At step SN1, a transmission file, a reception file, and a receipt reception file are generated. Thus, as described with reference to the flow chart shown in FIG. 48, since these three files are generated in a transmission state, a reception failure due to insufficient storage capacity can be prevented.

Thereafter, at step SN2, it is determined whether or not a continuation state is occurring, that is, whether or not the preceding transmission has been completed. At this step, it is determined whether or not there are transmission files set to "transmitting" in the management information file 65 for some reason (for example, a line error) causing them to be not transmitted. Thereafter, at step SN3, it is determined whether or not a continuation state is occurring. When the determined result is YES (that is, there are transmission files where "transmitting" status is set in the management information file 65), at step SN4 an automatic continuation process (shown in FIG. 51) is performed. With this process, text data with a management number in "transmitting" status is retransmitted. Thereafter, the transmission of text data with a management number in "not transmitted" status is continued. When the determined result is NO, since there are no transmission files in "transmitting" status, the process advances to step SN5. At step SN5, the line is connected (logged on).

At step SN6, it is determined whether or not the log-on process has been performed normally. When the determined result is YES, at step SN7 a registration request is issued. At step SN8, it is determined whether or not the registration request is normal. When the determined result is YES, the process advances to step SN9. When the determined result is NO, the process advances to step SN10. In addition, when the determined result is NO, at step SN21 an error message is issued.

At step SN9, a received electronic text is analyzed so as to determine "accepted" status or "not accepted" status and various operational messages. At step SN11, it is determined whether or not the electronic text contains an "accepted" message or a "not accepted" message. When the determined result is YES, the process advances to step SN12. When the determined result is NO, the process advances to step SN13.

At step SN12, the transmission result is displayed. In other words, data such as "accepted" message or "not accepted" message and acceptance number are edited and displayed on the screen.

At step SN14, it is determined whether or not all cases have been processed. When the determined condition is YES, since all text data (procedures) commanded have been transmitted, the process advances to steps SN15 to SN19. At these steps, the process performs several operations such as issuing a receipt request and performing a proof check. When the determined result is NO, since all text data (procedures) commanded have not been yet transmitted, steps of SN7 and later are repeated.

At step SN15, an automatic receipt request is transmitted to a party (such as the Patent and Trademark Office) through a line. Thereafter, receipt data are received and stored in the receipt reception file 69.

At step SN16, the line is disconnected (logged off).

At step SN17, a proof check is performed. In other words, the entire content of the transmission file 67 and of the reception file 68 are compared and it is determined whether or not they match each other.

At step SN18, the transmission file and the reception file are deleted.

At step SN19, the transmission result ("accepted" or "not accepted") is displayed.

With the above process, text data of cases commanded are transmitted to a party. In addition, an "accepted" or a "not accepted" message, which is sent back from the party, is displayed on a real time basis. Where all the cases have been transmitted, where 300 cases are transmitted, or where a preliminary disconnection warning is received, the process can automatically issue a receipt request, receive the receipt, and perform a proof check.

When the result determined at step SN8 is NO, that is, it is determined that the registration request is abnormal, the process advances to step SN10. At step SN10, it is determined whether or not a line error is occurring during transmission. When the determined result is YES, at step SN20 a transmission status flag representing a continuation state is turned on. Thereafter, when the determined result is NO, at step SN21, an abnormal message is issued. Thereafter, steps of SN16 or later are performed. Thus, when a line error or the like occurs, the flag representing the continuation state is turned on and the line is disconnected.

When the result determined at step SN11 is NO and the received text does not contain an "accepted" or a "not accepted" message, the process advances to step SN13. At step SN13, it is determined whether or not a message representing that transmitted cases exceed 300 is occurring. When the determined result is YES, the process advances to step SN22. At step SN22, while the line is connected, an automatic receipt request is issued. Thereafter, a receipt is received. Thereafter, steps of SN17 and later are repeated. When the determined result is NO, the process advances to step SN23. At step SN23, it is determined whether or not a preliminary disconnection warning is occurring. When the determined result is YES, the process advances to step SN24. At step SN24, while the line is connected, an automatic receipt request is issued and then a receipt is received. Thereafter, the process moves to step SN16. When the result determined at step SN24 is NO, the process moves to step SN21. At step SN21, an error message is issued. Thereafter, the process moves to step SN16. Thus, when the number of cases being transmitted exceeds 300 or a preliminary disconnection warning [a message issued before a predetermined time of stopping the line connection (for example, 15 minutes before disconnection)] is taking place, while the line is connected, a receipt request is automatically issued and the receipt is received. When the line is disconnected in one of such states, even if the line is connected again, the receipt request is not accepted.

Figure 50:
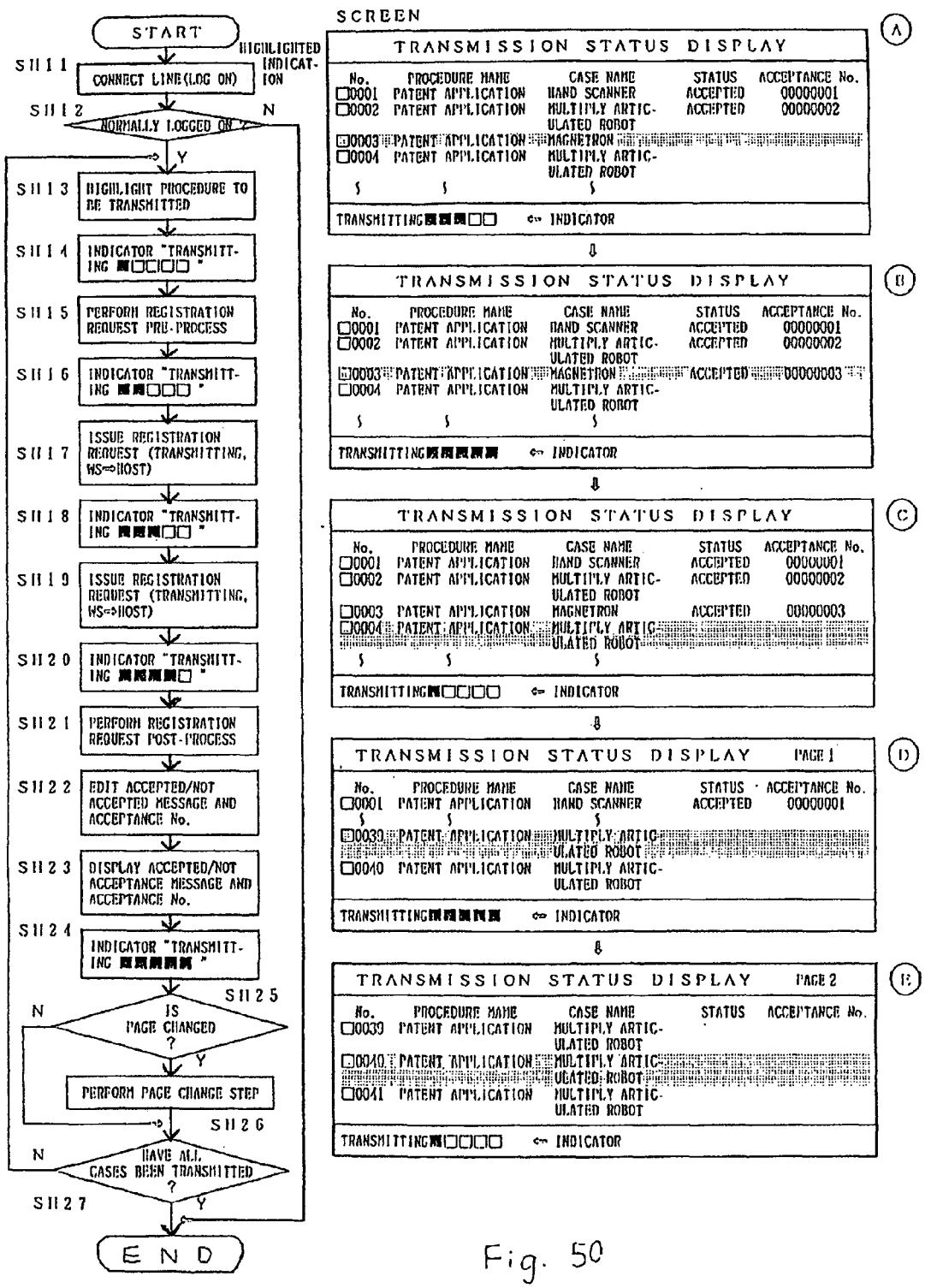
FIG. 50 are schematic diagrams describing a highlight display and an indicator display of a transmission procedure.

Then, with reference to FIG. 50, a highlight indication and an indicator indication of a transmission procedure are described in detail.

At step SH11 in FIG. 50, the terminal equipment is connected to the host (logged on).

At step SH12, it is determined whether the log-on has been performed normally. When the determined result is YES, steps of SH13 or later are performed. When the determined result is NO, since the line connection was unsuccessful, the process is ended (END).

At step SH13, a procedure to be transmitted is highlighted. For example, "0003, Patent application, Magnetron" which is hatched in right schematic diagram Ⓐ are highlighted. Thus, the operator can know which procedure (text data) is being transmitted.

At step SH14, the indicator displays "Transmitting ■□□□□."

At step SH15, a registration request pre-process is performed. In other words, the communication status is changed to the "transmitting" status.

At step SH16, the indicator displays "Transmitting ■■□□□."

At step SH17, a registration request is issued (transmitting status, from WS to HOST). In other words, a registration request is transmitted from the electronic application terminal equipment (or a work station) to a host computer of the Patent and Trademark Office.

At step SH18, the indicator displays "Transmitting ■■■□□." This indication is the same as that shown by right schematic diagram (A).

At step SH19, a registration request is issued (transmitting status, form HOST to WS). In other words, a registration request is transmitted from the host computer of the Patent and Trademark Office to the work station.

At step SH20, the indicator displays "Transmitting ■■■■□.

At step SH21, a registration request post-process is performed.

At step SH22, accepted/not accepted message and acceptance number are edited.

At step SH23, the accepted/not accepted message and acceptance number are displayed.

At step SH24, the indicator displays "Transmitting ■■■■■". This indication is the same as that shown by right schematic diagram Ⓑ.

At step SH25, it is determined whether or not a page is changed. When the determined result is YES, the process advances to step SH26. At step SH26, a page change process is performed. In other words, as shown by right schematic diagram Ⓓ, 40 procedures can be displayed on the screen. For example, when the transmission of the 39th procedure of page 1 is started, this procedure is displayed at the beginning of page 2 as shown by right schematic diagram Ⓔ. Thus, at any timing, both the procedure being transmitted and the next procedure can be clearly displayed. Thus, the procedures can be readily transmitted. When the determined result at step SH25 is NO, the process advances to step SH27.

At step SH27, it is determined whether or not all cases have been processed. When the determined result is YES, since all the procedures have been transmitted, the process is ended (END). When the determined result at step SH27 is NO, since all the procedure have not yet been transmitted, steps of SH13 and later are repeated.

The right hand schematic diagrams Ⓐ to Ⓔ of FIG. 50 show an example of screen transition.

The screen shown by schematic diagram Ⓐ highlights "0003, Patent application, Magnetron" which is currently being transmitted. In addition, the indicator displays "Transmitting ■■■□□" (same as step SH18 which is the registration request status (transmitting, WS ← HOST) at step SH19).

The screen shown by schematic diagram Ⓑ highlights "0003, Patent application, Magnetron" which is currently being transmitted. In addition, the indicator displays "Transmitting ■■■■■" (same as step SH24 which is the status where an acceptance number 00000003 is shown).

The screen shown by schematic diagram Ⓒ highlights "0004, Patent Application, Multiply Articulated Robot". In addition, the indicator displays "Transmitting ■□□□□" (same as step SH14 which is the status of the registration request preprocess at step SH15).

The screen shown by schematic diagram Ⓓ highlights "0039, Patent Application, Multiply Articulated Robot" which is currently transmitted at the second line from the end of page 1. In addition, the indicator displays "Transmitting ■■■■■".

The screen shown by schematic diagram Ⓔ displays "0039, Patent Application, Multiply Articulated Robot" which is currently transmitted at the first line of page 2 and highlights "0040, Patent Application, Multiply Articulated Robot" which is currently transmitted. In addition, the indicator displays "Transmitting ■□□□□". When the last two procedures of a page have been transmitted as shown by schematic diagram Ⓓ, the remaining procedures are scrolled to the beginning of the next page so as to improve the visibility.

Figure 51:
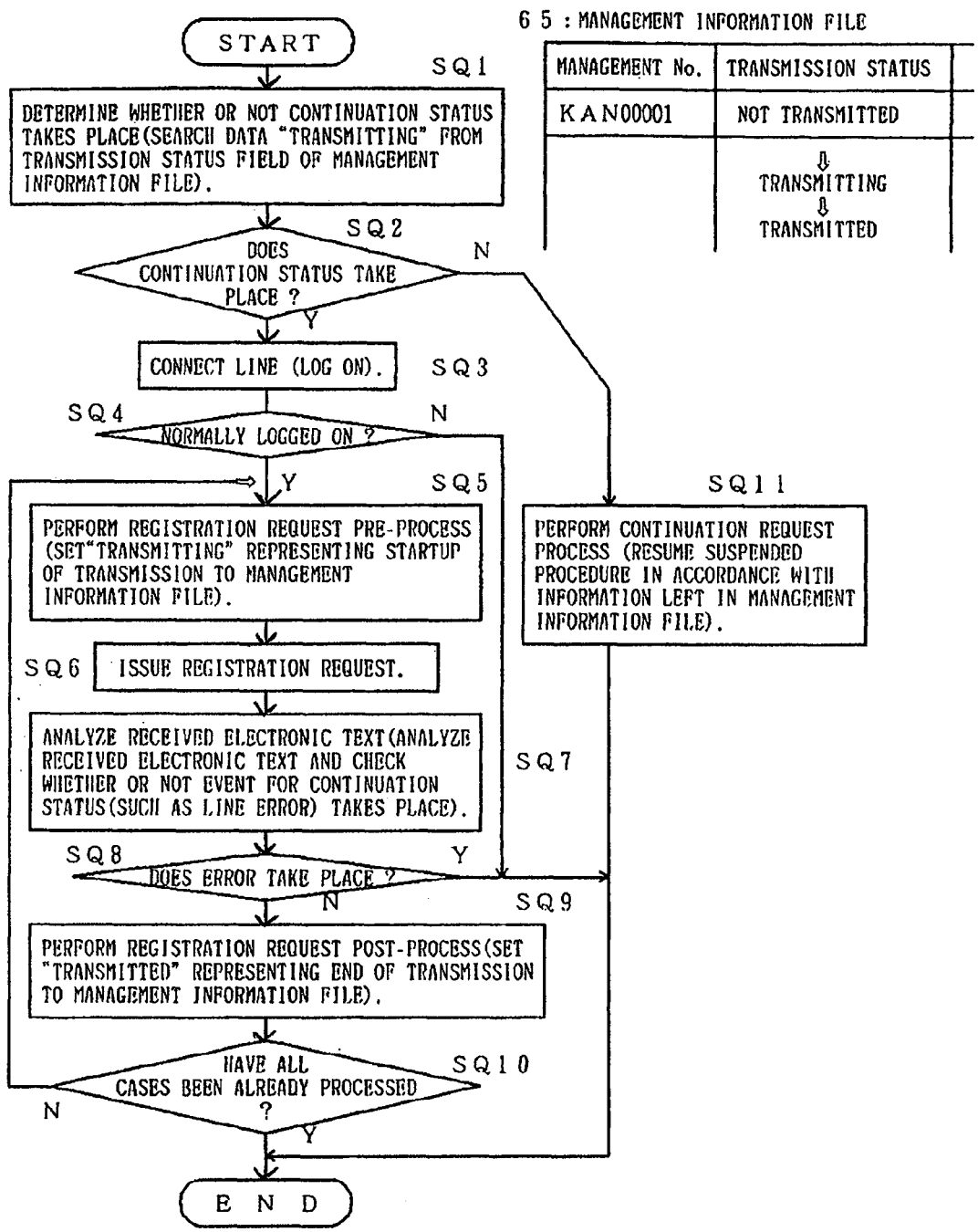
FIG. 51 is a flow chart showing an automatic continuation process.

Next, the above automatic continuation process SN4 is described in detail with reference to the flow chart shown in FIG. 51. At step SQ1, it is determined whether or not data "Transmitting" is present in the transmission status field of the management information file 65 shown by the right schematic diagrams thereof.

At step SQ2, it is determined whether or not continuation is required. When the determined result is NO, at steps SQ3 to SQ10 a registration request process if performed. When the determined result is YES, the process advances to step SQ11. At step SQ11, a continuation request process is performed. In other words, in accordance with information left in the management information file 65, a procedure with "Transmitting" in the transmitting status field is resumed.

When the determined result at step SQ2 is NO, that is, it is determined that continuation is not required, at step SQ3 the line is connected (logged on). At step SQ4, it is determined whether or not the log-on operation is performed normally. When the determined result is YES (normally logged on), the process advances to step SQ5. At steps [of] SQ5 [and] later, a transmission process is performed. When the determined result is NO (unsuccessful log-on), since the line is not connected, the process is ended (END).

At step SQ5, a registration request pre-process is performed. In other words, data "Transmitting" representing the start-up of transmission of a suspended procedure is recorded in the management information file 65.

At step SQ6, a registration request is sent to the host through the line.

At step SQ7, a received electronic text is analyzed. In other words, it is determined whether or not an event for continuation status (such as line error) takes place.

At step SQ8, it is determined whether or not an error takes place. When the determined result is YES, since an error such as a line error takes place, the process is ended (END). When the determined result is NO, the process advances to step SQ9. At step SQ9, a registration request post-process is performed. In other words, data "Transmitted" representing that a procedure has been transmitted is stored in the management information file 65.

At step SQ10, it is determined whether or not all procedures have already been transmitted. When the determined result is YES, since all the procedures to be transmitted have already been transmitted, the process is ended (END). When the determined result is NO, step SQ5 and later are repeated.

In this process, when the transmission status "Transmitting" is detected in the management information file 65, a continuation command is automatically issued. Thus, since a procedure with transmission status "Transmitting" is automatically retransmitted, the operator can proceed with the operation without intervention for error restoration.

Figure 52:
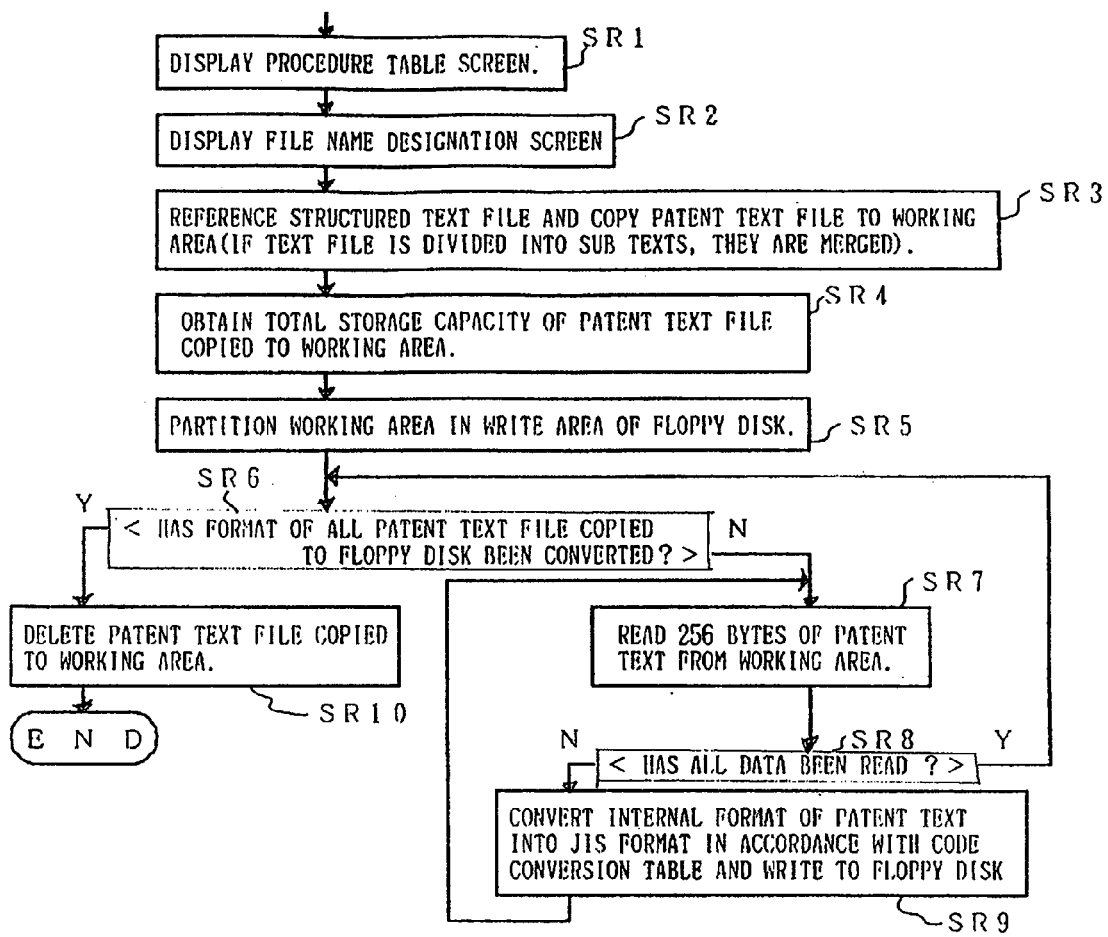
FIG. 52 is a flow chart showing a process of an offline application portion.

FIG. 52 is a flow chart showing an offline application process. FIGS. 53A and 53B are schematic diagrams showing an example of screens for use in an offline application. The transmission file generating portion 33-1 generates a transmission file for an online application. However, in the third embodiment of the invention, the transmission file generating portion 33-1 can apply for patents and utility patents in an offline mode.

The offline application portion 34-1 shown in FIG. 9 executes a process for an offline application. When the execution of the offline process is started (START), at step SR1 a procedure table as shown in FIG. 53A is displayed. This procedure table is read from the procedure management information file 26. When the operator selects a case name for an offline application, the process advances to step SR2. At step SR2, a file name designation screen is displayed. FIG. 53B is a schematic diagram of an example of the file name designation screen. Thereafter, at step SR3 a structured text file is referenced and a patent text file is copied to a working area. When a text file is divided into several portions, they are merged. In other words, in accordance with a selected procedure management record, a procedure file name and a code text file name are obtained. In addition, in accordance with a unique procedure file name, a procedure file is retrieved and a structured text file is read. In accordance with node information in the second level of the structured text file, a patent text file name is obtained and the obtained file is copied to the working area. When the file is divided into child texts, they are merged. At step SR4, the total storage capacity of patent text files which are copied to the working area is obtained. The total storage capacity is partitioned as an area where the files are stored on a floppy disk. Thereafter, at step SR6, it is determined whether or not the format of all patent text files copied to the working area has been converted. When the determined result is NO, the process advances to step SR7. At step SR7, 256 bytes of a patent text are read from the working area. Thereafter, at step SR8, it is determined whether or not all the data of the patent text have been read. When the determined result is YES, the process returns to step SR6. When the determined result is NO, the process advances to step SR9. At step SR9 the internal format of the patent text is converted into the JIS format in accordance with the structure conversion table. The converted patent text is written on the floppy disk. Thereafter, the process returns to step SR7.

When the format of all the patent text which is copied to the working area at step SR6 has been converted into the JIS format, the process advances to step SR10. At step SR10, the patent text file which is copied to the working area is deleted. Thereafter, the process is ended (END).

With the above process, when an offline patent application is performed, a set of texts including, for example, an application preamble are generated on a floppy disk in the format of JIS level 40. After the user mails or hand delivers this floppy disk to the Patent and Trademark Office, the application procedure is completed.

Figure 54:
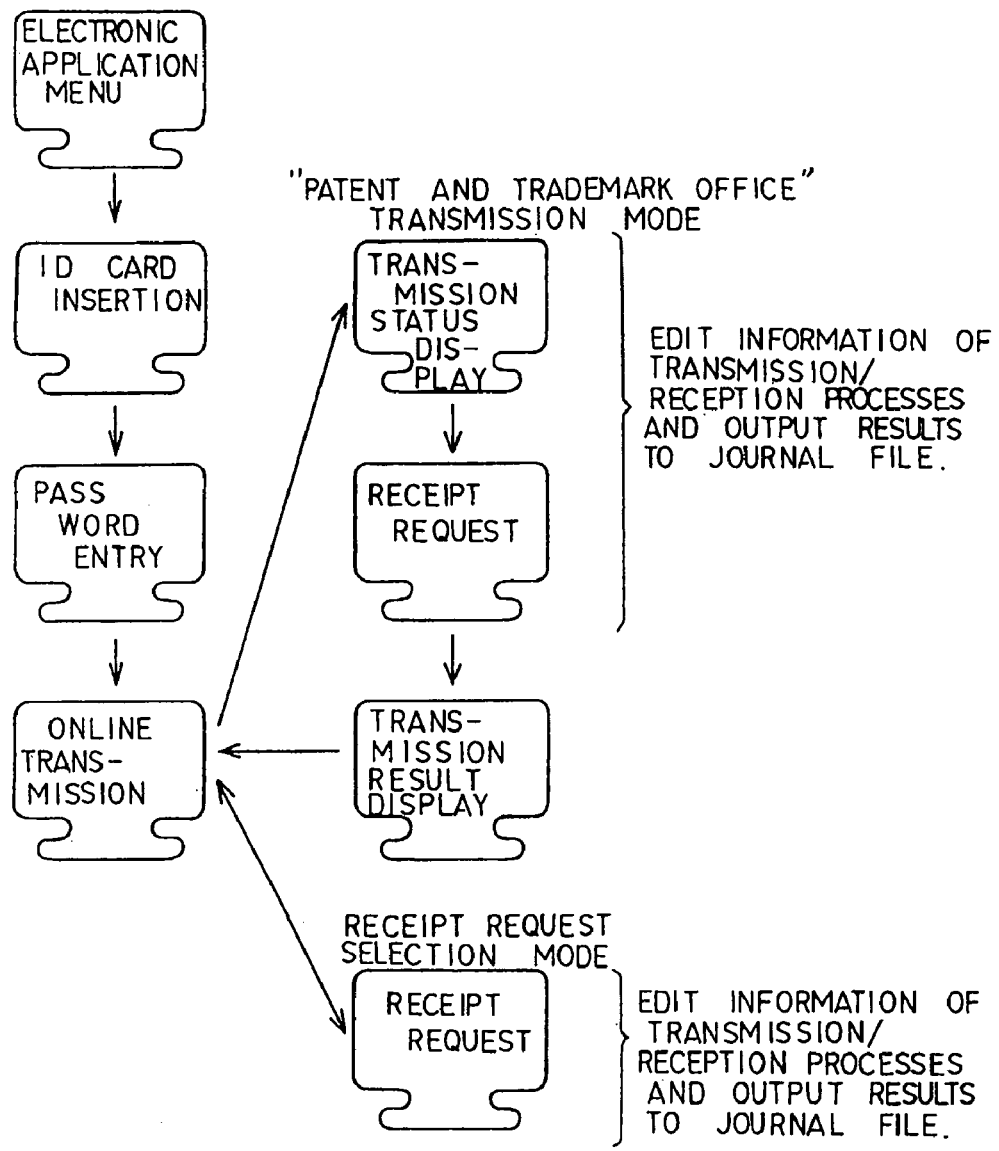
FIG. 54 is a conceptual schematic diagram showing an offline control process.

FIG. 54 is a conceptual schematic diagram showing an online control process of electronic application terminal equipment. FIG. 54 in particular shows screens for displaying data to the operator and for entering data thereby.

When an operation of terminal equipment in accordance with the embodiment is started, an electronic application menu is displayed. When the operator selects "Transmission to Patent and Trademark Office" mode, the terminal equipment prompts the operator to insert an ID card. When the operator inserts an ID card and enters a password, he can perform an online transmission. When the online transmission is started, a transmission status is displayed. When the operator requests Patent and Trademark Office to issue a receipt, the terminal equipment receives the receipt and displays it. While the terminal equipment displays the transmission status and the receipt request, it performs the transmission and reception processes and outputs the results to a journal file. When the operator selects an automatic receipt process request mode, this request is displayed. At the time, the information of the transmission and reception processes is edited and the results are outputted to the journal file.

Figure 55:
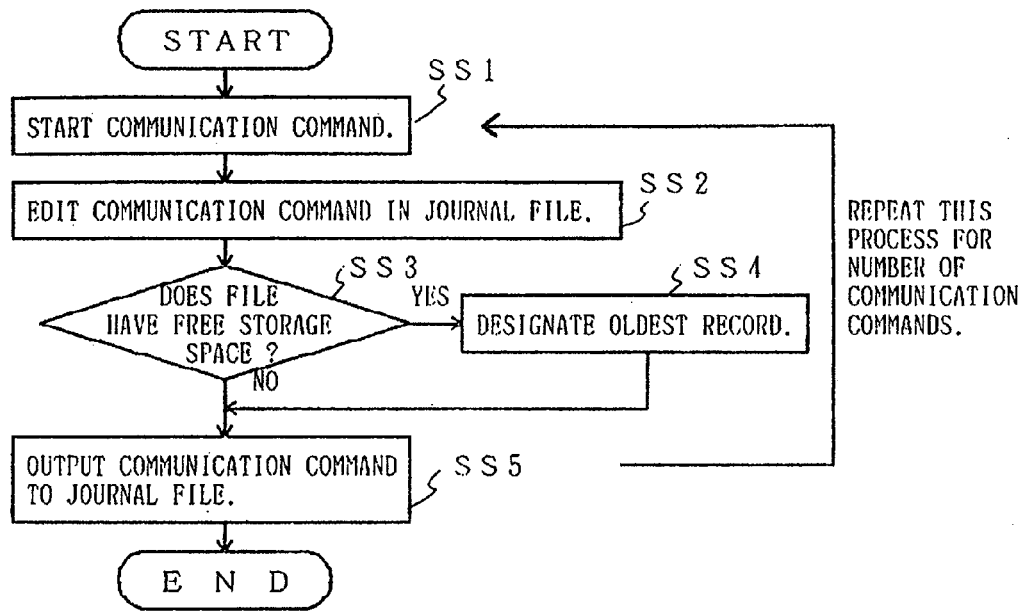
FIG. 55 is a flow chart showing a journal print and output process.
Figure 56:
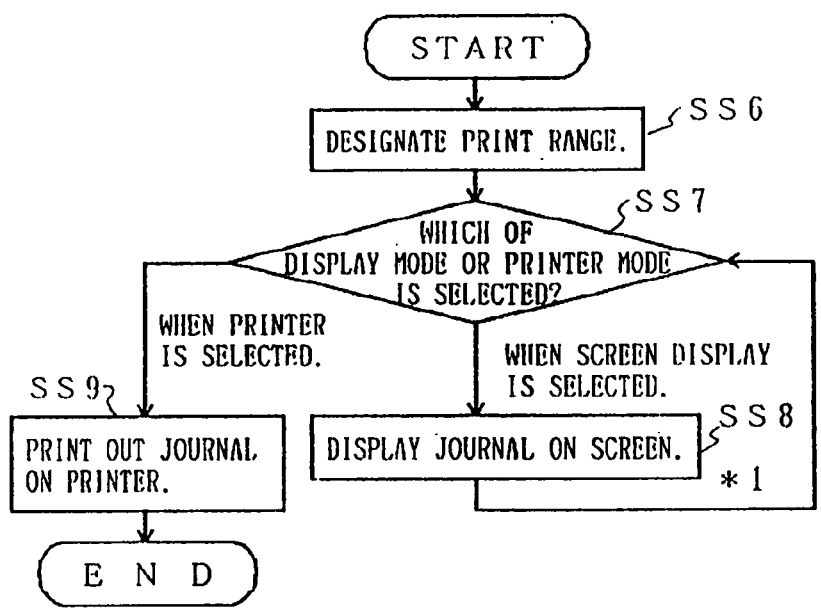
FIG. 56 is a flow chart showing a journal print and display process.
Figure 57B:
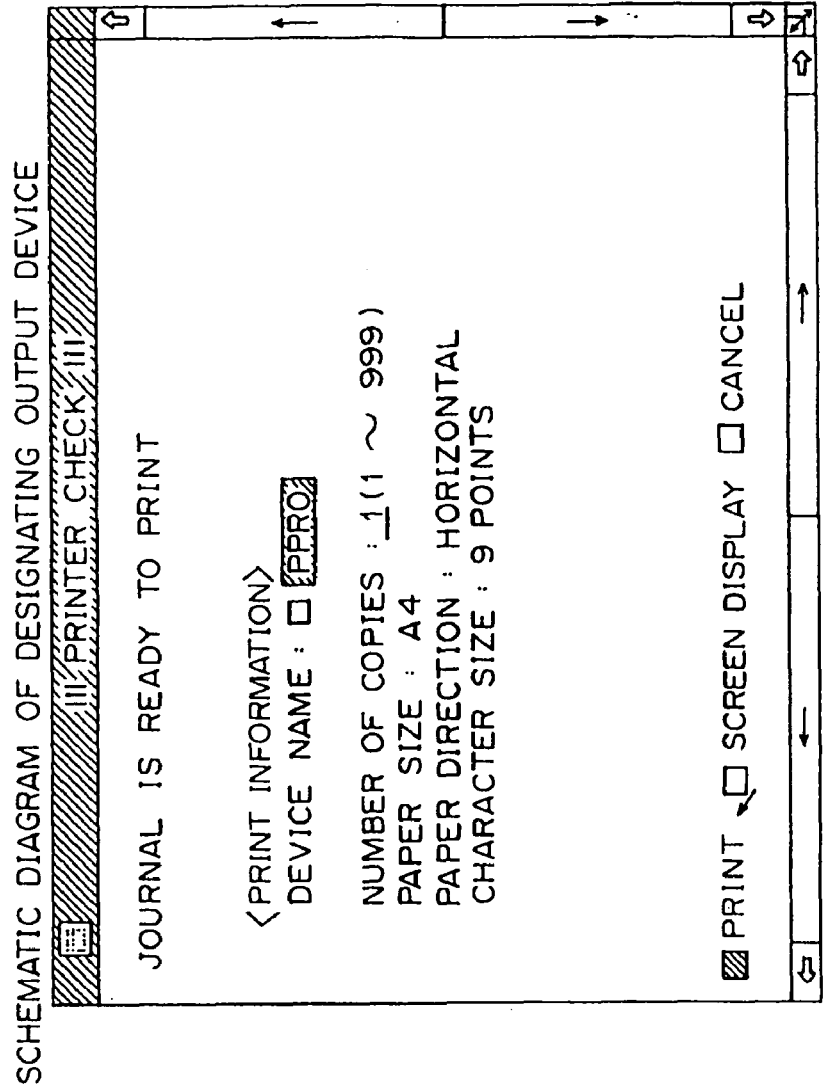
FIG. 57B is a schematic diagram showing a designation of an output device.
Figure 58:
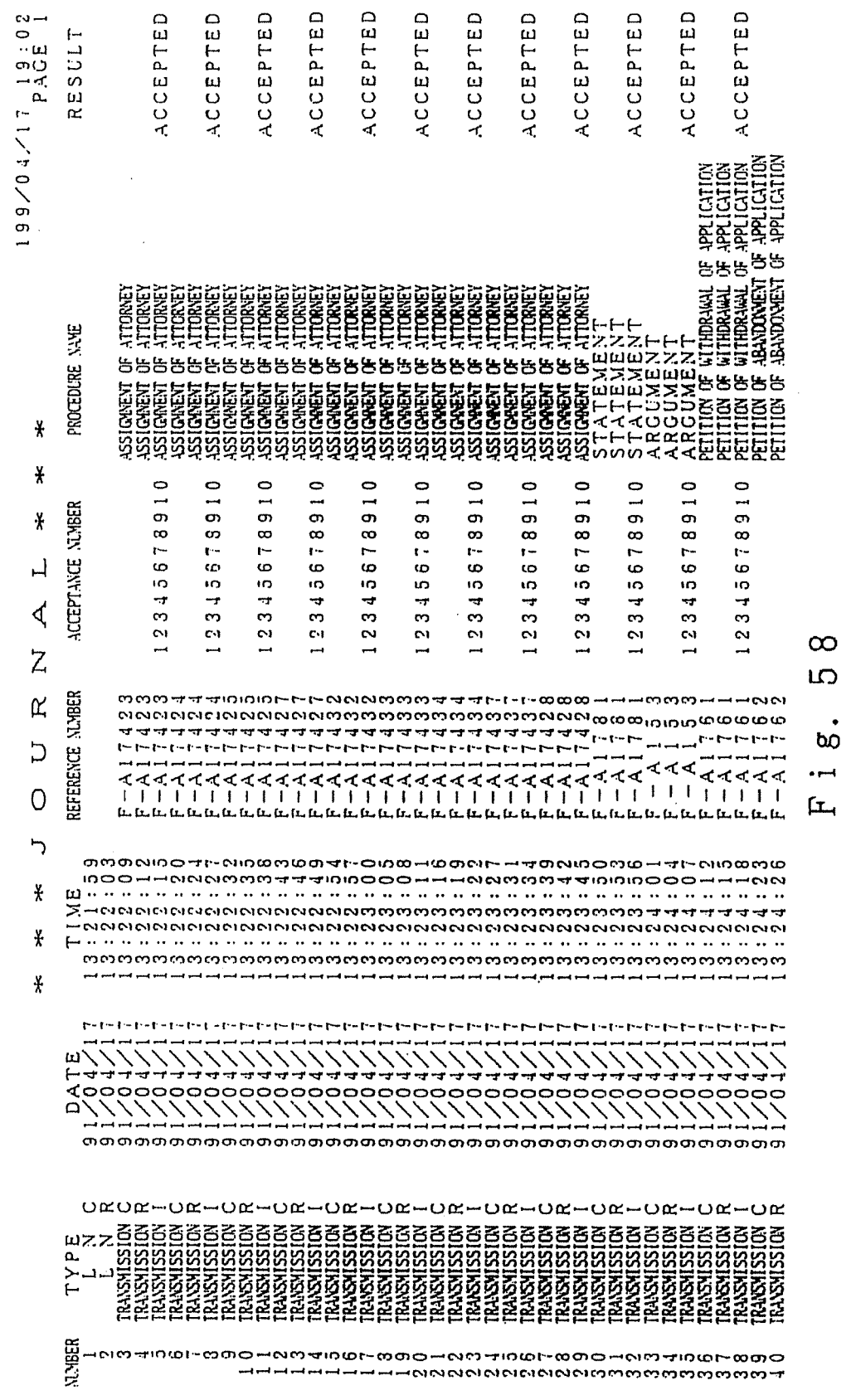

The journal process edits the information of the transmission and reception processes such as the "Patent and Trademark Office" transmission mode and outputs the results to the journal file. Whenever a communication command (registration, receipt, or the like) is issued, the relevant information is edited in the journal file. FIG. 55 is a flow chart showing journal edit and output processes. When the execution of the journal edit process is started, at step SS1 a communication command is started. At step SS2 the communication command is edited in the journal file. At step SS3 it is determined whether or not the journal file has a free storage space. When the file has no free storage space, that is, the determined result is YES, at step SS4 the oldest record is designated. Thereafter, at step SS5 the communication command is outputted to the journal file. When the file has a free storage space, that is, the determined result is NO, the process advances to step SS5. At step SS5, the communication command is outputted to the journal file. By repeating this process for the number of communication commands, the information relevant to startup of registration command, receipt command, or the like is outputted to the journal file. To print out the content of the information written to the journal file in the edit process of steps SS1 to SS5, a process shown in FIG. 56 is performed. At step SS6, a print range is designated. At step SS7, screen display mode or printer output mode is selected. When the screen display mode is selected, the process advances to step SS8. At step SS8, the journal is displayed on the screen. When the printer output mode is selected, the process advances to step SS9. At step SS9, the journal is printed out from the printer. When the screen display mode is selected, the journal in the designated range is displayed. In other words, the print range is designated at step SS6 as shown in FIG. 57A. Thereafter, by designating an output device as shown in FIG. 57B, the designated journal is displayed or printed. FIG. 58 shows an example of the journal. A list of sequential number, type, date, time, reference No, acceptance No, procedure name, and result is displayed or printed in their order.

In the above embodiment of the present invention, the image data merging process and the online control process are not limited to electronic application terminal equipment. For example, they can apply to word processors, personal computers, and so forth.

INDUSTRIAL UTILIZATION

According to the present invention, various formats of externally generated text data are converted into the internal format of the terminal equipment. Since the text data in the internal format are merged with a procedure, it can be stored, managed, edited, proof-checked, and transmitted. Thus, the present invention significantly improves the performance of electronic application terminal equipment.

(1) By simply setting a floppy disk storing a patent text or the like generated by a word processor or the like, the format thereof is automatically determined and then converted into the internal format. Thus, the data format for the patent text or the like does not need to be designated. After the floppy disk is set to the terminal equipment, the format conversion, procedure file generation, registration, and so forth are performed automatically.

(2) Since patent texts and so forth are hierarchically structured of procedure files comprising a structured text file and real data storage files (an application preamble file, a specification file, a drawing file, an abstract file, and so forth), documents necessary for individual procedures can be integrally managed. In addition, many complicated documents such as patent text can be readily managed. In addition, edit processes such as division and merging of specifications and so forth can be readily and quickly performed.

(3) When a floppy disk is set to the terminal equipment, the format of data stored therein is automatically determined and then converted into the internal format. Identifiers are automatically recognized from the data. Thereafter, sample text file and data files which are hierarchically structured are generated. The data are copied to these files so as to automatically generate a procedure file. Thus, by setting a floppy disk storing a patent text generated by a word processor or the like, a procedure file can be automatically generated.

(4) When a plurality of hierarchically structured files, for example, specification files are merged or an edit operation such as insertion or deletion of characters is performed, if image data occur at boundary between two pages, a page change code is automatically place. Thus, the "image at page boundary" can be automatically prevented.

(5) Since a text format is analyzed and paragraph numbers are automatically assigned, the operator's intervention through a word processor or the like can be significantly reduced. By selecting automatic mode, replace mode, automatic & replace mode, or renumbering mode, paragraph numbers can be assigned and renumbered when necessary.

In addition, when image data are merged with a text, the frame size thereof is automatically set. The image data can be cut in a designated size or maximum frame size. The image data to be cut can be scrolled and moved to a desired position. Text data on lines preceding and following image data can be displayed. The scales in accordance with the image size can be displayed. Identifiers can be automatically assigned to image data. Thus, the "image at page boundary" can be automatically prevented. Moreover, when an image is updated, text data table listing such as text data on the line preceding image data can be displayed. Thus, image data can be readily selected and updated.

Thus, image data can be merged with a text in a simple operation.

Furthermore, when an application document (text data) is transmitted or received on line, shortage of storage capacity for reception file 8 and receipt file 9 can be prevented. A text (procedure) during transmission and a transmission status are displayed on a real time basis. A receipt request is automatically issued and received. After a text has been transmitted, it is proof checked. A text (procedure) which has not yet been transmitted is automatically transmitted when the terminal equipment is restored from an error.

The invention claimed is:

1. A terminal equipment for managing a procedure which includes transmitting a document to an external terminal, comprising:
    receiving means for receiving a plurality of document files from a user of the terminal equipment, each of the plurality of document files having a document name;
    storing means for storing document management information which defines a relation between a procedure name identifying a procedure and one or more document files to be required in the procedure, each document file being identified by the document name;
    selecting means for selecting one document file from among the received plurality of document files;
    detecting means for detecting the document name of the selected document file, detecting a procedure name to identify a procedure that the user of the terminal equipment is going to execute corresponding to the detected document name of the selected document file, checking by using the document management information stored in said storing means whether or not each of the received plurality of document files belongs to the same procedure as the one to which the selected document file belongs based on a document name of each of the received plurality of documents files, and detecting one or more document files belonging to the same procedure as the one to which the selected document file belongs from among the received plurality of document files;
    collecting means for collecting the selected document file selected by said selecting means and the detected document files detected by said detecting means; and
    transmitting means for transmitting the collected one or more document files to an external terminal.

2. A procedure management apparatus for managing procedures including transmitting a document to an external terminal, comprising:
    a storing unit storing information about a correspondence between a procedure name identifying a procedure and one or more document files required in the procedure, each document file being identified by a document name;
    a detector detecting the document name of an input document file input by a user and, determining the procedure name corresponding to the detected document name according to the information stored in said storing unit;
    an identifier identifying other document files corresponding to the determined procedure name;
    a collector collecting the input document file and the identified document files; and
    a providing unit providing the collected documents files to execute the transmitting procedure.

3. A management apparatus for managing document transmitting procedures for transmitting documents, comprising:
    storage storing a correspondence between procedure names identifying document transmitting procedures and one or more document names of document files corresponding to the transmitting procedures; and
    a computer coupled to said storage and receiving a plurality of document files where each of the document files has a document name, selecting one of the received document files, determining the document name of the selected one of the received document files, identifying a procedure name corresponding to the determined document name by accessing said storage with the document name and obtaining the corresponding procedure name, identifying document file names of document files among the received plurality of document files that correspond to the identified procedure name; and transmitting the selected document and the identified documents using the transmitting procedure of the identified procedure name.

4. A procedure management method for managing document transmitting procedures for transmitting documents, comprising:
    storing a correspondence between procedure names identifying document transmitting procedures and one or more document names of document files corresponding to the transmitting procedures;
    receiving a plurality of document files where each of the document files has a document name;
    selecting one of the received document files;
    determining the document name of the selected one of the received document files;
    identifying a procedure name corresponding to the determined document name using the stored correspondence;
    identifying document file names of documents files among the received plurality of document files that correspond to the identified procedure name; and
    transmitting the selected document and the identified documents using the transmitting procedure of the identified procedure name.

* * * * *

UNITED STATES PATENT AND TRADEMARK OFFICE
CERTIFICATE OF CORRECTION

| | | |
|---|---|---|
| PATENT NO. | : 7,724,249 B1 | Page 1 of 1 |
| APPLICATION NO. | : 07/842391 | |
| DATED | : May 25, 2010 | |
| INVENTOR(S) | : Akira Horikawa et al. | |

It is certified that error appears in the above-identified patent and that said Letters Patent is hereby corrected as shown below:

On the Title page item (30), Col. 1, the Foreign Application Priority Data and PCT Data is given, whereas the same is not incorporated in Col. 1 below the Title.

Signed and Sealed this

Thirtieth Day of November, 2010

David J. Kappos
*Director of the United States Patent and Trademark Office*